(12) United States Patent
Lawrence

(10) Patent No.: US 8,548,868 B1
(45) Date of Patent: Oct. 1, 2013

(54) METHOD AND APPARATUS TO AGGREGRATE DEMAND FOR BUYER SPECIFIED GOODS AND SERVICES

(76) Inventor: Mark Lawrence, Monrovia, CA (US)

( * ) Notice: Subject to any disclaimer, the term of this patent is extended or adjusted under 35 U.S.C. 154(b) by 162 days.

(21) Appl. No.: 13/083,578

(22) Filed: Apr. 10, 2011

Related U.S. Application Data

(60) Provisional application No. 61/327,720, filed on Apr. 26, 2010.

(51) Int. Cl.
*G06Q 30/00* (2012.01)

(52) U.S. Cl.
USPC .................................. 705/26.2; 705/26.4

(58) Field of Classification Search
USPC ................... 5/26.1–27.2, 80; 705/26.1–27.2, 705/80, 1.1
See application file for complete search history.

(56) References Cited

U.S. PATENT DOCUMENTS

| | | | |
|---|---|---|---|
| 4,903,201 A | 2/1990 | Wagner | |
| 5,758,328 A | 5/1998 | Giovannoli | |
| 5,794,207 A | 8/1998 | Walker | |
| 6,418,415 B1 * | 7/2002 | Walker et al. | 705/26.2 |
| 6,647,373 B1 * | 11/2003 | Carlton-Foss | 705/37 |
| 2006/0047583 A1 | 3/2006 | Jacobs | |
| 2012/0123946 A1 * | 5/2012 | Walker et al. | 705/50 |
| 2012/0233056 A1 * | 9/2012 | Hansen | 705/37 |

FOREIGN PATENT DOCUMENTS

| | | |
|---|---|---|
| WO | WO00/79350 | 12/2000 |
| WO | WO02/05138 | 1/2002 |

OTHER PUBLICATIONS

"Merchants can't discount teams of Chinese shoppers; Often formed online, groups target deals, storm showrooms". Areddy, James T. Wall Street Journal, Europe [Brussels] Mar. 3, 2006: 27.*

* cited by examiner

*Primary Examiner* — William Allen

(57) ABSTRACT

The present invention is a method and apparatus for buyers to specify goods and services then aggregate demand to reduce price and minimize seller surplus. This enables consumers and small organizations to specify and obtain goods and services on terms usually available only to large organizations. An author can draft a RFQ or RFP then solicit comments and endorsements from opinion leaders who influence demand. The author will then publish the RFQ or RFP globally to prospective buyers to solicit binding commitments then offer the RFQ or RFP globally to prospective sellers to solicit binding bids. As the bid price declines the number of buyers will increase motivating a further reduction in bid price. The author can accept or reject each bid or make a counter-offer. If a bid is accepted, payment is exchanged for the specified goods and services.

20 Claims, 23 Drawing Sheets

METHOD AND APPARATUS TO AGGREGATE DEMAND FOR BUYER SPECIFIED GOODS AND SERVICES

CROSS REFERENCE TO RELATED APPLICATION

This application claims the benefit of provisional patent application Ser. No. 61/327,720 filed 2010 Apr. 26 by the present inventor.

This application is related to the following commonly-owned United States Patent Applications; Provisional Patent Application 60/140,479 (Jun. 22, 1999), Provisional Patent Application 60/216,767 (Jun. 7, 2000), application Ser. No. 09/599,673 (Jun. 22, 2000), application Ser. No. 10/716,847 (Nov. 18, 2003), Provisional Patent Application 61/315,977 (Mar. 21, 2010), Provisional Patent Application 61/327,720 (Apr. 26, 2010), Provisional Patent Application 61/361,431 (Jul. 5, 2010), and patent application Ser. No. 13/046,775 (Mar. 14, 2011).

This application is also related to the following commonly-owned International Patent Applications; WO 00/79350 (Dec. 28, 2000), WO 02/05138 (Jan. 17, 2002), and PCT/US00/17247 (Jun. 22, 2000).

The RFQ/RFP workflow management system taught herein is a part of the present Invention and is a new use of the Process Automation Software taught in application Ser. No. 10/716,747 (Nov. 18, 2003).

FEDERALLY SPONSORED RESEARCH

None.

SEQUENCE LISTING

None.

BACKGROUND OF THE PRESENT INVENTION 1.1) Field of the Invention

The method and apparatus in the present invention relate generally to the field of aggregating demand for buyer-specified goods and services.

1.2) Background

In this disclosure a seller is defined as a large seller who derives significant benefits from economies of scale where a significant increase in volume leads to a significant reduction in the cost to supply goods and services.

Economies of scale is defined as the reduction in cost per unit, for goods and services, resulting from higher volume supply. See article "what are economies of scale" by Reem Heakal in Investopedia. Higher volume leads to significant supply efficiencies and significant operational efficiencies and also results in a lower overhead cost per unit. Higher volume also allows suppliers to invest in more efficient supply procedures that also reduce the cost per unit. In addition, higher volume gives suppliers more opportunities to learn lessons that can lead to continuous efficiency improvements.

An opinion leader is a person or entity that can influence the purchase decision of a prospective buyer particularly when that buyer is considering purchasing the goods and services specified in the RFQ or RFP.

The system operator is the entity that operates the present invention. The operator user is a permanent or temporary worker who represents the system operator and is responsible for performing specific tasks in the preferred embodiment of the present invention. One or more people, entities and systems can combine to perform the role of operator user.

A Request For Quotation ("RFQ") is defined as an invitation for a provider of goods and services to bid for the right to supply the requested goods and services to the entity that issued the RFQ. The bid usually focuses on the amount that the seller will charge for the specified goods and services.

A Request For Proposal ("RFP") is defined as an invitation for a provider of goods and services to propose a solution to a set of general requirements, specified in the RFP, and earn the right to supply those goods and services to the entity that issued the RFP. The seller's proposal usually details how the goods and services meet the generic requirements and the amount the seller will charge for the goods and services. The description of the preferred embodiment of the present invention focuses on RFQs but, to one skilled in the art, it is evident that the present invention is equally applicable to RFPs. In fact, a requirement for a good such as a high definition television could be written as a very specific RFQ, if the author is aware of existing offerings that meet the requirement, or can be written as a RFP if the author is not aware of a specific solution that meets the needs.

Seller surplus is defined as the difference between a seller's quoted price and the minimum price that the seller is willing to charge for goods and services. Rational sellers usually try to increase profits by increasing seller surplus. The main objective of the present invention is to minimize seller surplus by motivating the seller to reduce the seller's quoted price toward the minimum price that the seller is willing to charge for the specified goods and services.

Sellers usually analyze markets then develop goods and services to address a perceived need. Sellers then market their goods and services to targeted market segments. To consummate a transaction, sellers usually make goods and services available to buyers then buyers select the offering that best meets their needs. This procedure is typically seller driven and seller controlled.

Large organizations have the knowledge, skills and resources to specify the goods and services they desire, define acceptable conditions for transactions, attract competitive sellers then order in sufficient volume to minimize seller surplus. This procedure is buyer driven and buyer controlled but works best when a large organizational buyer has more bargaining power than the seller. In fact, in some cases, sellers may be willing to provide goods and services to large organizational buyers below their cost to obtain the large organizational buyer as a reference customer.

Consumers and small organizations usually do not have more bargaining power than a seller (e.g., large organizational seller). This is because consumers and small organizations usually do not have the combination of knowledge, skills, resources, and volume to increase seller competition to the point where sellers will unilaterally minimize seller surplus to win the business. Consequently, consumers and small organizations usually cannot specify and obtain goods and services on similar terms to large organizational buyers.

Stores are the traditional venue of consumer buyers, small organizational buyers and sellers to exchange payment for goods and services. This traditional purchase procedure is seller driven. Catalogs, telemarketing and classified advertisements are other examples of seller driven purchase procedures. The seller usually sets the price that the buyer accepts or rejects. Buyers usually cannot specify the goods and services that are being sold. Moreover, the price range available for negotiation is usually much smaller than the actual seller surplus. Consequently, when purchasing goods and services in a traditional venue, such as a store, buyers have little or no chance to minimize seller surplus.

Exchanges such as the New York stock exchange are a market place for buyers and sellers to exchange payment for goods and services oftentimes on equal terms with each other. Exchanges tend to be driven by the market makers and tend not to favor the buyer or seller. U.S. Pat. No. 4,903,201 is an example of an exchange driven commerce system. When purchasing goods and services in an exchange, buyers pay the market price and have little opportunity to specify the features for goods and services or minimize seller surplus.

Auctions enable consumers and small organizations to exercise some price competition but the seller often has a price reserve that may prevent minimization of seller surplus. An auction item will only be sold if a bid exceeds its reserve price. In auctions, consumers and small organizations usually cannot specify the goods and services that are being auctioned. Rather, the buyer can select from the limited set of goods and services on offer. The seller usually controls the features of the goods and services and the terms and conditions of the transaction. An example of an auction system is eBay.

Reverse auctions enable a consumer or small organization to advertise an offering for which sellers can compete by reducing the price of their bids. However, for small volumes, sellers will usually only reduce their price, to the point of minimal consumer surplus, only if the goods and services are obsolete or perishable. In fact, some sellers may be willing to price obsolete goods and services close to their supply cost especially as the value of those goods and services approach zero due to impending obsolescence. Similarly, sellers will be willing to price perishable goods close to their supply cost as the value of those goods approach zero due to the impending expiration of usefulness. An example of an obsolete good is a first technology that has been superseded by a newer second technology that has substantial advantages over the obsolete first technology and also has a lower price. Fruit is an example of a perishable good. When a fruit ages to the point of going bad its value will usually decline toward zero. Another example of a perishable good as is a non-refundable airline ticket that may have limited or no value after the flight is complete. While traditional reverse auctions can reduce the lowest bid price toward the point of minimal seller surplus for obsolete and perishable goods and services, they do not allow small buyers to aggregate demand, control the features of the goods and services or specify the terms and conditions of the transaction. In addition, traditional reverse auctions do not change the terms and conditions of the offer as the price declines. In the present invention, the number of committed buyers is a key element of the "purchase offer". As the price of the lowest bid declines, more buyers will commit to the purchase offer thereby changing the volume and motivating sellers to further reduce their bid price. Unlike a traditional reverse auction, the purchase offer in the present invention becomes more attractive as the lowest bid price declines and more buyers commit to the RFQ or RFP.

A buyer driven procedure is one where the buyer seeks sellers and the buyer also exercises some control over the features of the offering and over the terms and conditions of the transaction. Generally, the buyer and seller consummate a contract based on mutual promises to perform. A job advertisement is a buyer driven procedure. The employer seeks to procure the services of an employee and specifies the terms and conditions of the employment agreement.

Consumer co-operatives or "co-ops" are buying associations that enable consumers to aggregate their demand and purchase goods and services at discounted prices. Traditional co-ops can be effective when purchasing standard goods and services, such as Ketchup, in bulk. U.S. Patent application 2006/0047583 describes a co-op system that enables consumers to aggregate demand and purchase in bulk at discount prices. However, a key disadvantage of traditional co-ops is their inability to specify the requirements and features of the goods and services and the terms and conditions of the purchase agreement. The objective of co-ops is the bulk purchase of standard goods and services not the specification of goods and services then the motivation of sellers to supply the specified goods and services at a price that minimizes seller surplus.

A traditional RFQ or RFP procedure enables large organizations to specify the features of the desired goods and services, specify the terms and conditions of the transaction and offer sufficient demand to motivate sellers to incur the substantial costs associated with submitting a bid. U.S. Pat. No. 5,758,328 describes a traditional RFQ system. However, individual consumers and small businesses usually do not have the knowledge, skills, resources and volume to motivate sellers to incur the significant bidding costs associated with a traditional RFQ or RFP process.

Other buyer driven procedures that are applicable to consumer buyers include name your own price services that aim to match a binding offer with a binding bid, such as U.S. Pat. No. 5,794,207, and services that identify a list of non-binding sellers that match a non-binding bid, such as lendingtree.com. However, these services do not empower buyers to control the features of the goods and services, specify the terms and conditions of the transaction or aggregate demand to motivate sellers to reduce their price toward the point of minimal seller surplus.

Accordingly, there is a need for a system that enables consumer buyers, and small organizational buyers, to specify the requirements, features, terms and conditions to procure goods and services then aggregate demand to achieve the critical mass required to motivate sellers to reduce their price toward the point of minimal seller surplus. This is required for all types of goods and services, including those that are not obsolete or perishable. Such a system would address the deficiencies of the prior art. In fact, there is a plurality of advantages of such a system. This system is the only way for consumer buyers and small organizational buyers to exercise the bargaining power enjoyed by large organizational buyers when negotiating with large organizational sellers. This system enables buyers to aggregate knowledge to specify the requirements, features, terms and conditions to procure goods and services, aggregate demand then solicit competing bids from sellers to reduce price and ultimately minimize seller surplus. This system also enables sellers to better understand demand drivers and improve the selection procedure for their future offerings. Finally, this system reduces costs for buyers and sellers by minimizing the traditional transaction costs associated with locating each other, communicating requirements, explaining offerings, agreeing terms, consummating the transaction and resolving disputes.

The applicant is not aware of any other commercially viable system that addresses the shortcomings of the prior art and also includes the features stated above. It is therefore an object of the present invention to set forth a system that enables buyers to aggregate knowledge to specify requirements, features, terms and conditions to procure goods and services, aggregate demand then solicit competing bids from sellers to reduce price and ultimately minimize seller surplus for all types of goods and services including those that are not obsolete or perishable.

It is another object of the present invention to enable the author of the RFQ (or RFP) to aggregate knowledge by soliciting comments from opinion leaders and feedback from reviewer buyers about the requirements and features of the offering and also on the terms and conditions of the transaction then modify the requirements, features, terms and conditions to specify an offering that will attract a binding commitment from a critical mass of prospective buyers.

It is a further object of the present invention to enable the author of the RFQ or RFP to solicit endorsements from key opinion leaders. These endorsements will motivate groups of prospective buyers to review the RFQ or RFP then make a binding commitment. It is yet another object of the present invention to enable the author of the RFQ or RFP to solicit and incorporate feedback from and a plurality of prospective buyers. The combination of endorsements from opinion leaders and incorporation of feedback from prospective buyers will result in a more attractive RFQ or RFP that will increase the number of buyers who will be willing to make a binding commitment to the RFQ or RFP. In turn, aggregation of demand will create the economic incentive for sellers to customize their offering to meet the requirements of the aggregated group of committed buyers. This is especially the case when the customization effort is limited to configuring combinations of standard options, such as in the case of computers where the buyer may specify a preferred combination of CPU, RAM, hard drive capacity and other standard options.

It is an object of the present invention to enable the author of the RFQ or RFP to solicit and incorporate comments from key opinion leaders and feedback from a plurality of prospective buyers then obtain binding commitments from buyers prior to distributing the RFQ or RFP to prospective sellers. This eliminates the need for sellers to negotiate with individual buyers and also eliminates the need for individual buyers to negotiate with sellers. It also eliminates the need for sellers to market their services to the group of buyers.

It is another object of the present invention to enable buyers to aggregate demand to achieve the critical mass required for economies of scale to effect a significant reduction in the seller's unit cost. This benefit is particularly advantageous when procuring goods and services from large retailers who have large distribution networks that have substantial economies of scale. This benefit is also advantageous when procuring commodity items, such as paper clips where economies of scale are also substantial. This benefit is also particularly advantageous when procuring perishable items, such as hotel rooms, where the seller will be highly motivated to sell its remaining volume at a large discount just before its value expires. This benefit is also advantageous when procuring obsolete items, such as older technologies, where the seller will be highly motivated to sell its remaining inventory at a large discount as the expiration of its value expires. Conversely, this benefit is also advantageous when procuring state-of-the-art offerings, such as the latest wireless phone device, where the seller will be highly motivated to sell a large volume of initial units at a discount to increase volume and reduce its unit supply cost due to economies of scale.

It is another object of the present invention to solicit competing bids from sellers. The global reach of the present invention, ready access for sellers and convenient search features for sellers, eliminate the need for authors to invest limited resources in marketing their purchase offers to prospective sellers. Rather, sellers can search for and find RFQs and RFPs at a relatively low cost. For a consumer, or small organization, these marketing and related solicitation costs can represent a significant portion of the purchase price for the desired goods and services. Without aggregation of demand, global access to sellers, and seller driven search, the solicitation costs and other transactional costs would outweigh the discount that could be achieved by an individual consumer or small organization.

It is an object of the present invention to enable the author to specify the number of buyers who have made a binding commitment to the RFQ or RFP. It is another object of the present invention to enable sellers to improve their bid as the number of committed buyers increase. It is a further object of the present invention to enable additional buyers to make a binding commitment to the RFQ or RFP as the bids improve. It is yet another object of the present invention to enable lower bids to motivate higher volume and higher volume to motivate lower bids causing a continuous reduction in the offer price toward the point of minimal seller surplus. It is a further object of the present invention to alert specified buyers when the bid price falls below a pre-determined amount. It is yet another object of the present invention to alert specified sellers when the number of committed buyers exceed a predetermined number.

It is another object of the present invention to enable the author to specify requirements, features, terms and conditions of goods and services then aggregate demand to reduce the price toward minimal seller surplus for all types of goods and services including those that are not perishable or in danger of obsolescence. In such cases, the driver of the price reduction is economies of scale in addition to the impending decline in value of the goods and services.

It is another object of the present invention to provide knowledge enhancement tools and services that help an author draft a RFQ or RFP in accordance with the best practices of the system operator without the requirement for author training.

It is another object of the present invention to standardize the format for RFQs and RFPs to facilitate review and facilitate comparison of purchase offers by sellers. It is another object of the present invention to standardize the format of bids to facilitate review and comparison by buyers.

It is another object of the present invention to use a registration procedure to qualify buyers and sellers before they are permitted to use the present invention. Each buyer must sign-up as a member before making a binding commitment to an RFQ or RFP and each seller must sign-up as a member before making a binding bid. It is another object of the present invention to use a transaction tracking procedure to update and maintain the qualification status of buyers and sellers. For example, if a buyer or seller is at fault in an excessive number of disputes then that buyer or seller may have its membership privileges revoked.

It is another object of the present invention to guarantee the authenticity of the RFQ or RFP by obtaining binding commitments from the buyers prior to accepting a binding bid from a seller.

It is another object of the present invention to make a best effort attempt to authenticate the identity of sellers to determine their capacity to provide the goods and services specified in the RFQ or RFP.

It is another object of the present invention to include standard terms in the RFQ or RFP that make the RFQ or RFP enforceable and also enforces a pre-determined dispute resolution process. It is another object of the present invention for the committed buyers and sellers to agree to refer all disputes to a pre-determined independent third party arbitrator whose decisions shall be binding on all parties regarding payment, delivery of goods and services, resolution of deficiencies and interpretation of all aspect of the RFQ or RFP procedure.

It is another object of the present invention to specify a predetermined person, such as the author, as the signatory on behalf of the committed group of buyers. It is another object of the present invention to require buyers and sellers to agree that the terms and conditions in the RFQ or RFP are legally binding when a bid is accepted and that bid, its acceptance and the RFQ or RFP are all controlled by the procedure specified by the present invention.

It is an object of the present invention to include terms in the RFQ or RFP that specify the duration of the bidding period and the options available to the author to extend or terminate the bidding period. It is another object of the present invention to include terms in the RFQ or RFP that specify the conditions under which the author can withdraw the RFQ or RFP. It is a further object of the present invention to specify the leeway available for the author to negotiate with sellers.

It is an object of the present invention to include conditions in the terms of use and in each RFQ or RFP that enforce regional, national, federal, state and local laws. It is another object of the present invention to include conditions in the terms of use that enforce the pre-determined business practices of the operator of the present invention and also enforce the operator's pre-determined morality terms.

It is an object of the present invention to transfer payment from buyers to sellers in accordance with the payment schedule and payment terms specified in the RFQ or RFP. It is another object of the present invention to facilitate the transfer of goods and services from sellers to buyers in accordance with the schedule and terms specified in the RFQ or RFP.

It is another object of the present invention for the buyers and sellers to remain anonymous until the point in the procedure specified within the RFQ or RFP.

It is another object of the present invention to support electronic transfer of digital goods and services from sellers to buyers using predetermined encryption and validation techniques.

It is another object of the present invention to enable sellers to better understand demand drivers and improve the selection procedure for their future offerings.

These and other objects of the present invention will be apparent to those skilled in the art from the following detailed description of the present invention, the accompanying drawings and the appended claims.

SUMMARY OF THE PRESENT INVENTION

In a preferred embodiment, the present invention provides a method and apparatus for buyers to aggregate the knowledge required to specify requirements, features, terms and conditions to procure goods and services, aggregate demand then solicit competing bids from sellers to reduce price and ultimately minimize seller surplus for all types of goods and services including those that are not obsolete or perishable.

The author creates a Request For Quotation (RFQ) or a Request For Proposal (RFP) and can seek endorsements from opinion leaders. These endorsements motivate groups of buyers to review the RFQ or RFP then make a binding commitment. Many authors can share the role of the author and collaborate with each other to manage the RFQ or RFP including development, modification and distribution of the RFQ or RFP as well as making binding counter-offers, accepting binding bids and coordinating dispute resolution.

After drafting the RFQ or RFP, the author publishes the RFQ or RFP to prospective buyers to solicit binding commitments. Prospective buyers can submit a binding commitment or submit the conditions under which their commitment will become binding. For example, a prospective buyer's conditional commitment may become binding if a prospective seller submits a binding bid that includes a price that is below the amount specified by that prospective buyer.

The author then offers the binding RFQ or binding RFP to prospective sellers to solicit binding bids. Sellers can submit questions about the RFQ or RFP for clarification. The author provides answers to selected questions then chooses to republish the RFQ or RFP to the prospective buyers to re-confirm their binding commitments or the author proceeds to the bidding procedure that allows sellers to submit bids. The author can attach the questions and answers to the RFQ or RFP as meta data.

The author can withdraw the RFQ or RFP if the response from opinion leaders, buyers or sellers does not meet the author's pre-determined expectations. In addition, if the bidding period expires, the author can choose to extend the bidding period in accordance with the terms and conditions in the RFQ or RFP or the author can choose to end the bidding period.

When a prospective seller submits a binding bid, the author can accept the binding bid, reject the binding bid or make a binding counter-offer. If the author rejects a bid, the prospective seller can improve the bid or withdraw the bid. If the author makes a binding counter-offer then the prospective seller can accept or reject the counter-offer. As more prospective buyers make a binding commitment to the RFQ or RFP, prospective sellers can improve their bids. As prospective sellers improve their bids, more buyers can make a binding commitment to the RFQ or RFP. This motivates prospective sellers to reduce their price continually until seller surplus is substantially minimized.

If a prospective seller accepts a binding counter-offer from the author or if a prospective seller accepts a binding offer from the author then the bound buyers and the bound sellers exchange payment for the goods and services in accordance with the terms and conditions in the RFQ or RFP.

If a bound buyer rejects the goods and services or a bound seller rejects the payment for the goods and services then the bound buyer and bound seller will participate in the pre-determined dispute resolution process in accordance with the standard terms and conditions of the RFQ or RFP.

If the bound buyers accept the goods and services and the bound sellers accept the payment for the goods and services then the transaction is complete.

The present invention uses a business intelligence system to identify trends, patterns and relationships in the databases that store a broad range of information, including transactional information and information about the activities of buyers and sellers. This information helps sellers make business decisions about current and future offerings.

The goal of the present invention is to enable consumer buyers and small organizational buyers to exercise the bargaining power enjoyed by large organizational buyers when negotiating with large organizational sellers. The present invention enables buyers to specify the requirements, features, terms and conditions to procure goods and services, aggregate demand then solicit competing bids from prospective sellers to reduce price and ultimately minimize seller surplus. For consumers and small entities, the present invention provides instant access to the skills, knowledge and volume required to obtain goods and services from large organizational sellers on terms previously only available to large organizational buyers. The present invention also enables sellers to better understand demand drivers and improve selection procedures for their offerings. Finally, the present invention reduces costs for prospective buyers and prospective sellers by minimizing the traditional transaction costs associated with locating each other, communicating requirements, explaining offerings, agreeing terms, consummating the transaction and resolving disputes.

The combination of specifying the goods and services and aggregating demand for consumer buyers and small organizational buyers, using a procedure that minimizes seller surplus, makes the present invention an improvement over conventional systems and generates unexpected results. These unexpected results include the ability of consumer buyers and small organizational buyers to obtain goods and services on terms usually available only to large organizational buyers.

Upon review, other variations of the method and apparatus described in the following drawings and detailed description will be or will become apparent to one with skill in the art. The intention is that all such methods and apparatus be included within this description, be within the scope of the present invention and be protected by the accompanying claims.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

With reference to the figures, exemplary diagrams of key components of the present invention are provided in which illustrative embodiments may be implemented. It should be appreciated that these figures are only exemplary and are not intended to assert or imply any limitation with regard to the components in which different embodiments may be implemented. Many modifications to the depicted components may be made.

Figure 1:
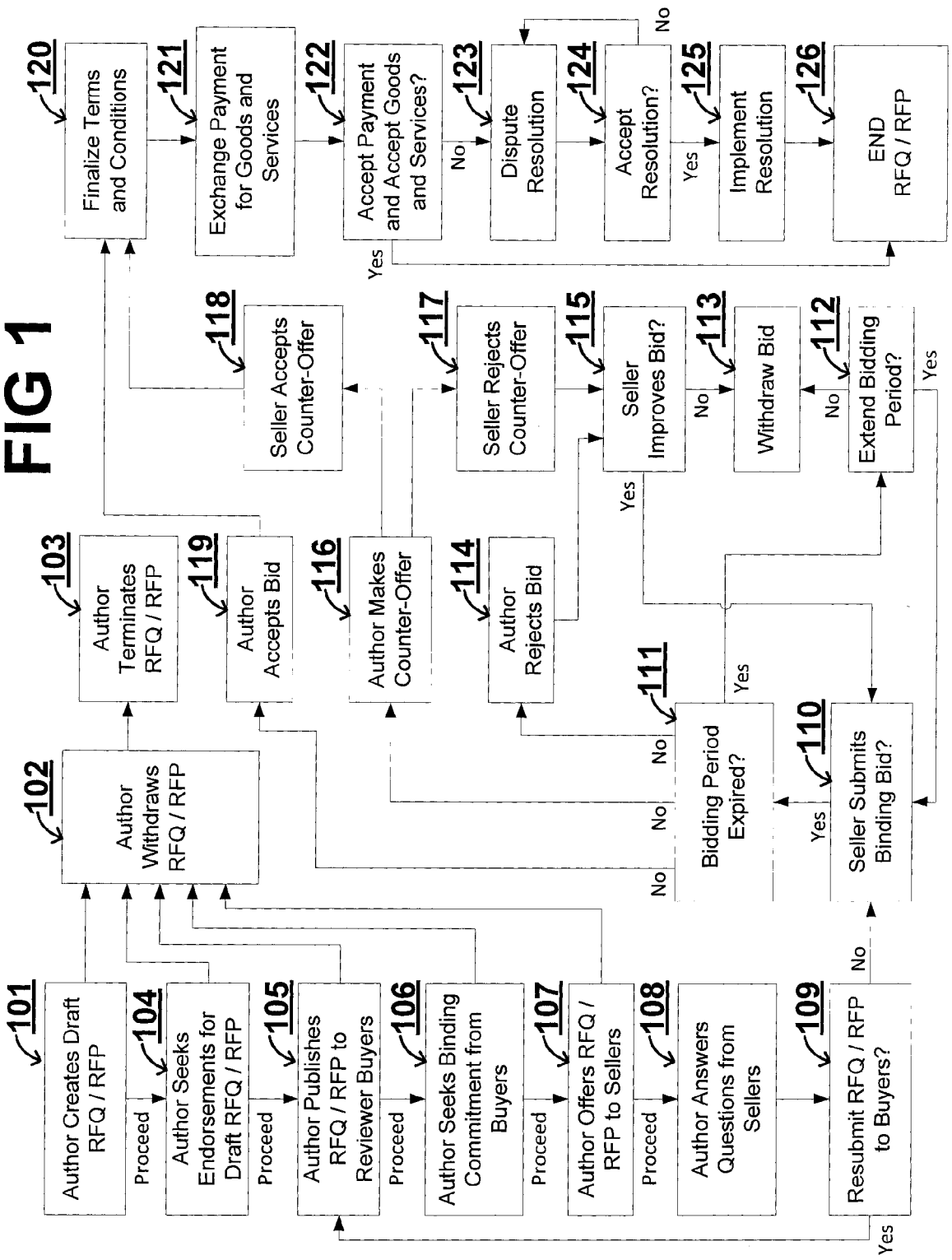
FIG. 1 illustrates a first embodiment of the present invention.

In a preferred embodiment illustrated in FIG. 1, the present invention provides a method and apparatus for buyers to specify the requirements, features, terms and conditions to procure goods and services, aggregate demand then solicit competing bids to reduce price and ultimately minimize seller surplus for all types of goods and services including those that are not obsolete or perishable.

System Overview

An author can create a draft Request For Quotation (RFQ) or a Request For Proposal (RFP) 101 then seek endorsements from opinion leaders 104. The present invention is applicable to both RFQs and RFPs. However, in this detailed description, RFQ will be used to represent both RFQ and RFP. Many authors can share the role of author and collaborate with each other to manage the RFQ including drafting, modification and distribution of the RFQ as well as making binding counter-offers, accepting binding bids and coordinating dispute resolution.

Each opinion leader can endorse the RFQ or refuse to endorse the RFQ. Based on feedback from opinion leaders, the author can modify the RFQ to gain more endorsements.

The author can then output the RFQ to at least one reviewer buyer 105 to solicit feedback. Based on feedback from reviewer buyers, the author can modify the RFQ and also include the list of endorsements from the opinion leaders to influence prospective buyers to make a binding commitment 106.

At least one prospective buyer can submit a binding commitment 106 or submit the conditions under which their commitment will become binding. For example, the conditional commitment may become binding if a prospective seller submits a binding bid that includes a price that is below a predetermined amount. This allows the author to increase the published volume as the bid price declines. This increase in committed volume will motivate further reductions in bid price by prospective sellers. The author may specify conditions other than price under which a prospective buyer's commitment will become binding. For example, a prospective buyer may specify that their commitment will become binding if the price of a computer, specified in a RFQ, is below $1,000 and the amount of hard drive memory exceeds 500 GB. In final negotiations with the seller in this example, the author will know that negotiating an increase in hard drive capacity will lead to a specific increase in volume. Conditional commitments from prospective buyers will therefore give the author some negotiating leeway when finalizing the RFQ with the bound sellers.

The author can offer the binding RFQ to at least one prospective seller 107 to solicit at least one binding bid. At least one prospective seller can submit at least one question about the RFQ which the author will answer 108. The author can then proceed to the bidding step in the procedure 110 or modify the RFQ and return to the step 105 in the procedure where the author publishes the RFQ the reviewer buyers.

The author can also withdraw the RFQ 102 if the response from opinion leaders, buyers or sellers does not meet the author's pre-determined expectations. The author can then terminate the RFQ process 103.

If the author chooses to proceed to the bidding step in the procedure 110 from step 109, that author can submit the RFQ for review by at least one prospective seller who can decide whether to submit a binding bid 110.

If the bidding period has expired 111 then the author can choose to extend the bidding period 112 in accordance with the terms and conditions in the RFQ or the central control system ("CCS") will withdraw the bid 113. If the author extends the bidding period then the CCS accepts the bid 110 and proceeds to step 111.

If the bidding period has not expired 111 then the author can provide a response that includes accepting the binding bid 119, rejecting the binding bid 114 and making a binding counter-offer 116.

If the author rejects a binding bid from a prospective seller 114 then the seller can improve the bid or withdraw the bid from consideration 115.

If the seller chooses to improve the bid then the present invention can return to step 110 in the procedure where the seller submits a bid.

If the seller chooses not to improve the bid then the present invention will withdraw the bid 113.

If the author makes a binding counter-offer 116 in response to receiving a binding bid from a prospective seller then the prospective seller can provide a response that includes accepting the binding counter-offer from the author 118 and rejecting the binding counter-offer 117 from the author.

If a prospective seller rejects a binding counter-offer from the author 117 then the present invention can proceed to the step 115 in the procedure where the seller can submit an improved bid.

If a prospective seller accepts a binding counter-offer from the author 118 then the author and the committed sellers finalize the terms and conditions of the transaction 120.

If the author accepts a binding bid from a prospective seller 119 then the author and the committed sellers finalize the terms and conditions of the transaction 120.

After the terms and conditions of the transaction are finalized 120, the committed buyers and committed sellers are bound by the RFQ and then exchange payment for the goods and services 121 in accordance with the terms and conditions in the RFQ.

If the bound buyers accept the goods and services and the bound sellers accept the payment for the goods and services 122 then the transaction is complete 126.

If a bound buyer rejects the goods and services or a bound seller rejects the payment for the goods and services 122 then the bound buyer and bound seller will participate in the pre-determined dispute resolution process 123 in accordance with the standard terms and conditions of the RFQ.

If the bound buyer and bound seller both accept the recommended solution from the dispute resolution process 124 then the recommended solution will be implemented 125 and the transaction is complete 126.

If either the bound buyer or the bound seller reject the recommended solution from the dispute resolution process 124 then the bound buyer and bound seller will return to the dispute resolution step in the procedure 123.

System Context

Figure 2:
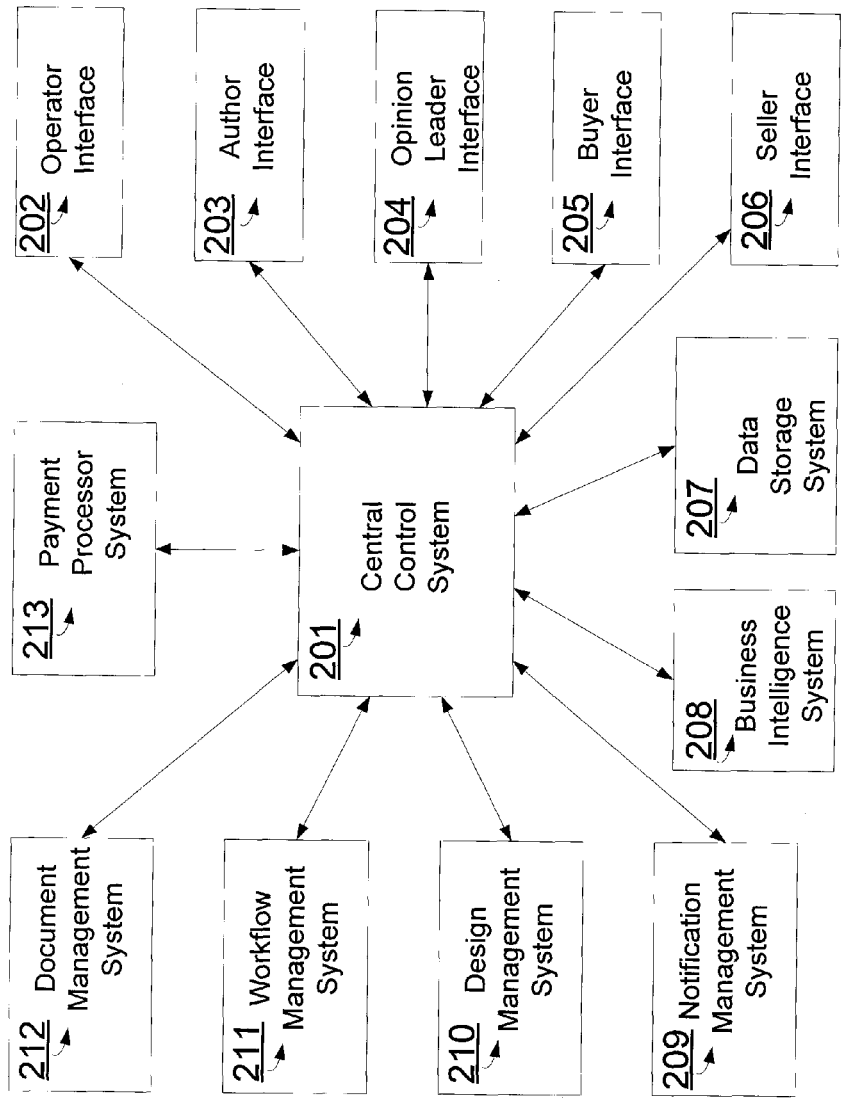
FIG. 2 illustrates a first embodiment of the system context of the present invention.

FIG. 2 illustrates the system context of a first embodiment of the apparatus and method of the present invention.

The central control system ("CCS") 201 is operatively coupled to a plurality of other systems and user interfaces. Operative coupling is the preferred method to exchange information between systems. In the present invention, the systems are inter-connected via a combination of wide area networks including the public switched telephone network, local area networks, such as an Ethernet network, token ring networks and wireless networks. Most systems, such as modern computers, include a built in interface to a local network, such as an Ethernet or 802.11b wireless network. The communications protocol used by these networks follow an international standard, such as 802.11b, that enables these systems to exchange data using a pre-determined method. However, local area network connectivity only ensures the integrity of data transfer. It is also necessary to specify the information to transfer, its source location and its intended location in the destination system. Each system has its key information stored in predetermined locations in its database. When the installation engineers configure the interface between two systems they specify the pre-determined location of the required information in the source system's database and the predetermined location for that information in the destination system's database. The engineers also specify the pre-determined frequency of information transfer (e.g., continuous, every day at 10:00 PM PT), the pre-determined format to use (e.g., synchronous, flat file Extract Transform Load "ETL") and the predetermined error checking protocol to use. The combination of network connectivity and the configuration of the communication method by installation engineers enable systems to be operatively coupled to the CCS.

The user interfaces are operatively coupled to the CCS 201. The different types of users access the CCS through a plurality of user interfaces. The user interfaces include the operator interface 202, the author interface 203, opinion leader interface 204, the buyer interface 205 and the seller interface 206 (collectively "the user interfaces"). The user interfaces are the input and output gateways for communications with the CCS The data storage system 207 is operatively coupled to the CCS. The data storage system stores the plurality of data used by the present invention.

The business intelligence system 208 is operatively coupled to the CCS. The business intelligence system calculates and stores a plurality of information about trends, patterns and relationships in the databases used by the present invention.

The notification management system 209 is operatively coupled to the CCS. The CCS sends an alert to the notification management system whenever an event occurs that requires the attention of a user. For example, when a RFQ is published, the CCS will instruct the notification management system to alert the relevant user by sending an email or alternative notification.

The design management system 210 is operatively coupled to the CCS. The design management system enables a user to create graphics that the author can attach to an RFQ. For example, the author can use the design management system to create a graphic that depicts the goods and services requested in the RFQ. Graphics created using the design management system can be added to the RFQ.

The workflow management system 211 is operatively coupled to the CCS. The workflow management system guides the author when drafting and modifying the RFQ. This ensures that the RFQ conforms to the system operator's preferred format. The system operator's preferred format for an RFQ is organized to meet legal objectives and facilitate rapid review by the different types of user.

The document management system 212 is operatively coupled to the CCS. The document management system guides the author through the life cycle of the RFQ. The key steps in the document life cycle include draft, review by opinion leaders, review by reviewer buyers, output to prospective buyers, publish to prospective sellers and develop the final negotiated version.

The payment processor system 213 is operatively coupled to the CCS. The payment processor system enables payments to be sent from the bound buyers to the bound sellers after the author accepts a binding bid from at least one prospective seller.

Figure 3:
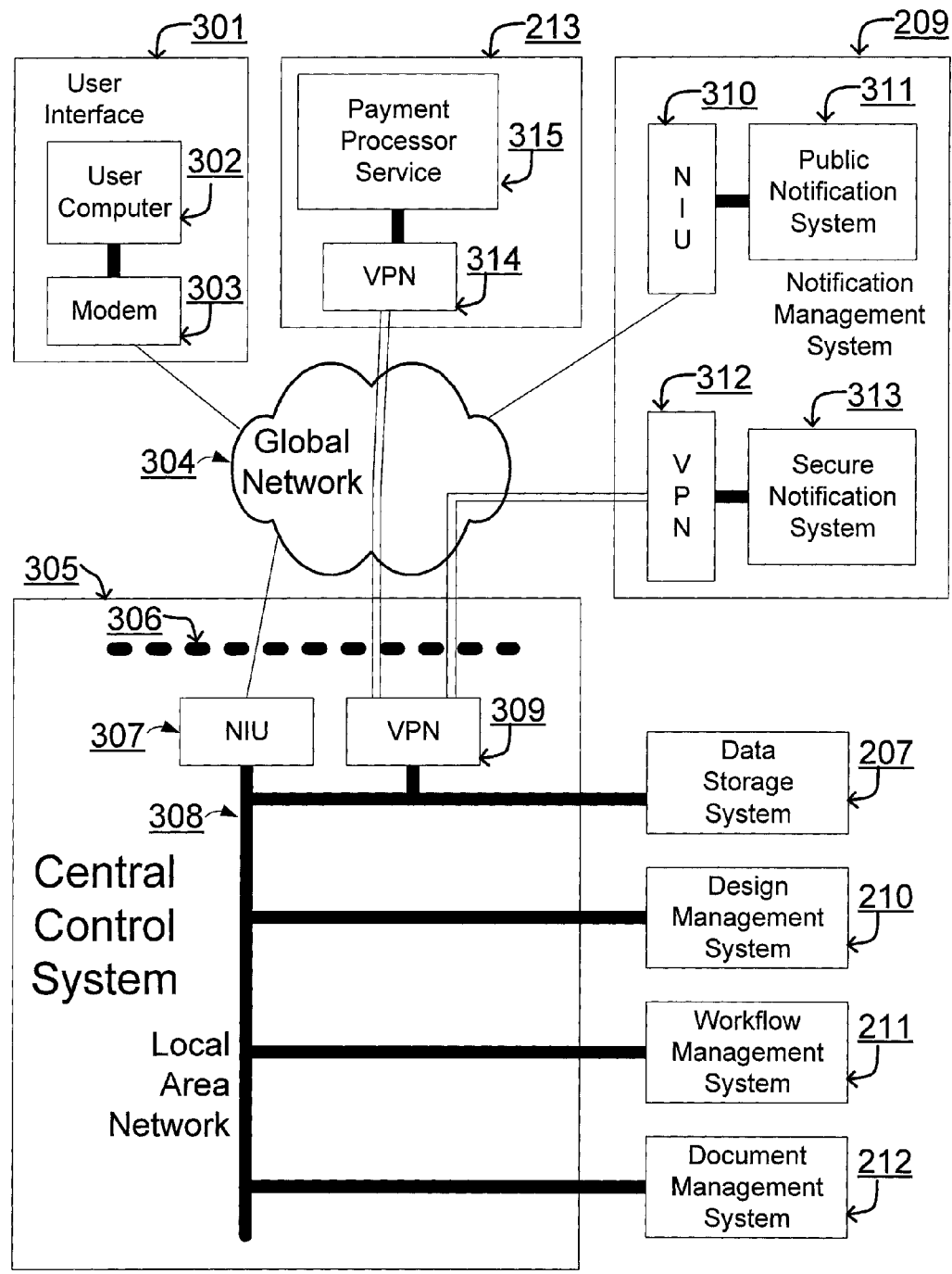
FIG. 3 illustrates a first embodiment of the system architecture of the present invention.

FIG. 3 illustrates the network connectivity of a first embodiment of the apparatus and method of the present invention.

The user interfaces 301 include a computer 302 and a modem 303. Many companies make computers that a user can use to access the CCS including Hewlett Packard, Gateway and Toshiba. In addition, many companies make modems that can connect to the CCS including 3Com Corp., D-Link Systems, Inc., and US Robotics. The user's computer is connected to the CCS via the modem and a Global Network 304, such as the Internet. The user's modem can be connected to the Global Network using at least one of a plurality of services including public or private networks such as the public switched telephone network, dedicated data line, cable service, cellular service, WiFi service, personal communication system ("PCS"), satellite network, and a microwave connection. These types of connections are provided by a plurality of organizations including local and regional telephone operating companies, cable TV companies and other providers of private and public networks.

The CCS 305 includes a local area network 308 that is connected to the global network 304 via a network interface unit ("NIU") 307 and a firewall 306. The CCS is also connected to other systems via the local area network 308 including the Data Storage System 309, Design Management System 310, Workflow Management System 311, and the Document Management System 312.

The CCS 305 also includes a Virtual Private Network ("VPN") modem 313 that is connected to the Secure Notification System 318 and the Payment Processor System 320. Many companies make VPN modems that can be used with the present invention including Netgear, Linksys and Cisco. The Secure Notification System 318 is connected to the CCS via the Global Network using a Virtual Private Network modem 317. In addition to the Secure Notification System 318, the Notification Management System 314 includes a Public Notification System 316. The Public Notification System 316 is connected to the Global Network using a Network Interface Unit 315. The preferred embodiment of the present invention can use a plurality of Public Notification Systems including email services and mobile services. The present invention can operate with many such email services including Yahoo, Hotmail and Gmail. Many organizations provide such email services including Yahoo, Microsoft and Google. The Payment Processor System 321 includes a Payment Processor Service 320 that is connected to the Global Network via a VPN modem 319. Many organizations provide such Payment Processor Services that can be used with the present invention including Paypal, Western Union and Verisign.

Figure 4:
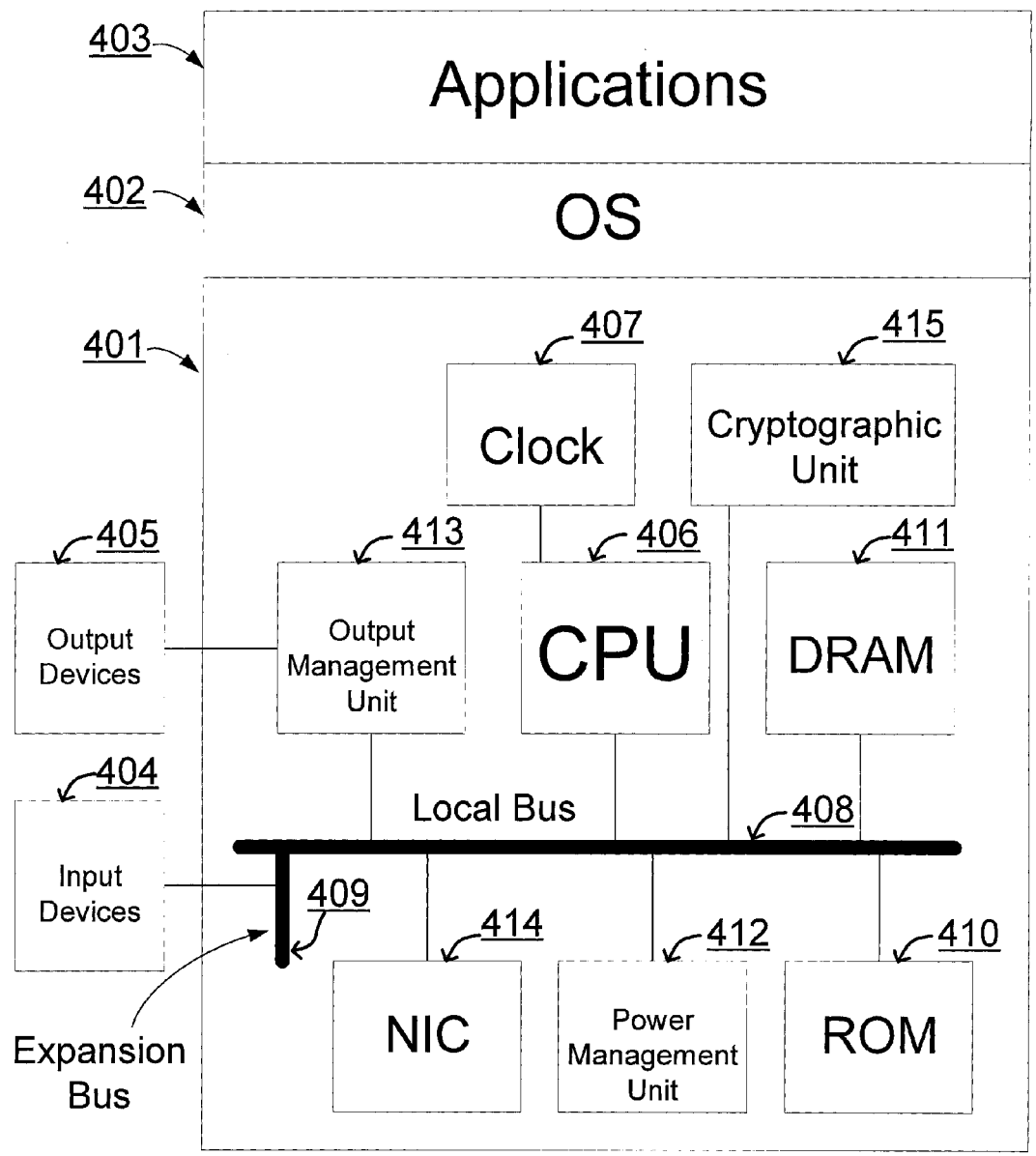
FIG. 4 illustrates a first embodiment of the central control system of the present invention.

FIG. 4 illustrates the key components of the CCS in a first embodiment of the apparatus and method of the present invention.

The Central Control System ("CCS") includes a number of key components including the main hardware 401, the operating system 402, software applications 403, input devices 404 and output devices 405. The operating system 402 is the interface between the applications and the hardware. It controls the execution of computer applications and provides services to those applications. The preferred embodiment of the present invention can use one of a plurality of standard commercial operating systems, such as Microsoft windows and UNIX. The applications 403 include software tools such as commercial anti virus software available from companies such as McAfee and Norton, and a browser, such as Microsoft Internet Explorer. Input devices 404 include a plurality of commercial options such as a keyboard, a camera, a mouse, and a microphone. Output devices 405 include a plurality of commercial options such as a monitor and speakers. These standard commercial input devices 404 and output devices 405 are available from a plurality of vendors such as CompUSA and Office Depot.

The main hardware 401 in the CCS can be a conventional personal computer or a conventional server with sufficient memory and processing power. To one skilled in the art, it will be evident that the functionality of the CCS can be distributed over multiple inter-connected personal computers or multiple inter-connected severs. The main hardware includes a number of key components including the central processing unit ("CPU") 406, clock 407, local bus 408, expansion bus 409, read only memory ("ROM") 410, dynamic random access memory ("DRAM") 411, power management unit 412, output management unit 413, network interface card 414 and cryptographic unit 415.

The central processing unit ("CPU") 406 is the component of the CCS that performs most of the data processing. It interprets instructions, performs logical and arithmetic operations on data, and controls input and output functions. The preferred embodiment of the present invention can use a commercial CPU from a plurality of vendors, such as a Pentium 4 supplied by Intel and X4 9850 supplied by AMD. The clock 407 regulates the rate at which the CPU processes instructions. The CCS also uses the clock to synchronize the operation of its key components. A CPU such as a Pentium 4 can operate at a clock speed of 3.4 GHz. The CCS uses the local bus 408 to inter-connect its key components. These key components exchange data via the local bus. The CCS uses the expansion bus 409 to enable expansion cards to exchange data with the CPU and memory. Examples of commercial expansion cards are sound cards and graphics cards. The expansion bus also enables input devices 404, such as a mouse, to input data that can be used by the key components of the CCS. The read only memory ("ROM") 410 includes the instructions that the CPU executes to perform its basic operations. The vendor of the computer platform that comprises the hardware component of the CCS provides the instructions that are stored in the ROM. When the CCS's power is removed then restored, the instructions in the ROM remain unchanged. The dynamic random access memory ("DRAM") 411 includes instructions that the CPU executes to perform selected tasks. The DRAM also stores the data that is used by the instructions executed by the CPU. When the CCS's power is removed then restored, the information in the DRAM is lost. The CCS uses the power management unit 412 to supply and regulate the power required to operate the key components of the CCS. The CCS uses the output management unit 413 to interface with output devices, such as a monitor. The CCS uses the network interface card ("NIC") 414 to interface with external networks, including an Ethernet network, public switched telephone network and a wireless network. The CCS uses the cryptographic unit 415 to support secure communications with external systems, such as the payment processor system and secure notification management system. It is described in more detail below in the section that describes the payment processor system. The vendor of the computer platform, which is used by the CCS, provides the local bus, expansion bus, ROM, DRAM, power management unit, output management unit, network interface card and cryptographic unit. Specific components, including the NIC, can be obtained from alternate commercial vendors including CompUSA and Office Depot.

Figure 5:
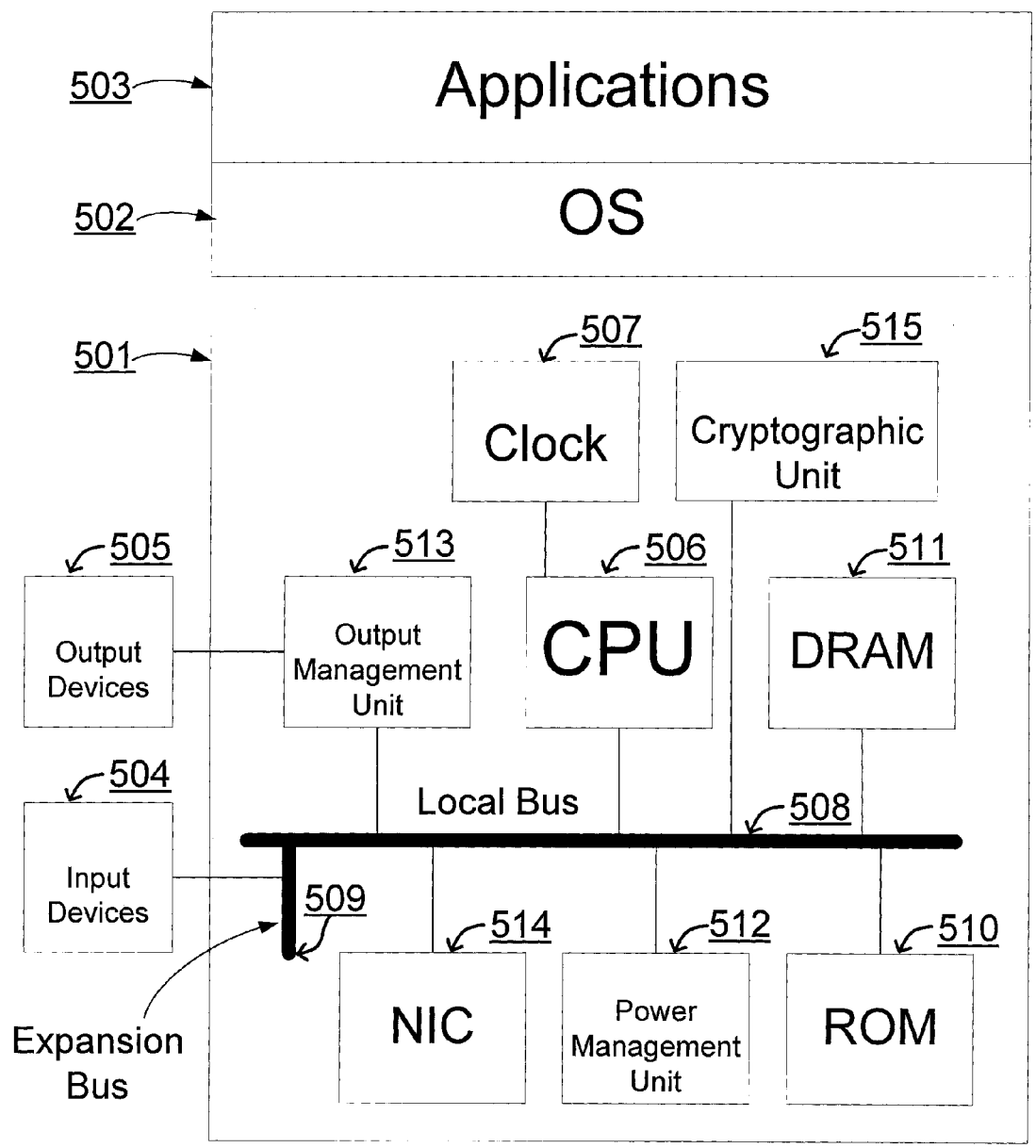
FIG. 5 illustrates a first embodiment of the user interface to the present invention.

FIG. 5 illustrates the key components of the user interface in a first embodiment of the apparatus and method of the present invention.

In a preferred embodiment of the present invention the user interface device 301 is a conventional personal computer that includes, the main hardware 501, the operating system 502, software applications 503, input devices 504 and output devices 505. The main hardware 501 in the user interface device includes a number of key components including the central processing unit ("CPU") 506, clock 507, local bus 508, expansion bus 509, read only memory ("ROM") 510, dynamic random access memory ("DRAM") 511, power management unit 512, output management unit 513, network interface card 514 and cryptographic unit 515. These components are substantially the same as the similarly named components in the CCS as illustrated in FIG. 4. They also perform substantially the same functionality and are available from the same vendors. The key differences are that the components in the CCS have higher performance requirements than the equivalent components in the user interface device. In addition, the user interface device includes, commercial software applications such as a word processor application and graphic design application. An example of a word processor application that can be used by the present invention is Microsoft Word. An example of a graphic design application that can be used by the present invention is Microsoft Visio. Examples of higher performance components for the CCS are a faster clock speed, a more powerful CPU and higher capacity DRAM.

Figure 6:
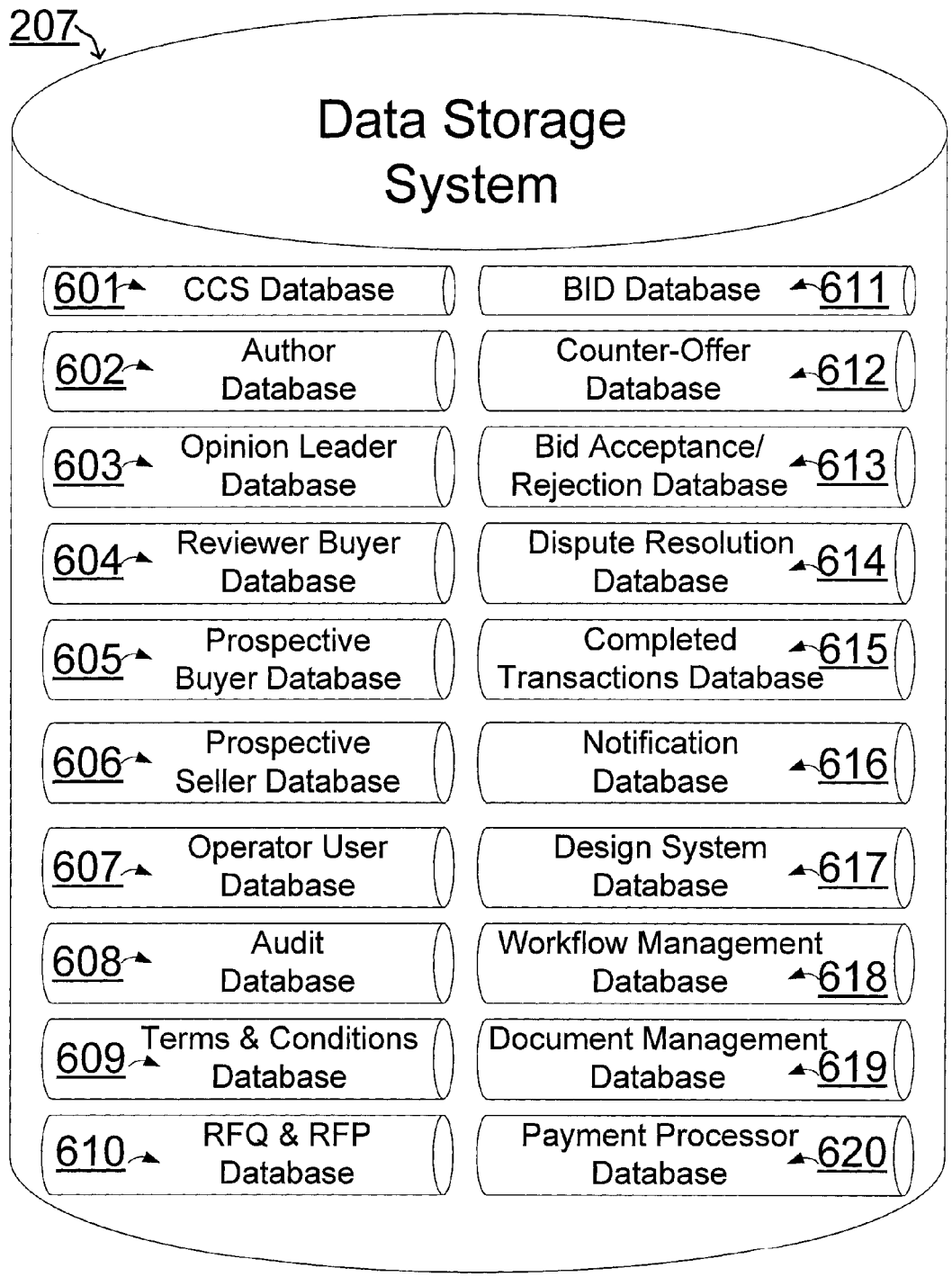
FIG. 6 illustrates a first embodiment of the data storage system ("DSS") for the present invention.

FIG. 6 illustrates the key components of the Data Storage System in a first embodiment of the apparatus and method of the present invention.

The data storage system 207 is a conventional hard disk drive that includes non-volatile, magnetic-based hard disk storage that stores digitally encoded data. The data is retained in the data storage system after power is removed then restored. A plurality of suppliers manufacture data storage systems that can be used by the present invention including EMC, Western Digital, Seagate, Maxtor, Iomega, and Hitachi. The data storage system is comprised of a plurality of databases that are described below.

The CCS uses the CCS database 601 to save and archive information about how users are using of the CCS. The CCS database contains a plurality of fields including a unique reference key for each record, the unique reference key of each user who has logged into the CCS and tracking information about the functions of the CCS used by each user on each login. For example, the information in forms submitted by users is stored in the CCS database. This includes information from comments forms, feedback forms, question forms, commitment forms, bid forms and dispute forms. All other inquiries submitted by a user via the CCS are also stored in the CCS database.

The CCS uses the author database 602 to save and archive information about authors. For each author, the author database contains a plurality of fields including a unique reference key for each record, name, address, contact phone numbers, email address, web page, social network identification names, resume, user name for the CCS, login credentials for the CCS, RFQs and RFPs authored and involvement in disputes.

The CCS uses the opinion leader database 603 to save and archive information about opinion leaders. For each opinion leader, the opinion leader database contains a plurality of fields including a unique reference key for each record, name, address, contact phone numbers, email address, web page, social network identification names, resume, user name for the CCS, login credentials for the CCS and RFQs and RFPs endorsed.

The CCS uses the reviewer buyer database 604 to save and archive information about reviewer buyers. For each reviewer buyer, the reviewer buyer database contains a plurality of fields including a unique reference key for each record, name, address, contact phone numbers, email address, web page, social network identification names, resume, user name for the CCS, login credentials for the CCS and RFQs and RFPs reviewed.

The CCS uses the prospective buyer database 605 to save and archive information about prospective buyers. For each prospective buyer, the prospective buyer database contains a plurality of fields including a unique reference key for each record, name, address, contact phone numbers, email address, web page, social network identification names, user name for the CCS, login credentials for the CCS, payment preferences, goods and services purchased, commitments to RFQs and RFPs and involvement in disputes.

The CCS uses the prospective seller database 606 to save and archive information about prospective sellers. For each prospective seller, the prospective seller database contains a plurality of fields including a unique reference key for each record, name, address, contact phone numbers, email address, web page, social network identification names, user name for the CCS, login credentials for the CCS, type of business, goods and services offered, business biography, unsuccessful RFQ and RFP bids, successful RFQ and RFP bids and involvement in disputes.

The CCS uses the operator user database 607 to save and archive information about operator users. For each operator user, the operator user database contains a plurality of fields including a unique reference key for each record, name, location address, contact phone numbers, email address, web page, social network identification names, user name for the CCS, login credentials for the CCS and expertise.

The CCS uses the audit database 608 to save and archive transactional information about offers, bids, counter-offers, bid acceptances, purchase confirmations, disputes and dispute resolutions. The audit database contains a plurality of fields including a unique reference key for each record, the unique reference key for each offer, the unique reference key for each bid, the unique reference key for each counter-offer, the unique reference key for each acceptance, the unique reference key for each dispute and the unique reference key for each dispute resolution. The information in the audit database enables each transaction to be reconstructed and analyzed for audit purposes.

The CCS uses the terms and conditions database 609 to save and archive information about terms and conditions. For each term or condition, the terms and conditions database contains a plurality of fields including a unique reference key for each record, the actual term or condition, the date last modified and the document where the term or condition is used. A plurality of documents can use terms and conditions, including a specific RFQ, a RFQ template and a terms of use agreement.

The CCS uses the RFQ and RFP database 610 to save and archive information about RFQs and RFP. For each RFQ and RFP, the RFQ and RFP database contains a plurality of fields including a unique reference key for each record, the title of the RFQ or RFP, a description of the RFQ or RFP, a link to an electronic copy of the RFQ or RFP, date and time that the RFQ or RFP was created by the author, date and time the RFQ or RFP was endorsed by each opinion leader, date and time the RFQ or RFP was reviewed by each reviewer buyer, date and time the RFQ or RFP was withdrawn, date and time the RFQ or RFP was committed to by each prospective buyer, date and time bids were received from each prospective seller, date and time bids were accepted by the author, date and time disputes were submitted, date and time disputes were resolved and date and time the RFQ or RFP transaction was completed.

The CCS uses the bid database 611 to save and archive information about binding bids submitted by prospective sellers. For each binding bid, the bid database contains a plurality of fields including a unique reference key for each record, the unique reference key for the RFQ, the details of the binding bid, the date and time of the binding bid, the unique reference key for the prospective seller, the unique reference number of the acceptance, the unique reference number of the rejection, the unique reference number of the counter-offer.

The CCS uses the counter-offer database 612 to save and archive information about counter-offers submitted by an author. For each counter-offer, the counter-offer database contains a plurality of fields including a unique reference key for each record, the unique reference key for the RFQ, the unique reference key for the binding bid associated with the counter-offer, the unique reference key for the prospective seller who submitted the binding bid, the terms and conditions of the counter-offer and the date and time of the counter-offer.

The CCS uses the bid acceptance/rejection database 613 to save and archive information about binding bids that were accepted or rejected by an author. For each binding bid accepted or rejected, the bid acceptance database contains a plurality of fields including a unique reference key for each record, the unique reference key for the RFQ, the unique reference key for the binding bid accepted or rejected, the unique reference key for prospective seller who submitted the binding bid and the date and time that the binding bid was accepted or rejected.

The CCS uses the dispute resolution database 614 to save and archive information about disputes. For each dispute, the dispute resolution database contains a plurality of fields including a unique reference key for each record, the unique reference key for the RFQ, the unique reference key for the accepted binding bid, the unique reference key for each prospective seller who submitted the accepted binding bid, the unique reference key for each prospective buyer or seller who submitted the dispute, the unique reference key for each prospective buyer or seller who is accused in the dispute, the proposed resolution of the dispute, the date and time that the dispute was submitted, the date and time that the dispute was resolved, the date and time that the transaction was completed after the dispute was resolved.

The CCS uses the completed transaction database 615 to save and archive information about completed transactions. For each completed transaction, the completed transaction database contains a plurality of fields including a unique reference key for each record, the unique reference key for the RFQ, the unique reference key for the binding bid accepted, the unique reference key for each prospective seller who submitted an accepted binding bid, the unique reference key for each prospective buyer who committed to the RFQ, the unique reference key for any related disputes, and the date and time that the transaction was completed.

The CCS uses the notification database 616 to save and archive information about notifications. The notification database also stores links to templates for the different types of notification messages. A notification is a message sent to a user to inform that user that an event has occurred (including RFQ drafted, RFQ endorsed, RFQ reviewed, commitment made to an RFQ, RFQ published, binding bid received, counter-offer submitted, binding bid accepted, dispute submitted, dispute resolved). For each notification, the notification database contains a plurality of fields including a unique reference key for each record, the unique reference key for the RFQ, the type of event that has caused the notification, the unique reference key for the event that has caused the notification (e.g., the unique reference key for a binding bid accepted), the type of template to use for the notification, the unique reference key for the user to be notified (e.g., unique reference key for the prospective seller whose binding bid was accepted), the date and time of the event that caused the notification, the date and time that the notification was sent, the title of the notification, the message in the notification, the unique reference key for each user who shall receive a carbon copy of the notification and the unique reference key for each user who shall receive a blind copy of the notification.

The CCS uses the design system database 617 to save and archive information about designs for goods and services. The design management system has its own database that is described below. However, the link to each design, which is created in the design management system then submitted to the CCS, is stored in the design system database. For each design submitted to the CCS, the design system database contains a plurality of fields including a unique reference key for each record, a name for the design, a description of the design, the link to an electronic copy of the design and the unique reference key for the RFQ that uses the design.

The CCS uses the workflow management database 618 to save and archive information about the workflow that is the preferred method to create a RFQ. The workflow management system has its own database that is described below. However, a link to each workflow, that is created in the workflow management system and submitted to the CCS for use, is stored in the workflow management database. For each workflow submitted to the CCS, the workflow management database contains a plurality of fields including a unique reference key for each record, a name for the workflow, a description of the workflow and the unique reference key for the type of RFQ that uses the workflow.

The CCS uses the document management database 619 to save and archive information about the preferred document management life cycle that is used to create, endorse, review, modify and publish an RFQ. The document management system has its own database that is described below. However, each document management life cycle that is configured in the document management system and submitted to the CCS for use, is stored in the document management database. For each document management life cycle submitted to the CCS, the document management database contains a plurality of fields including a unique reference key for each record, a name for the document management life cycle, a description of the document management life cycle and the unique reference key for the type of RFQ that uses the document management life cycle.

The CCS uses the payment processor database 620 to save and archive information about payments submitted for binding bids that have been accepted. The payment processor system has its own database that is described below. However, each payment that is submitted to the CCS is stored in the payment processor database. For each payment submitted to the CCS, the payment processor database contains a plurality of fields including a unique reference key for each record, the buyer's payment credentials, the amount of the payment, the payment method, the unique reference key for the RFQ, the unique reference key for the binding bid accepted, the unique reference key for the prospective seller who submitted the accepted bid, the unique reference key for the prospective buyer who submitted the payment, the date and time that the payment was submitted, whether the payment was accepted or rejected and the date and time that the payment was confirmed or rejected.

Figure 7:
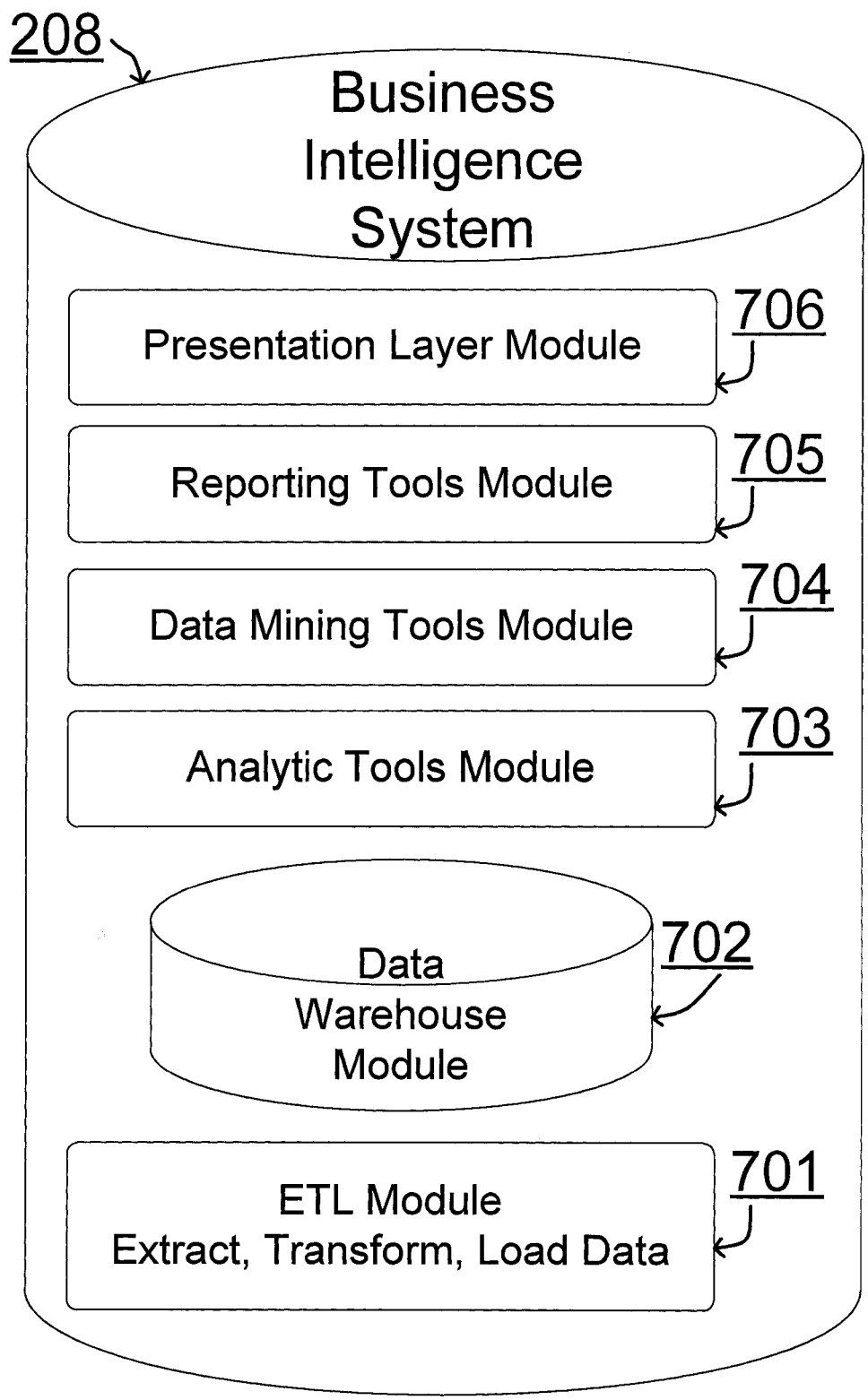
FIG. 7 illustrates a first embodiment of the business intelligence system ("BIS") of the present invention.

FIG. 7 illustrates the key components of the Business Intelligence System in a first embodiment of the apparatus and method of the present invention.

The Business Intelligence System 208 is operatively coupled to the CCS. Many companies supply business intelligence systems that can be used by the present invention including Microstrategy and Oracle. The CCS uses the business intelligence system to analyze data stored in the plurality of databases that comprise the data storage system. The purpose of the analysis by the business intelligence system is to identify trends, patterns and relationships that may be hidden in the data stored in the data storage system. Example trends include the types of RFQs that are being created by different authors (such as the percentage of total RFQs that are technology RFQs) and how this is changing over time. RFQ trends can have a plurality of causes, such as the release of a new technology. For example, the release of a new computer operating system may cause a plurality of computer related RFQs. An example of a pattern is the increase in the percentage of specific types of RFQs at certain times of the year. The cause of such a pattern may be the purchase of certain types of school supplies at the beginning of the school year and the purchase of novelty gift items during the year-end holidays. An example of a relationship is that a certain type of RFQ, for a technology for example, may lead to subsequent RFQs for related accessories. The cause of such a relationship may be that an opinion leader identifies a specific advantageous use of the goods and services specified in a RFQ that requires an accessory that was not included in the original RFQ.

The present invention uses a commercial Business Intelligence System 208 that is illustrated in FIG. 7. It includes a plurality of modules including an extract, transform and data load "ETL" module 701, a data warehouse module 702, an analytic tools module 703, a data mining module 704, a reporting tools module 705 and a presentation layer module 706. The main purpose of a business intelligence system is to enable organizations to capture, process and analyze vast amounts of data from a plurality of sources then identify trends, patterns and relationships that can facilitate business decision-making.

The ETL module 701 is the interface between the Business Intelligence System and the CCS. The main purpose of the ETL module is to transfer data from the CCS to the data warehouse. Using ETL tools to operatively couple a system, such as the Business Intelligence System, to the CCS is explained above in the description of FIG. 2.

The data warehouse module 702 is a database built in a commercial storage system substantially the same as the data storage system described in FIG. 6. The data warehouse module contains a copy of a pre-determined subset of the total data that is available in the data storage system. The operator user specifies the data in the data storage system that the operator wants to use for business analysis. The installation engineer configures the ETL module to extract that predetermined data from the source database in the data storage system, then configures the ETL module to transform that data into a format that is compatible with the data warehouse, then configures the ETL module to load the transformed data into the pre-determined database locations in the data warehouse module. The installation engineer also configures the ETL module to repeat this extract, transform and data load procedure periodically. Many vendors offer commercial data warehousing solutions including Hyperion, Microstrategy and Oracle.

The analytic tools module 703 includes standard on-line analytical processing (OLAP) functionality. OLAP software enables users to create various views and representations of data in the data warehouse. OLAP functionality enables the operator user to access, analyze and model business issues and share the information that is in the data warehouse. Many vendors offer commercial data warehousing and OLAP solutions including Hyperion, Microstrategy and Oracle. The OLAP council creates OLAP standards.

The data mining tools module 704 enables the operator user to discover trends, patterns and relationships in the data stored in the data warehouse module. Data mining software is designed to analyze large volumes of data using sophisticated data search techniques then apply statistical methods to discover trends, patterns and relationships in the data. Many vendors offer commercial data mining software including Baan Software, Oracle, SAP, Sybase and Tableau Software. The Data Mining Group is an independent, vendor led consortium that develops data mining standards.

The reporting tools module 705 enables the operator user to create reports that display the data stored in the data warehouse as well as information that illustrates the trends, patterns and relationships in the data stored in the data warehouse module. Many vendors offer commercial reporting software including Business Objects, Cognos, Crystal Reports and Microstrategy.

The presentation layer module 706 includes graphics and multimedia interfaces that enable information and reports to be displayed in a user-friendly manner. The reporting tools described above all include a presentation layer module.

Figure 8:
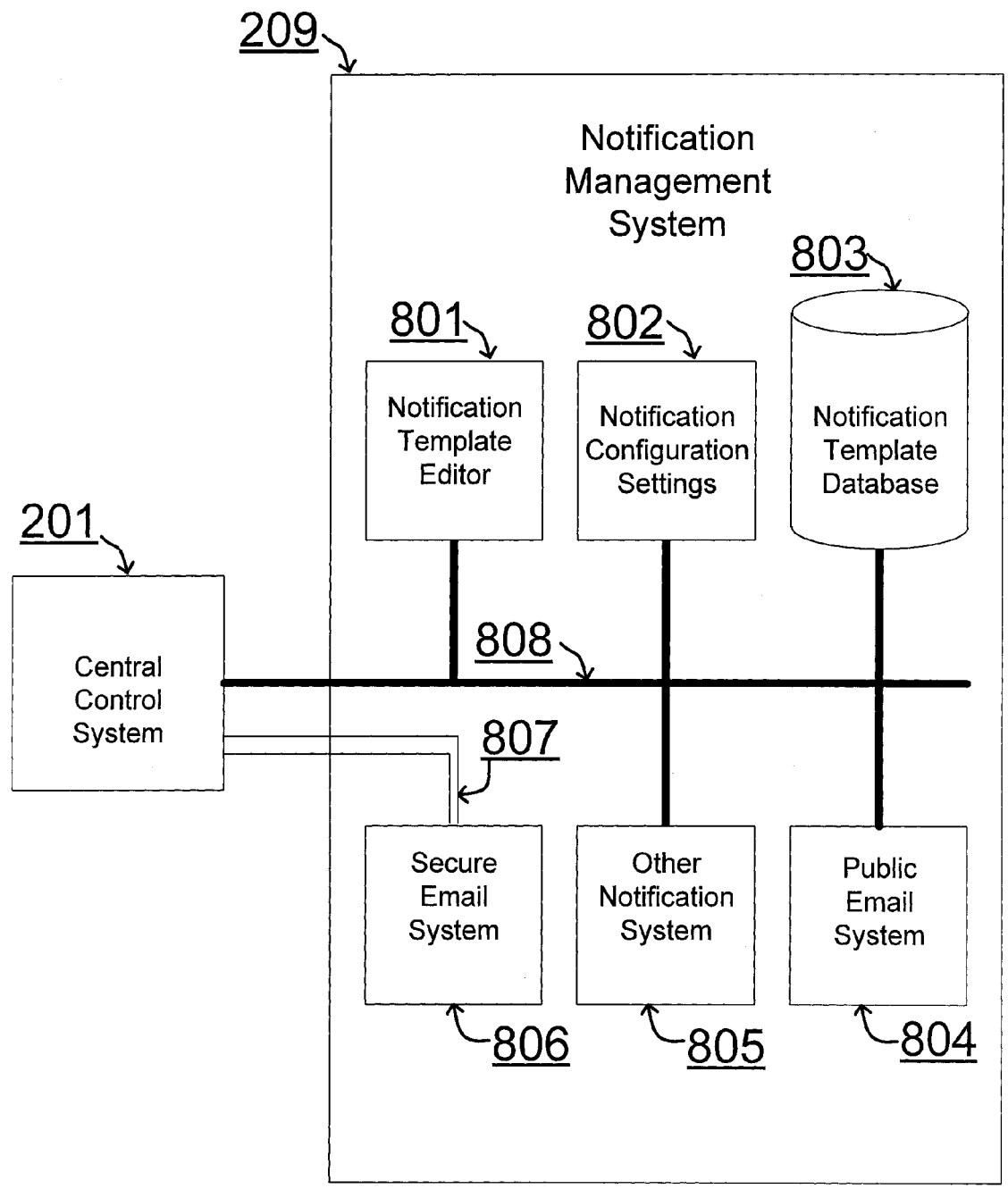
FIG. 8 illustrates a first embodiment of the notification management system ("NMS") of the present invention.

FIG. 8 illustrates the key components of the notification management system in a first embodiment of the apparatus and method of the present invention.

The notification management system 209 is operatively coupled to the CCS. The purpose of the notification management system is to send a notification whenever an event occurs that requires the attention of a user. The CCS sends a notification message via the notification management system to inform the recipient of the notification that a key event has occurred such as RFQ draft completed, a user has submitted a comment, an opinion leader has endorsed an RFQ, a reviewer buyer has reviewed an RFQ, the author has withdrawn an RFQ, a prospective buyer has made a commitment to an RFQ, the author has published the RFQ, the number of committed buyers has exceeded a pre-determined number, a seller has submitted a binding bid, a seller has submitted a binding bid below a pre-determined price, the author has submitted a counter-offer, a seller has accepted a counter-offer, the author has extended the bidding period, the terms and conditions have been finalized, the payment has been accepted, the goods and services have been accepted, a prospective buyer has submitted a dispute and a dispute settlement has been accepted. The operator user configures the notification management system to monitor a plurality of other events then alert the pre-determined user when the specific event occurs.

FIG. 8 illustrates the Notification Management System used by the present invention. This Notification Management System includes a plurality of modules including a notification template editor 801, a notification configuration settings module 802, a notification template database 803, at least one public email system 804, at least one other notification system 805, a secure email system 806, a virtual private network (VPN) 807 and a wide area network 808.

The notification template editor 801 is a standard commercial word processor that the operator user can use to draft notification templates. The author user then saves those templates into the notification template database 803. The author inserts bookmarks into the notification template where information must be added to convert the template into an actual notification message. For example, the author inserts a bookmark for the notification address (such as an email address) of the pre-determined user to whom the notification shall be sent.

The operator user uses the notification configuration settings module 802 to configure and enable the notifications. For example, in one embodiment of the present invention the operator user will configure a notification to be sent to the author whenever a bid is received. The configuration information will include a plurality of information including the event (e.g., a binding bid), the contact information for the author to be notified, the title of the RFQ, information about the supplier who submitted the bid, and information about the actual bid such as the bid price.

The notification template database 803 is used to store notification templates. For each notification template, the notification template database contains a plurality of fields including a unique reference key for each record, the unique reference key for the type of event for which the notification template shall be used, the title of the RFQ, the standard message in the notification, the unique reference key for each user who shall receive the notification, the unique reference key for each user who shall receive a carbon copy of the notification and the unique reference key for each user who shall receive a blind copy of the notification. When an event occurs, the CCS will identify the predetermined users to whom the notification shall be addressed, the predetermined users who shall receive a copy of the notification and the predetermined users who shall receive a blind copy of the notification. The CCS passes this information and a plurality of other information, such as the pre-determined template to use for the specific event, to the notification management system that extracts information from the notification database 616 to fill in the blanks in the pre-determined notification template.

The public email system 804 enables users to receive notifications from the CCS by email. It also enables users to send emails to the CCS. A plurality of public email systems are available to users including yahoo mail, hotmail, and gmail. When a user registers with the CCS, that user must input an email address that the CCS will use to send notifications.

To one skilled in the art, it will be evident that the CCS can use other notification systems 805 to notify users that an event has occurred. Other possible notification systems include instant messaging, text messages, telephone service, and wireless services. When the user registers with the CCS, the user can input their contact information for their alternative notification systems.

The secure email system 806 enables users to receive secure notifications from the CCS by email. It also enables users to send secure emails to the CCS. A plurality of vendors provide secure email services, such as Zix mail. When a user registers with the CCS, the CCS will give that user a secure email address. The CCS is connected to the secure email system by a virtual private network (VPN) 807. Commercial telephone companies such as Verizon provide virtual private networks. These VPN circuits provide more security than a regular telephone circuit. The other components of the notification management system are interconnected by a combination of wide and local area networks 808. Such networks are described above in the discussion of FIG. 3.

When an event occurs that requires a notification that does not include sensitive information such as an author publishing an RFQ, the CCS will send the notification to the user's secure email address and also to the user's public email address. When an event occurs that requires a notification that does include sensitive information, such as the submission of a dispute, then the CCS will send the notification to the user's secure email address. The CCS will also send a different notification to the user's public email address informing that user that a secure notification message has been sent to that user's secure email address. The user will then log in to the CCS to access the secure notification.

Figure 9:
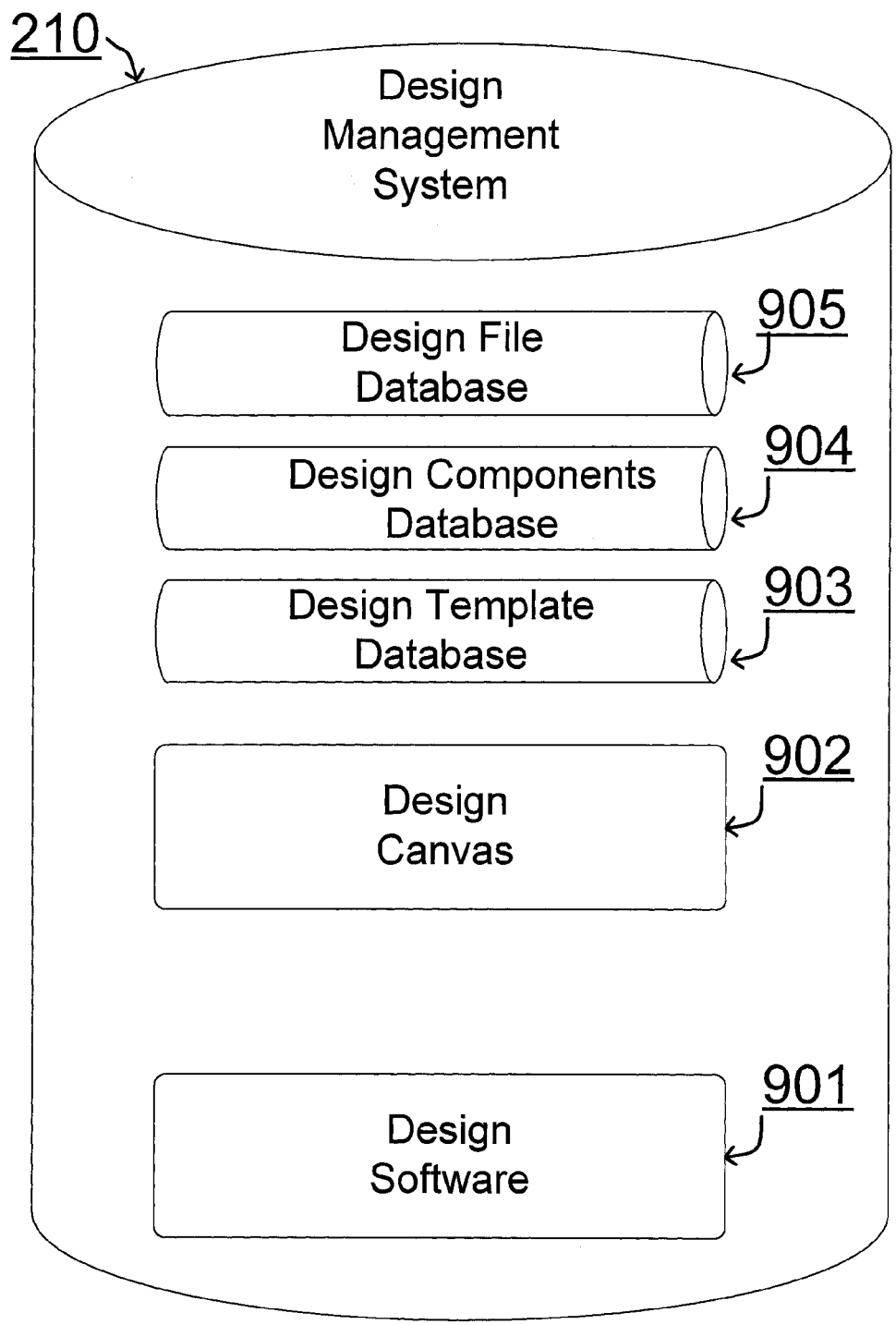
FIG. 9 illustrates a first embodiment of the design management system ("DMS") of the present invention.

FIG. 9 illustrates the key components of the Design Management System in a first embodiment of the apparatus and method of the present invention.

The Design Management System 210 is operatively coupled to the Central Control System. Commercial design management systems are available from a plurality of vendors including Microsoft Visio, Paint Shop Pro and Adobe Illustrator. The Design Management System used by the present invention is comprised of a plurality of modules including the design software 901, a design canvas 902, a design template database 903, a design component database 904 and a design file database 905.

The design software 901 is the commercial software sold by the vendor of the Design Management System. This software allows the author to perform a plurality of tasks including create, edit, save and delete designs. The author can insert these designs into the RFQ to illustrate a plurality of effects including illustrations of the goods and services specified in the RFQ. It also allows the author to perform a plurality of functions including search for design files, open design files, print design files and close design files.

The design canvas 902 is the area that is displayed on the author's screen when the author is creating and editing a design.

A first author can create at least one design template that a second author can use as the starting point for future designs. The first author can save design templates into the design template database 903.

A first author can create design components that a second author can use in designs. The first author can save design components to the design component database 904. The second author can create a design by combining, onto the design canvas, a plurality of design components from the design component database.

An author can create designs by starting with a design template then adding standard design components. Alternatively, an author can create a design without using any templates or design components. After an author creates a design, that author can save that design to the design file database 905.

Figure 10:
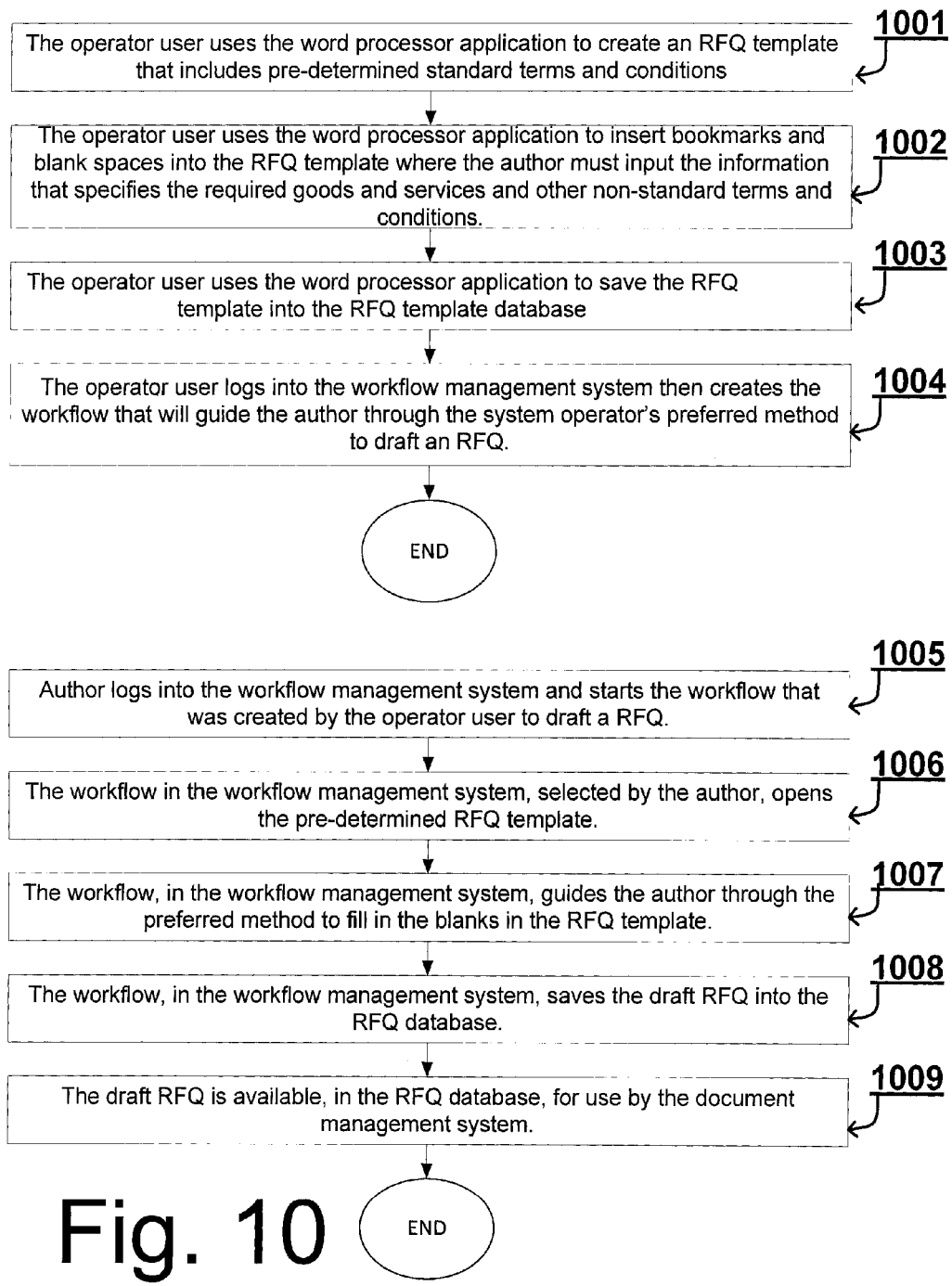
FIG. 10 illustrates a first embodiment of the overview of the workflow management system ("WMS") of the present invention.

FIG. 10 illustrates the key components of the Workflow Management System in a first embodiment of the apparatus and method of the present invention.

The Workflow Management System ("WMS") 211 is operatively coupled to the Central Control System. The purpose of the WMS is to enable an author, who is not trained to write an RFQ, to create a high quality RFQ that specifies all of the key requirements for the desired goods and services, conforms to the operator's preferred format and includes all key terms and conditions. To setup the workflow management procedure, the operator user creates an RFQ template. The operator user also creates the workflow, in the WMS, which is the system operator's preferred method to create an RFQ from the RFQ template. The WMS workflow enables the author to locate the appropriate RFQ template, guides the author through the operator's preferred method to draft the RFQ then saves the RFQ in the RFQ database.

The RFQ template includes a plurality of standard paragraphs for terms and conditions including "Payment" terms—which state how payments will be made; "Acceptance"—which states the rules for accepting the goods and services; "Title to Goods"—which states the point in the purchase procedure when title to the goods and services is transferred from the supplier to the buyer; "Term of Contract"—which states the length of time that the contract is effective; "Cancellation"—which states the rules for canceling the contract; "Termination"—which states the conditions under which the contract can be terminated; "Taxes"—which states who is responsible for the payment of taxes; "Information Disclosure"—which states the rules for disclosing information about the RFQ; "Governing Laws"—which states the supplier will comply with all relevant laws; "Assignment"—which states the rules for assigning to another party the responsibilities specified in the RFQ; "Guarantee & Warranties"—which warrants the merchantability of the goods and services; "Indemnification"—which indemnifies the buyer from specific types of claims; "Insurance"—which states the insurance coverage that the supplier is required to obtain; "Changes"—which states the rules for making changes to the RFQ; "Separability of Provisions"—which states that if any provision in the RFQ is found to be invalid the validity of other terms will not be affected; "Dispute Resolution"—which states the dispute resolution procedure; and Notices—which specifies the official contact information for sellers and buyers. The RFQ also specifies that the author can sign the contract on behalf of the buyers. To one skilled in the art, the general definition and standard wording for these and other standard terms and conditions will be evident.

In addition to the standard text for the standard terms and conditions, the RFQ template also includes a plurality of blank spaces that must be filled in by the author. These blank spaces include the title of the RFQ, a description of the goods and services, required features of the goods and services, performance requirements for the goods and services, price, delivery schedule and delivery method. The WMS guides the author through the preferred method to input this information into the pre-determined blank spaces in the RFQ template.

FIG. 10 illustrates the preferred method to create an RFQ template and the preferred method to create the workflow that is the preferred method to create an RFQ from the RFQ template.

The applications on the operator user's computer 503 include a word processor, such as Microsoft Word. The operator user uses the word processor to create an RFQ template that includes the predetermined standard terms and conditions 1001.

The operator user uses the word processor application to insert bookmarks and blank spaces into the RFQ template where the author must input the information that specifies the desired goods and services and other non-standard terms and conditions 1002. Bookmarks are a standard feature in word processor applications, such as Microsoft word. The bookmarks, which the operator user inserts into the RFQ template, mark the blank sections in the RFQ template where the author user must input specific RFQ information that includes a title, delivery schedule, delivery method and price.

The operator user uses the word processor application to save the RFQ template into the RFQ template database 1003. The operator user logs into the WMS then creates the workflow that will guide the author user through the operator's preferred method to draft an RFQ 1004. This procedure is described in more detail below in the description of FIG. 14.

FIG. 10 also illustrates the preferred method to create an RFQ from the RFQ template. The author user creates the RFQ by following the instructions that are displayed by the WMS. These instructions guide the author user through the preferred method to fill in the blanks in the RFQ template.

The author user logs into the WMS and starts the workflow that was created by the operator user to draft a RFQ 1005.

The workflow in the WMS, selected by the author user, opens the pre-determined RFQ template 1006.

The workflow in the WMS guides the author user through the preferred method to fill in the blanks in the RFQ template 1007.

The workflow in the WMS saves the RFQ into the RFQ database 1008. The draft RFQ is then available, in the RFQ database, for use by the document management system 1009.

Figure 11:
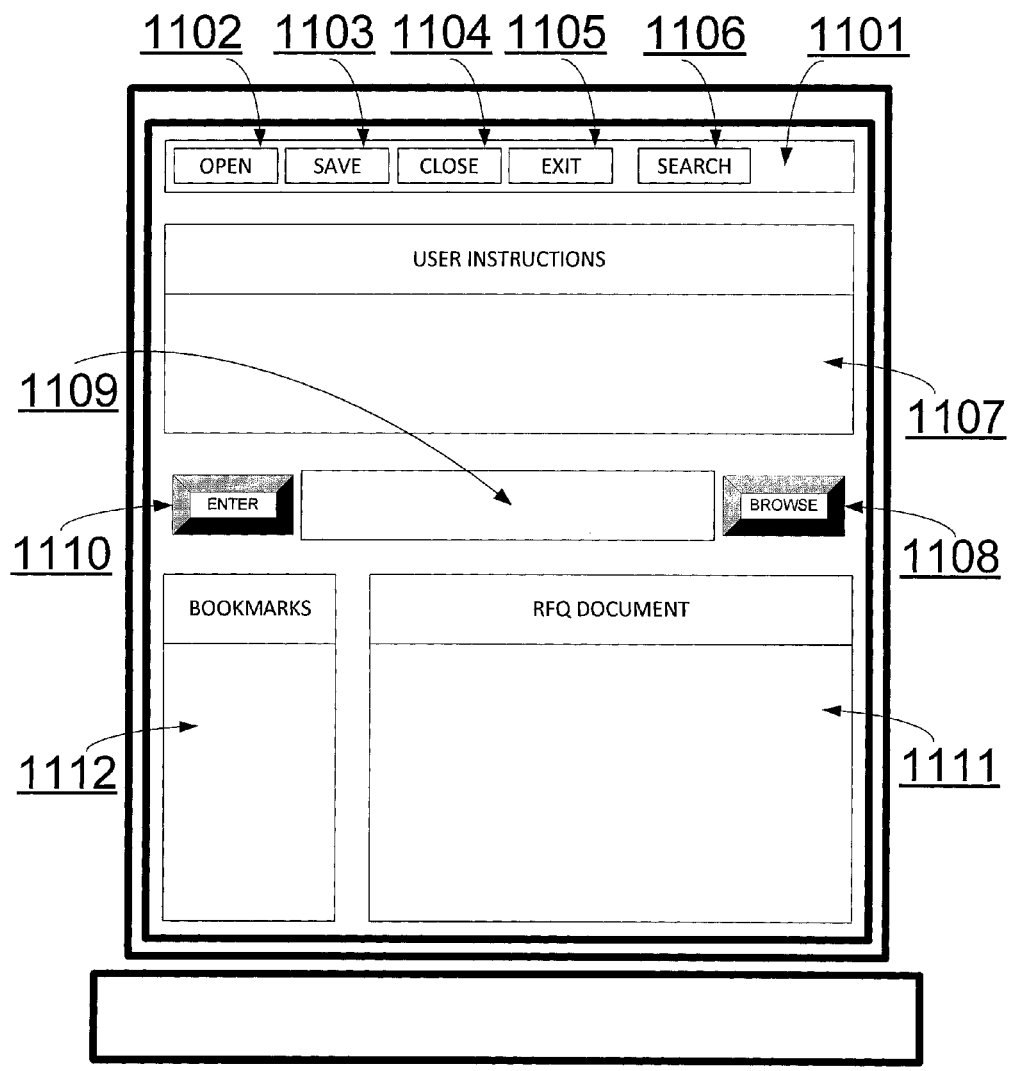
FIG. 11 illustrates a first embodiment of the RFQ/RFP workflow user interface for the WMS of the present invention.

FIG. 11 illustrates the user interface seen by the author user when using the WMS to create a RFQ. The key components of the user interface include the toolbar 1101, the user instructions window 1107, the browse button 1108, the input window 1109, the enter button 1110, the RFQ document window 1111 and the bookmarks window 1112.

The toolbar includes a number of buttons including the open button 1102, the save button 1103, the close button 1104, the exit button 1105 and the search button 1106. The open button enables the author user to open an RFQ workflow. The save button enables the author user to save an RFQ. The close button enables the author user to close the workflow that is open. The exit button enables the author user to exit the WMS. The search button enables the author user to search for and locate a specific RFQ workflow.

The purpose of the user instructions window 1107 is to display instructions to the author user at each step in the workflow where the author user has to perform an action. An example is a step in the workflow where the author must input information that will be inserted into one of the blank spaces in the RFQ. For example, at the beginning of the workflow, the WMS will open the RFQ template then position the cursor at the title bookmark. The WMS will then display, in the user instructions window, the following text "Please input a title for this RFQ". After the author user inputs the title in the input window 1109 then clicks the enter button on the screen 1110, the WMS will transfer the title from the input window to the "Title" bookmark in the open RFQ document.

The purpose of the browse button 1108 is to enable the author user to search through the file system on the author user's computer to locate a file. For example, the author user can browse through the database in the design management system to locate a design file then click the enter button in the screen 1110 to input that design into the RFQ. That design may be an illustration of the goods and services.

The purpose of the input window 1109 is to receive inputs from the author user.

The purpose of the enter button 1110 is to instruct the WMS to write the contents of the input window to the pre-determined bookmark in the RFQ as specified by the "write" command configured at that step in the workflow. The write command is described below.

The purpose of the RFQ document window 1111 is to display the RFQ document.

The purpose of the bookmarks window 1112 is to display the list of bookmarks that have been inserted into the RFQ document. When the author user clicks a bookmark listed in the bookmark window, such as the title bookmark, the WMS will reposition the RFQ document displayed in the RFQ document window, to that bookmark. In addition, when the author user clicks a bookmark in the bookmarks window, the WMS will also go to the section of the workflow that guides the author user through the system operator's preferred method to input the information required to fill in the blank space next to that bookmark in the RFQ document.

The WMS 211 has a plurality of commands that the operator user can use to create a workflow. These commands include open, save, close, exit, search, setup, display, clear, input, write, bookmark and branch. The manufacturer of the WMS can use one of a plurality computer programming languages to implement these commands, such as java, java script and visual basic.

The open command enables the workflow to open an RFQ template.

The save command enables the workflow to save an RFQ template.

The close command enables the WMS to close an RFQ template.

The exit command enables the author user to exit the WMS.

The search command enables the author user to search for an RFQ or RFQ template.

The setup command enables the WMS to setup the user interface FIG. 11. It specifies a plurality of requirements, such as the number of windows to display and their location on the screen.

The display command enables the WMS to display information in a window, such as the user instructions window. This information is pre-determined by the operator user when that operator user configures that display command in the workflow.

The clear command enables the WMS to clear all information displayed in the window specified in the clear command, including the user instructions window and the input window.

The input command pauses the execution of the workflow until the user clicks the enter button. It enables the author user to input information into the input window (then click the enter button), click a bookmark in the bookmark window or click a button on the toolbar.

The write command enables the WMS to write information from a source location to a destination location. For each write command, the operator user specifies the source location and the destination location when that operator user configures that write command in the workflow. For example, the operator user may specify the source location as the input window and the destination location as a bookmark in order for a write command to write the author user's input from the input window to that bookmark in the RFQ document.

When the author user clicks a bookmark hyperlink in the bookmark window, the WMS will jump to the corresponding bookmark command in the workflow.

The position command enables the WMS to re-position the cursor to a pre-determined bookmark in the RFQ document that is displayed in the RFQ window.

The branch command enables the WMS to jump to a pre-determined command in the workflow. For example, the operator user may include in the workflow a display command that displays the following instruction "Would you like to save the RFQ (Yes/No)?". This display command in the workflow may be followed by an input command. The author user can input, into the input window, "yes" or "no" then click the enter button on the screen. The operator user will have configured the subsequent branch command to check the information in the input window. If the author user's input is "no" then the workflow will go to the exit command. If the author user's input is "yes" then the workflow will go to the save command that will save the RFQ to the RFQ database.

Figure 12:
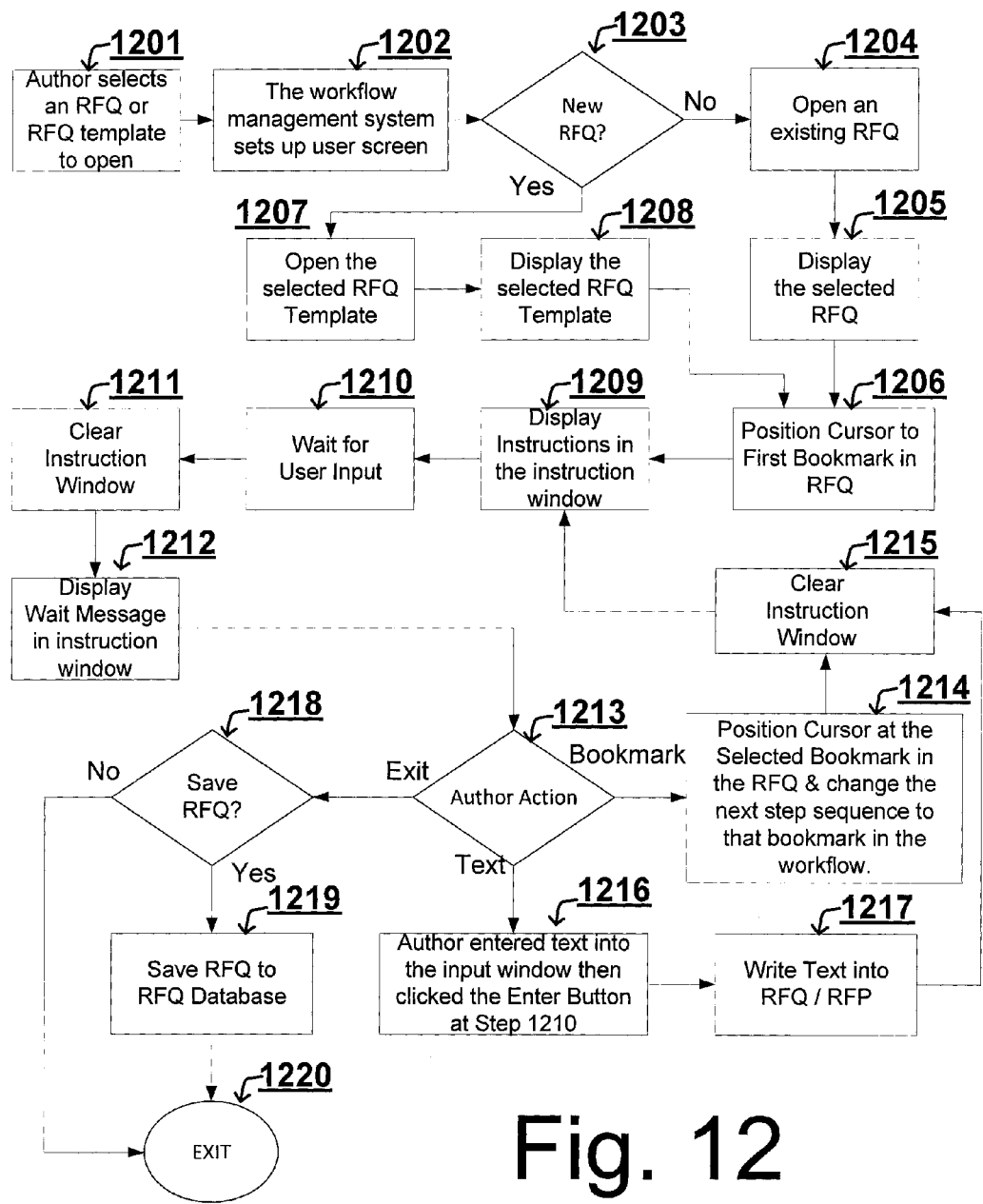
FIG. 12 illustrates a first embodiment of the RFQ/RFP workflow for the WMS of the present invention.

FIG. 12 illustrates the preferred embodiment of the workflow that the operator user configures in the Workflow Management System ("WMS") to create an RFQ. This workflow is a computer program created using the commands available in the WMS. The author user logs into the WMS then selects the RFQ workflow. The WMS launches the RFQ workflow that is illustrated in FIG. 12. Again, as stated above, the term RFQ is used to represent both RFQ and RFP.

The WMS executes an "open" command 1201 that enables the author user to open an existing RFQ or open an RFQ template. Opening a RFQ template enables the author to create a new RFQ. The WMS then executes the "setup" command 1202 to configure the windows that comprise the user interface illustrated in FIG. 11.

After setting up the user interface, the WMS then executes a "branch" command 1203. If the author user selected an existing RFQ at step 1201 then the WMS will "open" the specified RFQ 1204. The WMS will then execute a "display" command to display the specified RFQ 1205 in the RFQ document window 1110. The WMS will also execute a "position" command to position the cursor at the first bookmark in the RFQ document 1206.

If the author user selected an RFQ template at step 1201 then, at step 1203, the WMS will jump to step 1207 where it will "open" the selected RFQ template. The WMS will then execute a "display" command to display the selected RFQ template 1208 in the RFQ document window 1111. The WMS will also execute a "position" command to position the cursor at the first bookmark in the RFQ template 1206.

After positioning the cursor at the first bookmark in the RFQ document 1206, the WMS will execute a "display" command 1209 to display pre-determined instructions in the instruction window. The operator user inputs the pre-determined instructions into the display command when the operator user creates the RFQ workflow. The WMS then waits for an input from the author user 1210. The author user has a number of input options including clicking the "exit" button on the toolbar 1105, clicking a bookmark hyperlink in the bookmark window 1112 and inputting text in the input window 1109 then clicking then enter button 1110. After the author user completes an input option, the WMS executes a "clear" command 1211 to clear the instructions in the user instructions window 1107. The WMS then executes a "display" command 1212 to display the text "Wait . . . " in the user instructions window. When the RFQ workflow was created, the operator user configured the display command to display the "Wait . . . " text. The WMS then executes a "branch" command 1213 that enables the WMS to jump to different commands in the workflow depending on the input option selected by the author user at step 1210 in the workflow.

If the author user clicked a bookmark hyperlink at step 1210 in the workflow then the 1213 branch command will direct the workflow to execute the "position" command at step 1214 in the workflow. This "position" command will position the cursor at the selected bookmark in the RFQ document that is displayed in the RFQ document window

1111. The "position" command also changes the "next step" value in the workflow to jump to the correct next sequence of commands. This ensures that the correct instructions are displayed for each bookmark. The WMS then executes a "clear" command 1215 that clears the information displayed in the user instructions window 1107. This clear command is also configured to clear the information displayed in the input window 1109. The workflow then returns to step 1209 where the WMS displays pre-determined instructions in the user instructions window then waits for the next input from the author user 1210. Again, the operator user inputs the predetermined instructions into the display command when that operator user created the RFQ workflow.

If the author user chose to input text into the input window then clicked the enter button at step 1210 in the workflow then the 1213 branch command will direct the workflow to step 1216 in the workflow. The WMS then executes the "write" command at step 1217 in the workflow that writes the text, that the author entered into the input window, to the currently positioned bookmark in the RFQ document. This enables the author to input, into the input window, specific information about the desired goods and services, which the WMS uses to fill in the blanks in the RFQ. The WMS then executes a "clear" command 1215 that clears the information that the author user entered into the input window. This clear command is also configured to clear the information displayed in the user instructions window. The workflow then returns to step 1209 where the WMS displays predetermined instructions 1209 in the user instructions window then waits for further input 1210 from the author user.

If the author user had clicked the exit button at step 1210 in the workflow then the 1213 branch command will direct the workflow to step 1218 in the workflow. The WMS will display a pop-up window with the message "Would you like to save the RFQ?". The pop-up window will have two options namely "yes" and "no". If the author user selects the "yes" option, the WMS executes the "save" command at step 1219 in the workflow. This command saves the RFQ to the RFQ database. The WMS then executes the "exit" command at step 1220 and closes the workflow. If the author selects the "no" option at step 1218 in the workflow, the WMS executes the "exit" command at step 1220 without saving the RFQ then closes the workflow.

Figure 13:
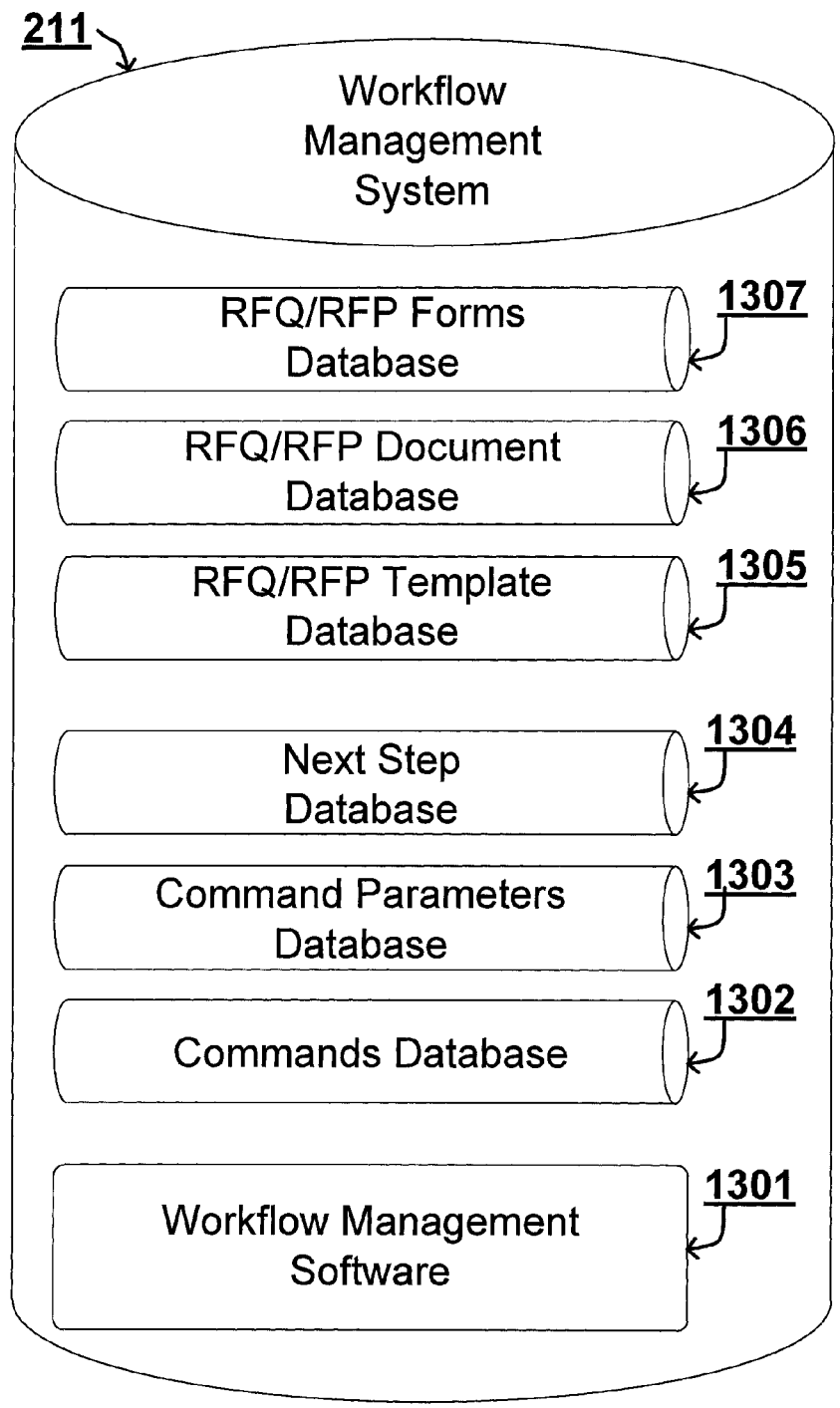
FIG. 13 illustrates a first embodiment of the key components of the WMS of the present invention.

FIG. 13 illustrates the architecture of the WMS. The WMS is comprised of a number of key components including the workflow management software 1301, the commands database 1302, the command parameters database 1303, the next step database 1304, the RFQ template database 1305, the RFQ document database 1306, and the RFQ forms database 1307.

The WMS vendor develops and maintains the WMS software 1301. The software can be written in any one of a plurality of programming languages including java, javascript and visual basic. The WMS software implements a plurality of functionality including the functions offered by the buttons on the toolbars; the functionality offered by each of the WMS commands; the capability for the operator user to create, edit and delete RFQ workflows; the capability for the author user to execute the RFQ workflow when creating an RFQ and the capability for the operator user to create forms.

The commands database 1302 stores information about the WMS commands. This database includes a plurality of fields including a unique reference key for each record and the name of the command.

The WMS stores, in the command parameters database 1303, parameters associated with each command in the workflow. For example, one "display" command in the workflow may include the following text parameter "Wait . . . ". Similarly, another "display" command in the workflow may include the following text parameter "Input the title of your RFQ". This command parameters database includes a plurality of fields including a unique reference key for each record, the unique reference key for the command and at least one parameters field.

The WMS stores sequencing information in the next step database 1304. Each step in the workflow is a command and has a unique sequence number. In the next step database, the WMS links the sequence number of each command with the sequence number of the next command in the workflow. For a "branch" command, the next step database has one entry for each branch. For example, if a "branch" command has two options (for example "yes" and "no"), that branch command will have two potential next steps and therefore two next step entries in the next step database. If the operator user configures a branch command with five options then that branch command will have five next step entries in the next step database. The next step database includes a plurality of fields including a unique reference key for each record, the sequence number of the current step and the sequence number of the next step.

The WMS stores RFQ templates in the RFQ/RFP template database 1305. When the operator user creates a template, the WMS stores that template in the RFQ template database. When the author user searches for an RFQ template, the WMS searches for that RFQ template in the RFQ template database.

The WMS stores RFQ documents in the RFQ/RFP document database 1306. When the author user creates a RFQ document, the WMS stores that RFQ document in the RFQ document database. When the author user searches for an RFQ document, the WMS searches for that RFQ document in the RFQ document database.

The WMS stores RFQ forms in the RFQ/RFP forms database 1307. When the author user creates a RFQ form, the WMS stores that RFQ form in the RFQ form database. When the author user searches for a RFQ form, the WMS searches for that RFQ form in the RFQ form database.

Figure 14:
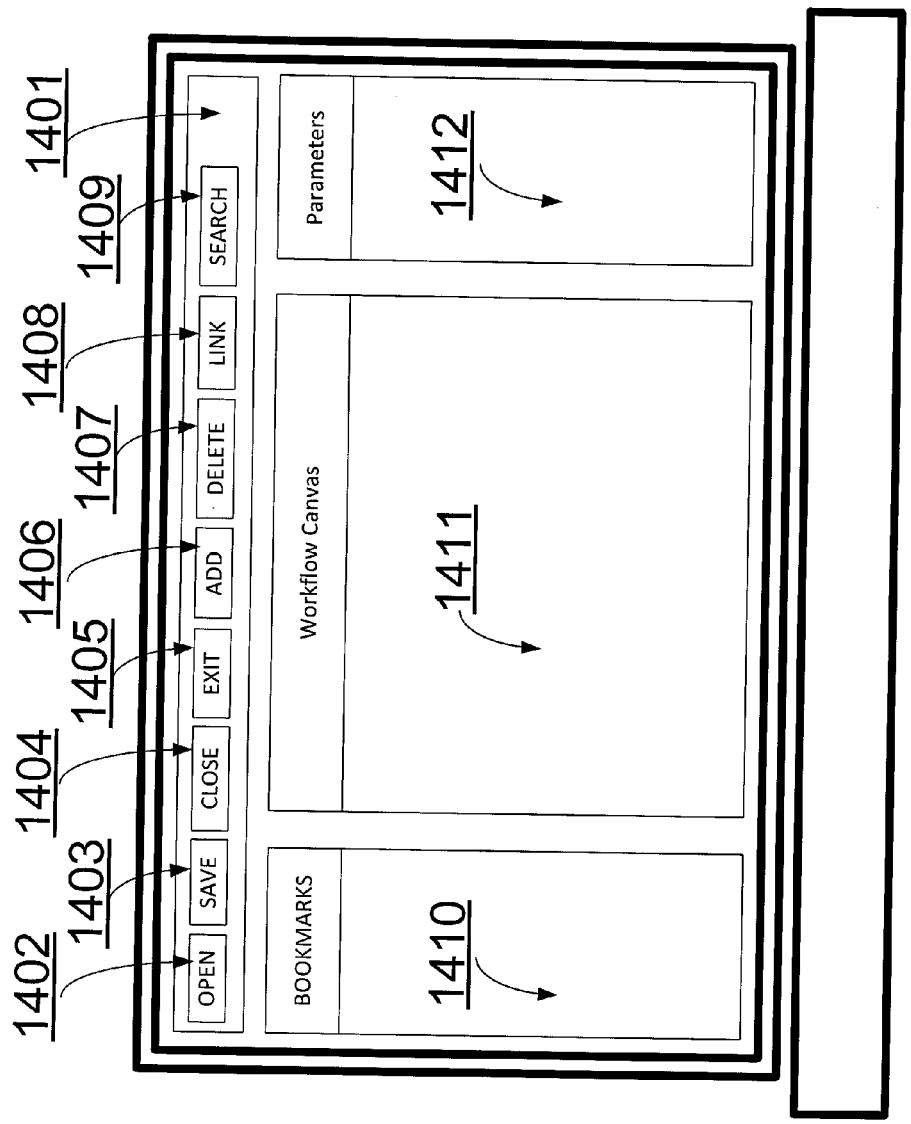
FIG. 14 illustrates a first embodiment of the workflow editing interface for the WMS of the present invention.

FIG. 14 illustrates the user interface seen by the editor user when creating and editing the RFQ workflow in the WMS. The editor user is the author user. The key components of the editor user interface include the editor toolbar 1401, the bookmarks window 1410, the workflow canvas window 1411 and the command parameters window 1412.

The editor toolbar includes a number of buttons including the open button 1402, the save button 1403, the close button 1404, the exit button 1405, the add button 1406, the delete button 1407, the link button 1408, and the search button 1409. The open button enables the operator user to open an RFQ workflow. The save button enables the operator user to save an RFQ workflow. The close button enables the operator user to close an RFQ workflow. The exit button enables the operator user to exit the WMS. The add button enables the operator user to add a command to the open workflow. The delete button enables the operator user to delete a command from the open workflow. The link button enables the operator user to link two commands in the open workflow. The search button enables the operator user to search for and locate an RFQ workflow to edit.

The purpose of the bookmarks window 1410 is to display the list of bookmarks that have been inserted into the RFQ document. When the author clicks a bookmark listed in the bookmark window, such as the "title" bookmark, the WMS will reposition the RFQ workflow, displayed in the workflow canvas window, to that bookmark command. The formal name for a bookmark command is a "milestone" command. Each bookmark command represents a key milestone in the RFQ workflow.

The purpose of the workflow canvas window 1411 is to display the RFQ workflow in the form of a flow chart of interconnected icons. Each icon represents a step in the workflow and each step is a command in the workflow. For example, the WMS will display, on the workflow canvas, an "input" icon for each "input" command in the workflow. The WMS will also display, on the workflow canvas, an icon for each other type of command that the operator user has configured in the workflow.

The purpose of the parameters window 1412 is to enable the operator user to edit the parameters associated with the workflow step that is selected in the workflow canvas window. The operator user can select a command in the workflow that is displayed in the workflow canvas window. The WMS system will then display the parameters for that command in the parameters window. Then the operator user can edit the parameters for that command in the parameters window. The operator user can then store the new parameters in the command parameters database 1303 by saving the parameters 1403. For example, the operator user can select a display command in the workflow then input the text "Wait . . . " in the parameters field displayed in the command parameters window. When the operator user clicks the save button in the parameters window, the WMS will save the text "Wait . . . " to the commands parameters database for that selected display command.

In the preferred embodiment of the present invention, the WMS enables the operator user to create an RFQ workflow by opening a blank workflow or by opening an existing RFQ workflow. The operator user can add, edit and delete commands in the workflow that the WMS is currently displaying on the workflow canvas. The WMS also enables the operator user to inter-connect the commands on the workflow canvas. In addition, the WMS enables the operator user to select a command on the workflow canvas then edit the parameters associated with that command in the command parameters window. The WMS then allows the operator user to save the changes to the RFQ workflow.

When the operator user adds a command to the workflow, the WMS adds an entry into the command parameters database 1303. When the operator user deletes a command from the workflow, the WMS deletes the entry for that command from the command parameters database. When the operator user edits the parameters displayed in the parameters window for a command, the WMS edits the parameters field for that command's entry in the command parameters database.

When the operator user creates a link between two commands in a workflow, the WMS adds an entry into the next step database 1304. This entry in the next step database specifies that the second command on a link follows the first command on the same link. When the operator user deletes a link between two commands, the WMS deletes the entry for that link in the next step database. When the operator user deletes a command in a workflow, the WMS also deletes the entries in the next step database associated with that deleted command.

Figure 15:
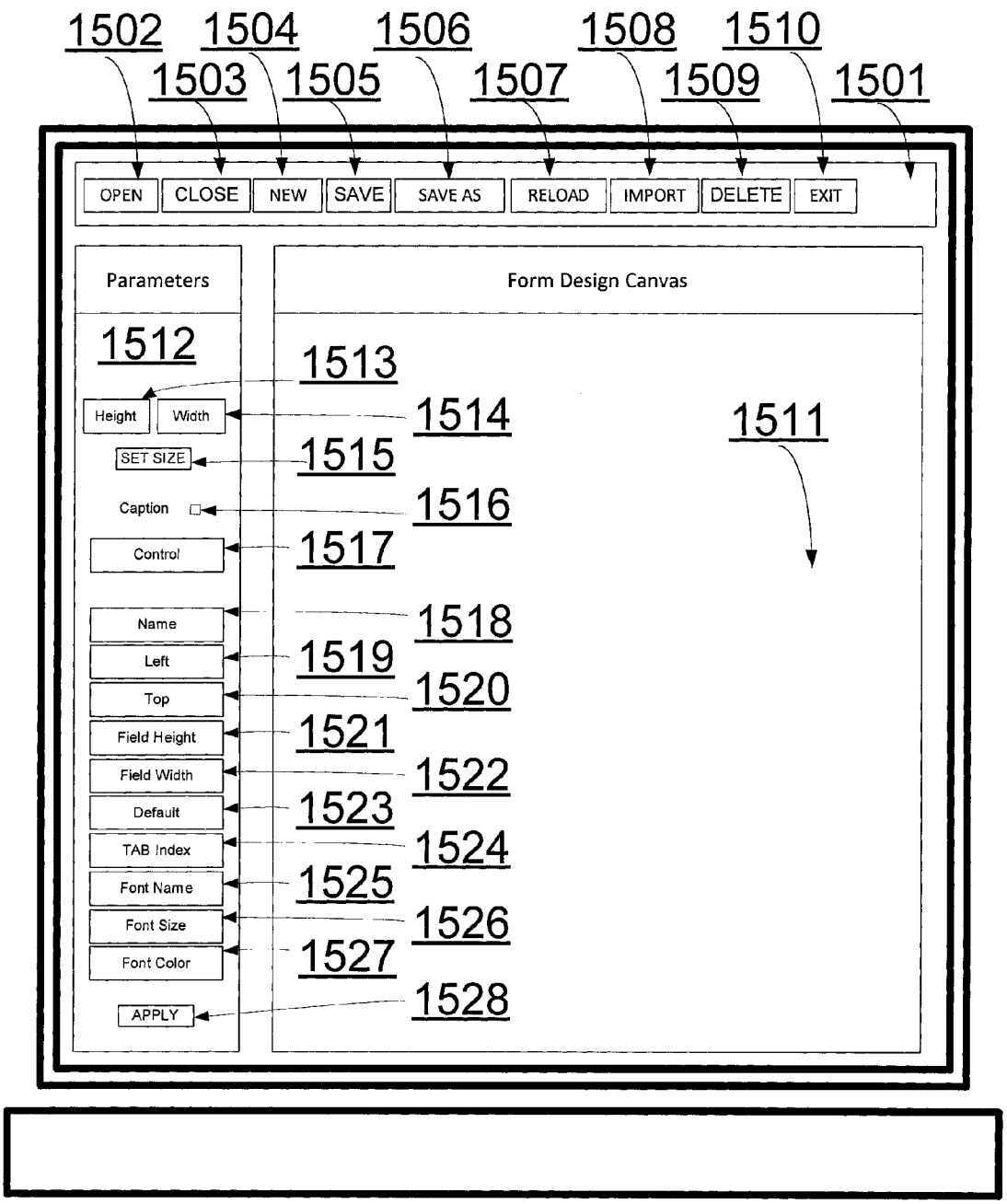
FIG. 15 illustrates a first embodiment of the form editing interface for the WMS of the present invention.

FIG. 15 illustrates the user interface seen by the form editor user when creating and editing a form in the WMS. The form editor user can be a number of users including the operator user and the author user. The present invention uses forms for a number of purposes including submitting an endorsement, submitting a binding commitment to an RFQ, submitting a bid, submitting a counter-offer, accepting a bid, accepting a counter-offer, submitting a dispute, rejecting a dispute resolution, accepting a dispute resolution, submitting a final acceptance of a transaction and submitting comments and feedback. The key components of this form editor interface include the form editor toolbar 1501, the form parameters window 1512 and the form design canvas 1511.

The editor toolbar includes a number of buttons including the open button 1502, the close button 1503, the new button 1504, the save button 1505, the save as button 1506, the reload button 1507, the import button 1508, the delete button 1509, and the exit button 1510. The open button enables the workflow editor user (e.g., the operator user) to open a form. The close button enables the workflow editor user to close a form. The new button enables the workflow editor user to create a new form. The save button enables the workflow editor user to save a form, with the same name, to the RFQ/RFP forms database. The save as button enables the workflow editor user to save a form, with a different name, to the RFQ/RFP forms database. The reload button enables the workflow editor user to reload data from the corresponding database into the form. For example, data from the bid database 611 can be loaded into the bid form for viewing. The import button enables the workflow editor user to link a database to the form and import data from that database into the form. The delete button enables the workflow editor user to delete a form from the RFQ/RFP forms database. The exit button enables the workflow editor user to exit the WMS.

The purpose of the form design canvas 1511 is to display the form fields that comprise the form. The CCS will display a form when the user is executing a task such as inputting a bid. Each form field requires data to be input by the CCS user or requires automatic input from the CCS. An example of a form field that requires automatic input from the CCS is a timestamp. When the CCS user enters information into a form, the CCS will automatically input the date and time into the timestamp field. This timestamp records the date and time that the user submitted that form.

The workflow editor user can add a default text box field to the form by left clicking a location in the form. The workflow editor user can then right click and the WMS will display a list of options including the option to add a default text box at the selected location on the form. The workflow editor user can then change the default text box into the required form field by editing the parameters for the newly added form field in the parameters window. The workflow editor user can delete a form field by right clicking that form field. The WMS will display a number of options including delete. The workflow editor user can select the delete option to delete the selected form field from the form displayed on the form design canvas.

The purpose of the parameters window 1512 is to enable the workflow editor user to edit the parameters associated with the form field that is selected in the form design canvas. The workflow editor user can select a form field that is displayed in the form design canvas by left clicking that form field. The WMS will then display the parameters for that form field in the parameters window. Then the workflow editor user can edit the parameters for that form field in the parameters window. The workflow editor user can then store the new parameters for that form field in the RFQ/RFP forms database by clicking the apply button 1528. The following section describes the parameters that are available in the parameters window.

The height parameter 1513 enables the workflow editor user to input the required height for the form. The width parameter 1514 enables the workflow editor user to input the required width for the form. The set size button 1515 enables the workflow editor user to save the new size for the form. The caption check box 1516 enables the workflow editor user to specify whether the form will have a title. If the workflow editor user selects the caption check box, the WMS will display a default title on the form design canvas. The WMS allows the workflow editor user to select the title and change the title and its location by changing its parameters in the parameters window. The control parameter 1517 enables the workflow editor user to specify the type of form field that will be displayed in the form. The WMS supports a plurality of field types including a text box, list box, check box, radio button and memo field. This list is exemplary and not intended to be limiting. One skilled in the art will understand the purpose and use of these types of form fields. The name parameter 1518 enables the workflow editor user to input a name for the selected field in the form. The left parameter 1519 enables the workflow editor user to specify the location of the selected form field in terms of its distance from the left edge of the form. The top parameter 1520 enables the workflow editor user to specify the location of the selected form field in terms of its distance from the top edge of the form. The field height parameter 1521 enables the workflow editor user to input the required height of the selected form field. The field width parameter 1522 enables the workflow editor user to input the required width of the selected form field. The default parameter 1523 enables the workflow editor user to input the required default value for the selected form field. The tab index parameter 1524 enables the workflow editor user to input the required tab index to be used for the selected form field. When the CCS user is entering data into the form, the CCS user can click the tab key on the keyboard to move from one field in the form to the next. The tab order is determined by the numeric value entered for each form field that is entered into the tab index parameter. The font name parameter 1525 enables the workflow editor user to input the required text font to be used for the selected form field. The font size parameter 1526 enables the workflow editor user to input the required text size to be used for the selected form field. The font color parameter 1527 enables the workflow editor user to input the required text color to be used for the selected form field. The apply button 1528 enables the workflow editor user to save the new parameters for the selected form field into the RFQ/RFP forms database.

In the preferred embodiment of the present invention, the WMS enables the workflow editor user to create a form by opening a blank form or edit a form by opening an existing form. The workflow editor user can add, edit and delete forms. The workflow editor user can also add, edit and delete form fields within each form. The WMS enables the workflow editor user to open a form that the WMS will display on the form design canvas. The WMS then enables the workflow editor user to select a form field in the form displayed on the form design canvas then edit the parameters for that selected form field. The workflow editor user can then click the apply button in the parameters window to save the updated parameters and the associated form into the RFQ/RFP forms database.

The standard templates and forms for RFPs and RFQs and the RFQ and RFP workflows used by the present invention were created as a collaborative effort by a number of experts in the field. These templates, workflows and forms therefore represent an aggregation of the RFQ and RFP knowledge of these experts. The WMS therefore enables the author to leverage the knowledge of these experts by accessing the RFQ and RFP templates then using the RFQ and RFP workflows as a guide to fill in the blanks in the selected template in accordance with the system operator's preferred method to draft RFQs and RFPs.

The Document Management System ("DMS") 212 is operatively coupled to the Central Control System. Many companies make document management systems including the Documentum system offered by EMC. These systems enable users to collaborate to draft, review, modify and finalize documents. After the DMS vendor installs the DMS, the vendor will configure it for use by the operator. This configuration effort includes technical configuration, workflow configuration and user configuration:

Technical configuration is comprised of operatively coupling the DMS to the CCS.

Figure 16:
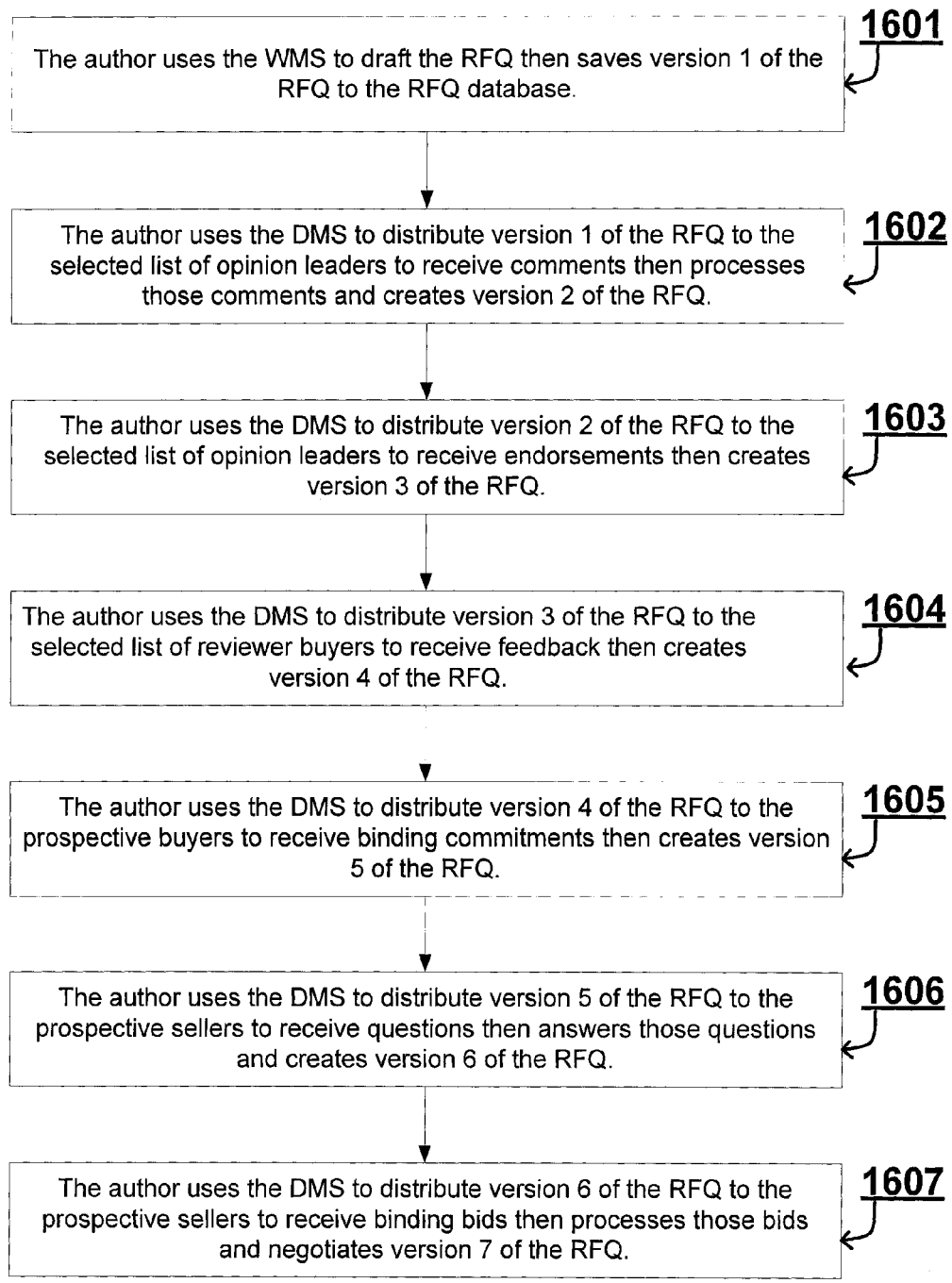
FIG. 16 illustrates a first embodiment of the workflow for the document management system ("DMS").

Workflow configuration is comprised of specifying the key steps in the document life cycle. These key steps are drafting version 1 of the RFQ by the author, creating version 2 in response to receiving comments from opinion leaders, creating version 3 in response to receiving endorsements from opinion leaders, creating version 4 in response to receiving feedback from reviewer buyers, creating version 5 in response to receiving commitments from prospective buyers, creating version 6 in response to receiving questions from prospective sellers, creating version 7 in response to final negotiations with bound sellers. FIG. 16 illustrates the document lifecycle and the coordination between the WMS and the DMS.

The author user uses the WMS to draft version 1 of the RFQ then saves version 1 of the RFQ to the RFQ database 1601.

The author user uses the DMS to distribute version 1 of the RFQ to the selected list of opinion leaders to receive comments 1602. The list of opinion leaders is pre-determined by the author user. The author user processes those comments by reviewing said comments then modifying the RFQ to create version 2 of the RFQ. The author user saves version 2 of the RFQ to the RFQ database.

The author user uses the DMS to distribute version 2 of the RFQ to the selected list of opinion leaders to receive endorsements 1603. Again, the list of opinion leaders is predetermined by the author. The author processes those endorsements by reviewing said endorsements then modifying the RFQ to create version 3 of the RFQ. This modification may be limited to including the number of endorsements and information about the endorsers in the meta data associated with the RFQ. The author saves version 3 of the RFQ to the RFQ database.

The author user uses the DMS to distribute version 3 of the RFQ to the selected list of reviewer buyers to receive feedback 1604. The list of reviewer buyers is pre-determined by the author. The author processes that feedback by reviewing said feedback then modifying the RFQ to create version 4 of the RFQ. The author saves version 4 of the RFQ to the RFQ database.

The author user uses the DMS to distribute version 4 of the RFQ to the list of prospective buyers to receive binding commitments 1605. The list of prospective buyers is predetermined by the author user. The author user processes the binding commitments by reviewing said binding commitments then modifying the RFQ to create version 5 of the RFQ. This change may be limited to including the number of commitments in the meta data associated with the RFQ. The author saves version 5 of the RFQ to the RFQ database.

The author user uses the DMS to distribute version 5 of the RFQ to the list of prospective sellers to receive questions 1606. The list of prospective sellers is pre-determined by the author user. The author user answers the questions then modifies the RFQ and its meta data to create version 6 of the RFQ. The author user saves version 6 of the RFQ to the RFQ database.

The author user uses the DMS to distribute version 6 of the RFQ to the list of prospective sellers to receive binding bids 1607. The list of prospective sellers is pre-determined by the author user. The author user processes the binding bids by reviewing said binding bids then negotiating any final modifications to the RFQ with the bound sellers to create version 7 of the RFQ. The author user saves version 7 of the RFQ to the RFQ database.

User configuration of the DMS includes accessing lists of users from the data storage system, setting up automatic alerts to warn users that the CCS expects them to perform an action, defining the templates and communication channel for the alerts and defining the meta data that will be used to categorize RFQs and facilitate searches.

In the preferred embodiment of the present invention, the operator configures the DMS to extract, transform and load user data from the user databases illustrated in FIG. 6. When the author wants to distribute the RFQ to a list of users, such as opinion leaders, reviewer buyers, prospective buyers and prospective sellers, the DMS will display the list of available users from which the author can select. When the author user submits the RFQ for distribution, the DMS system will alert the users selected by the author user.

The DMS will use each user's preferred communication channel to alert that user that the CCS expects them to perform an action. For example, the DMS can send an email to an opinion leader to instruct that opinion leader that a RFQ is ready for review, or send a voice message to an author user stating that a reviewer buyer has submitted some feedback, or send a text message to a prospective seller to inform that prospective seller that a RFQ is available for bids. Each user specifies the communication channel that they prefer for each type of alert when they sign up in the CCS as a member.

The operator user specifies the template that the DMS will use for each alert message including the template for email messages to each type of user (e.g., the author user, opinion leaders, reviewer buyers, prospective buyers and prospective sellers). For each type of user, the operator user specifies the template for a plurality of other types of alerts including text messages and voice messages.

The operator user specifies the plurality of meta data that the author user can associate with a RFQ. This meta data includes product category, target price range, key features, and timeframe to conclude the transaction. The DMS enables users to use this meta data to search for a target RFQ. For example, the DMS enables users to use logical operators, such as "And" and "Or", to combine meta data when searching for an RFQ. For example, a user may search for an RFQ where the "product category"="computer" AND "target price"="less than $500" AND "hard drive capacity">"400 GB". This will enable the user to find all RFPs for computers where the price is less than $500 and the hard drive capacity is more than 400 GB.

The Payment Processor System ("PPS") 213 is operatively coupled to the Central Control System. Many companies offer Payment Processor services including the Western Union and Paypal. When the author user accepts a binding bid from a prospective seller and the terms and conditions of the transaction are finalized, the CCS initiates the procedure to exchange payment for the goods and services. The CCS sends the buyer's payment information to the Payment Processor. In an operation that usually takes less than a minute, the payment processor will check the buyer's details then forward those details to the buyer's bank or credit card association for verification. The payment processor will also implement a plurality of anti fraud measures. The buyer's bank will then confirm or deny the verification request. If the buyer's bank denies the verification request then the Payment Processor forwards the denial to the seller's bank and the seller's bank will decline the transaction. The CCS will then ask the buyer for an alternative payment method. If the buyer's bank confirms the verification request, the Payment Processor forwards the confirmation to the seller's bank and the seller's bank will complete the transaction. The payment processor will then move the funds from the buyer's bank to the seller's bank.

Given the sensitive nature of each buyer's payment information, the communication channel between the CCS and the payment processor must be secure. A plurality of methods can be used to provide secure communications over an insecure communication channel, such as the Internet, including Hypertext Transfer Protocol Secure (HTTPS). The communication between the CCS and the payment processor is encrypted using standard cryptography technology. The payment processor distributes a public key to the operator of the CCS and keeps the related private key. The public key is used to encrypt the information that the CCS sends to the payment processor. The payment processor then uses the private key to decrypt the information. However, the operator requires a method to validate that the destination really is the payment processor. A trusted third party, such as Verisign or Comodo, provides this service by issuing a digital certificate to the payment processor and also issuing a digital certificate to the operator of the CCS. Before sending the buyers information to the payment processor, the CCS will use the payment processor's public key to encrypt the buyer's information then will verify the destination by validating the payment processor's digital certificate. If the certificate is not valid then the CCS will display a warning message. The cryptographic keys used by the present invention are stored in the payment processor system. These cryptographic keys help guarantee the authenticity of the systems used by buyers to commit to RFQs and help guarantee the authenticity of the systems used by sellers to submit bids. The system operator also uses conventional business methods to authenticate the ability of suppliers to provide specific types of good and services when the supplier signs up as a member. This includes reviewing company documentation, such as annual reports, and reviewing information from third parties such as rating agencies, independent comparison organizations and existing customers. The system operator repeats the review process for each supplier on a regular basis to ensure the information remains current. The payment processor system also stores information about the escrow accounts that the present invention can use as a staging location for funds being transferred between buyers and sellers.

Preferred Embodiment of the Present Invention

Figure 17:
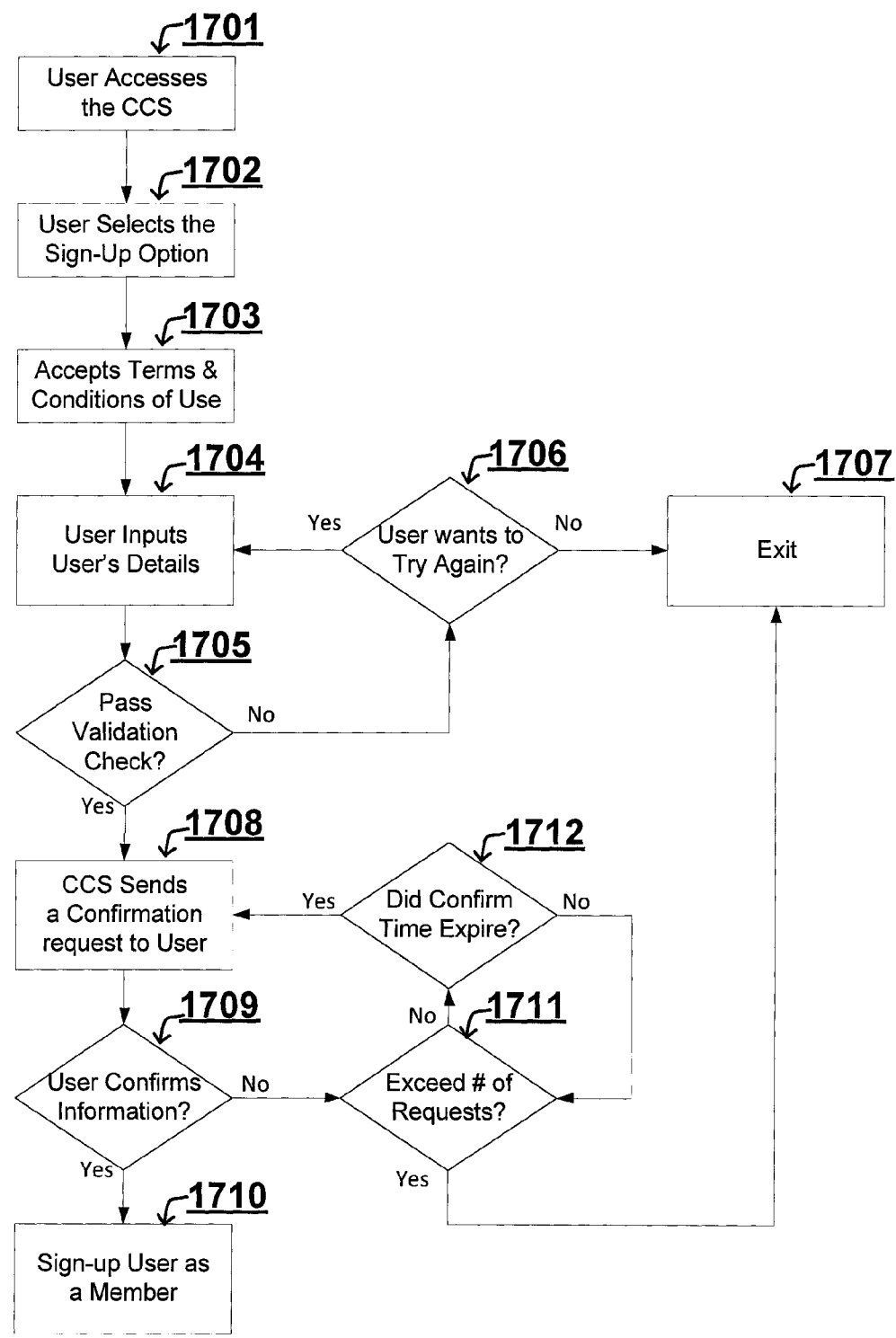
FIG. 17 illustrates a first embodiment of the sign-up procedure for the present invention.
Figure 18:
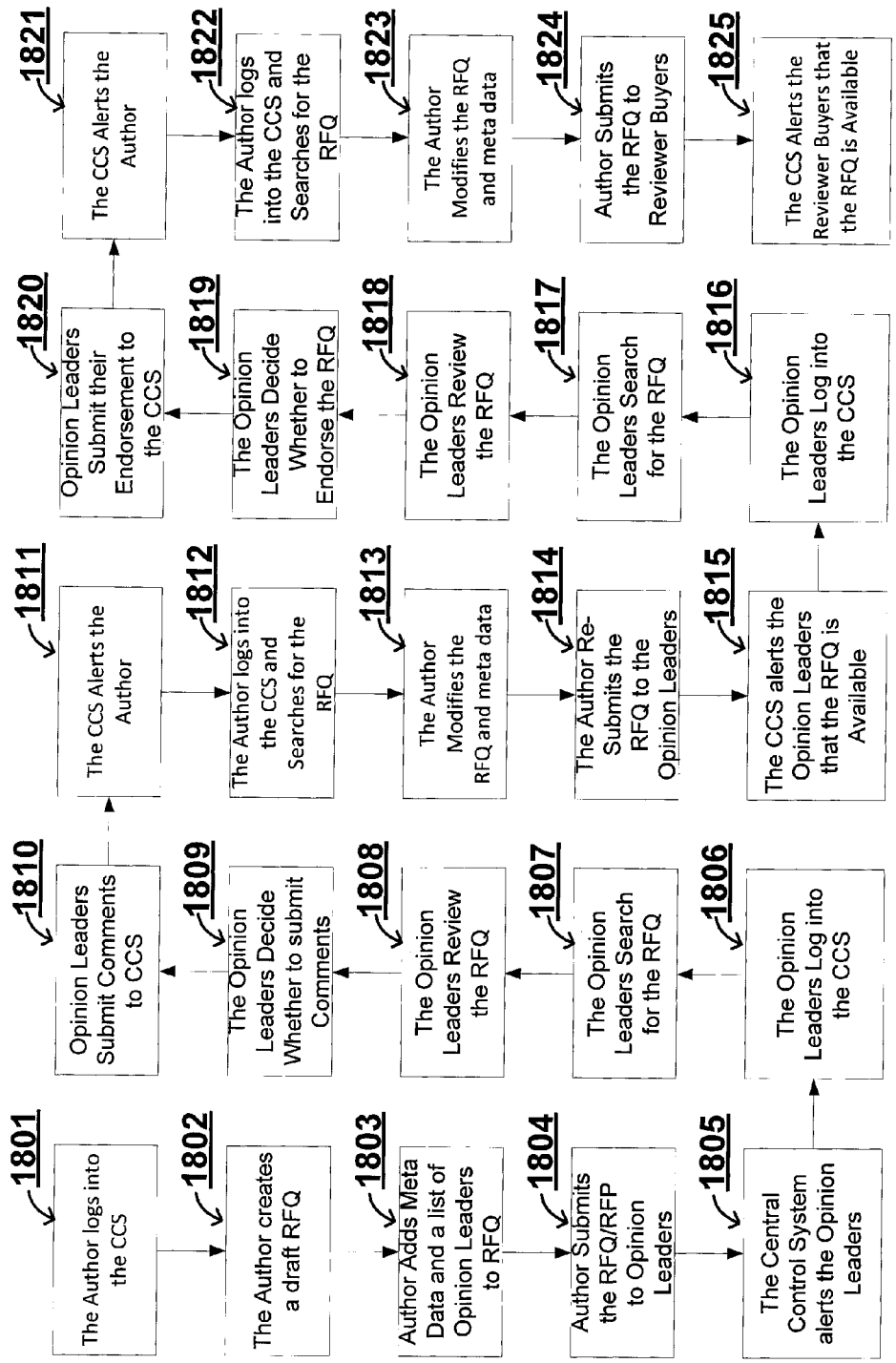
FIG. 18 illustrates the first section of the preferred embodiment of the present invention.
Figure 19:
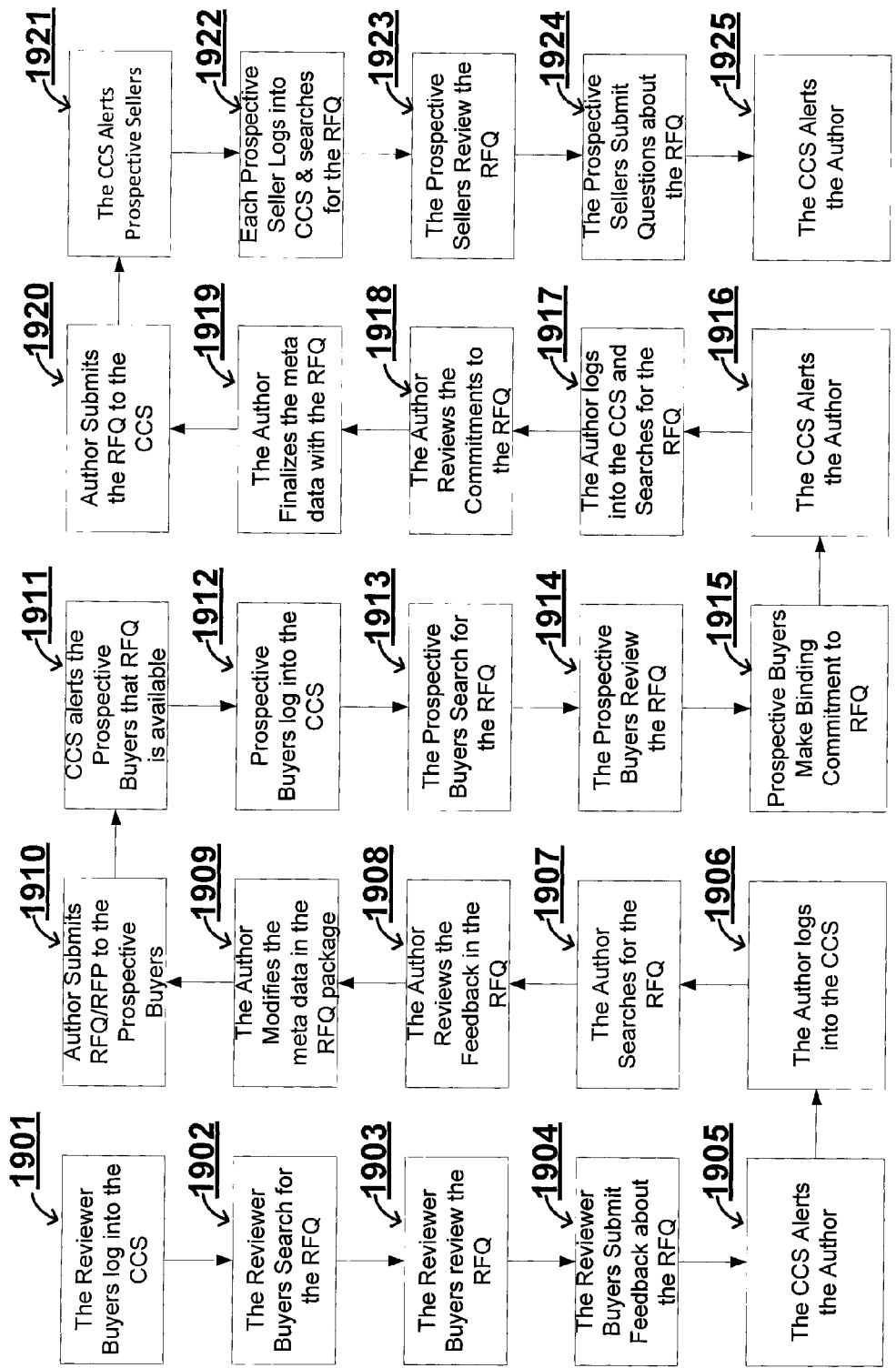
FIG. 19 illustrates the second section of the preferred embodiment of the present invention.
Figure 20:
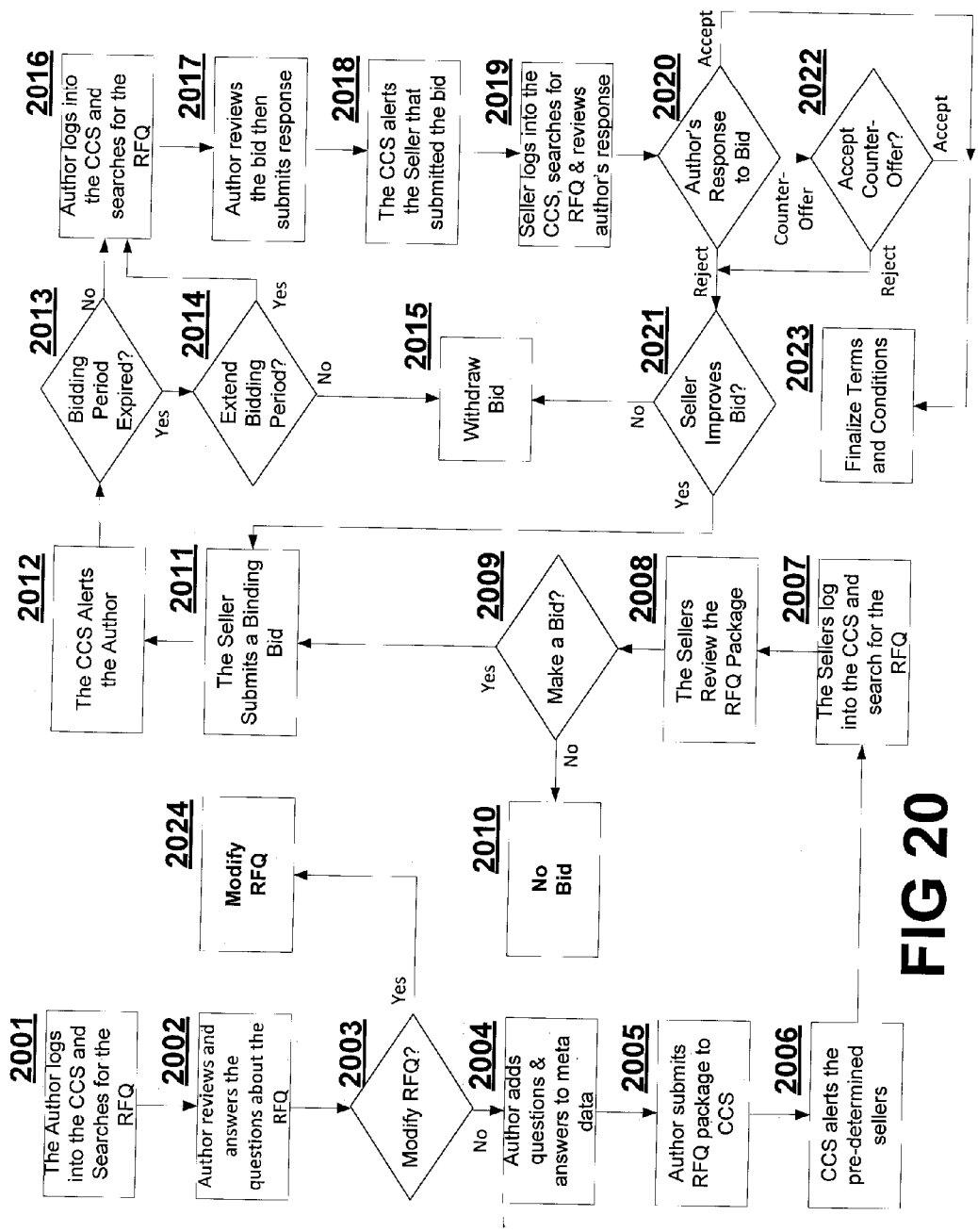
FIG. 20 illustrates the third section of the preferred embodiment of the present invention.
Figure 21:
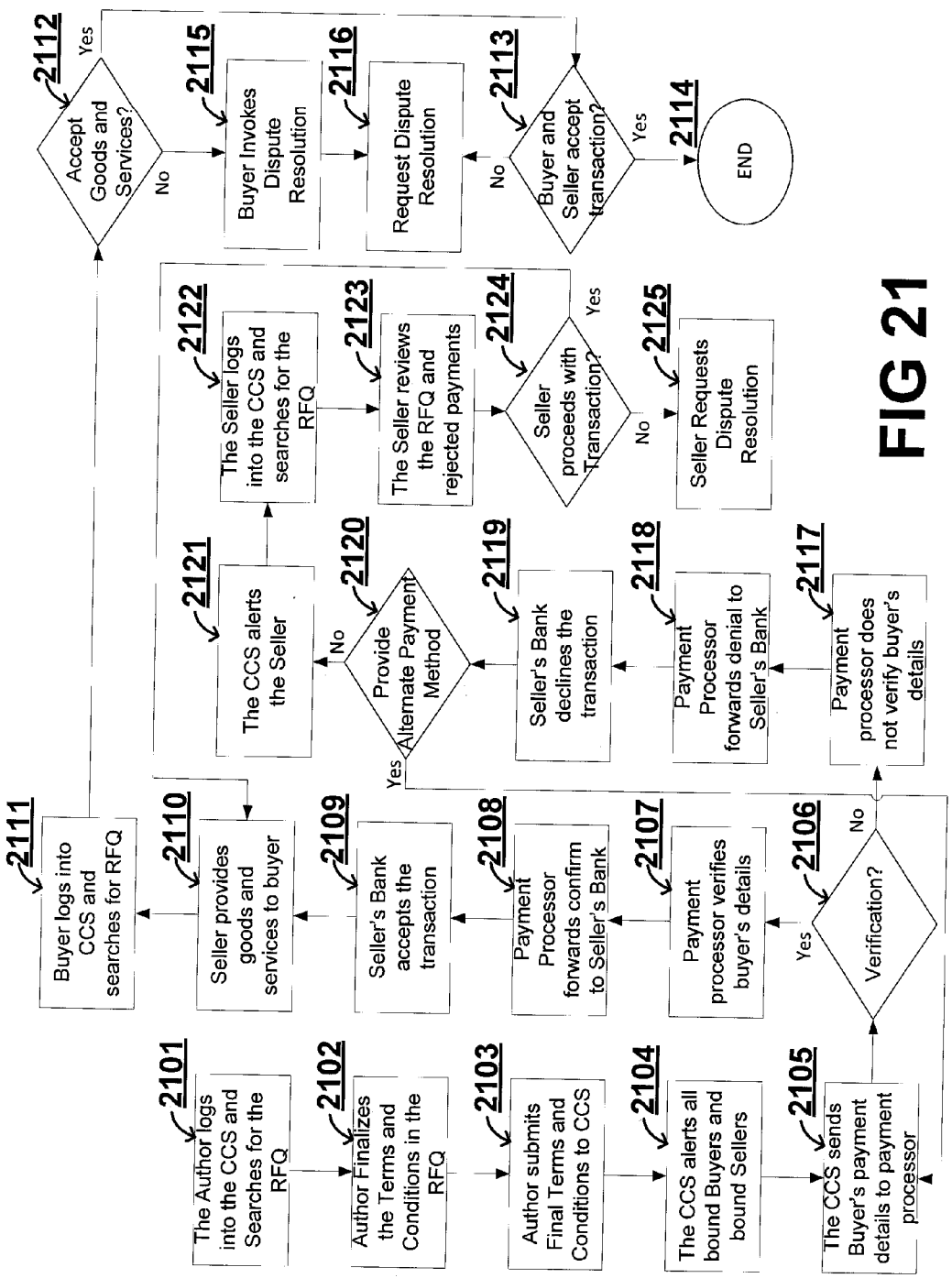
FIG. 21 illustrates the fourth section of the preferred embodiment of the present invention.

The preferred embodiment of the apparatus and method of the present invention is illustrated in FIG. 17, FIG. 18, FIG. 19, FIG. 20, FIG. 21, FIG. 22 and FIG. 23. FIG. 17 illustrates the procedure for users to sign-up as members. FIG. 18 illustrates the preferred method to draft an RFQ, obtain endorsements from opinion leaders then distribute the RFQ to reviewer buyers. FIG. 19 illustrates the preferred method to process comments from selected reviewer buyers, obtain binding commitments from prospective buyers and receive questions from prospective sellers. FIG. 20 illustrates the preferred method to respond to questions from prospective sellers, obtain binding bids from prospective sellers, respond to binding bids and finalize terms and conditions. FIG. 21 illustrates the preferred method to process payments, accept goods and services and submit a dispute for resolution. FIG.

Figure 23:
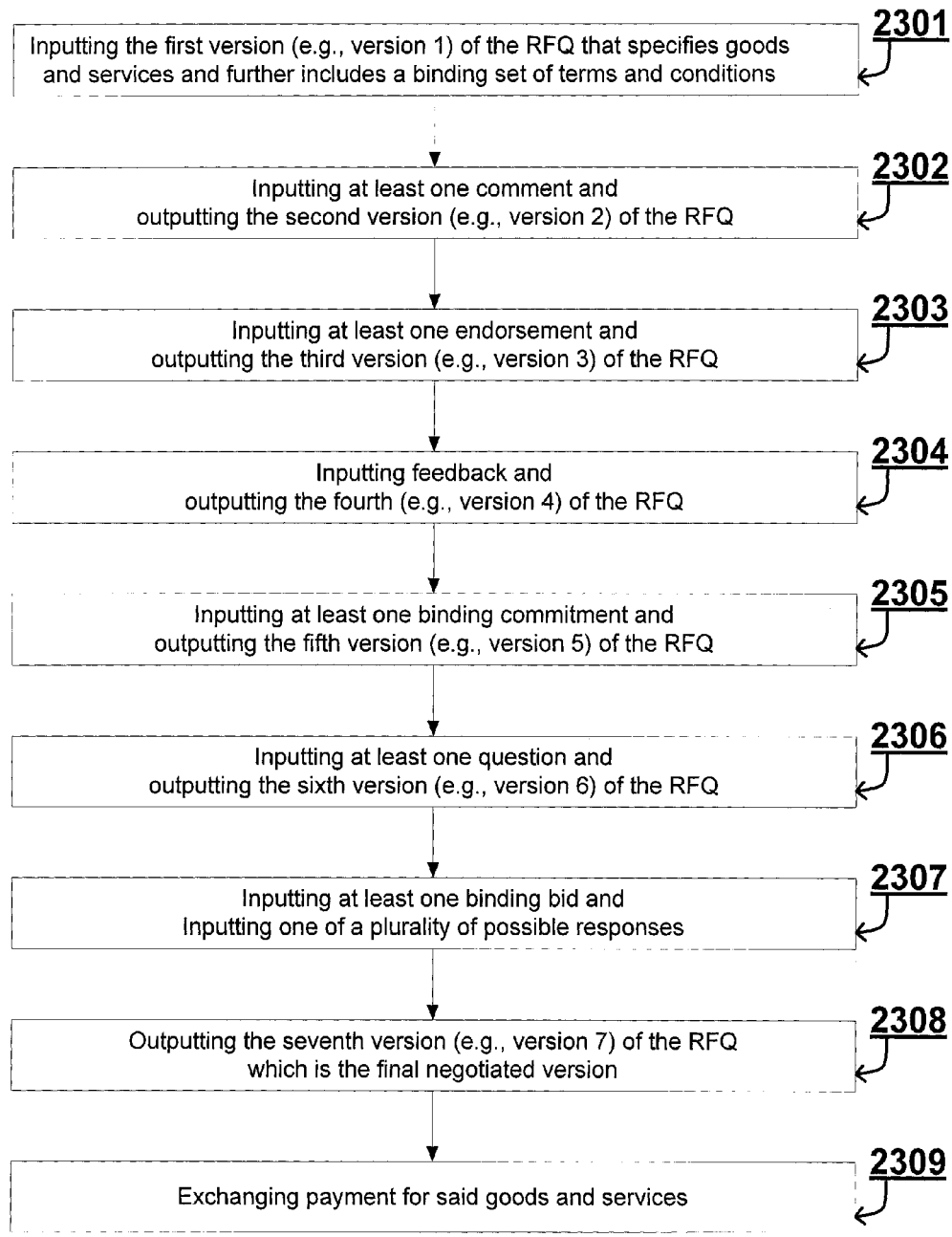
FIG. 23 illustrates an overview of the preferred embodiment of the present invention.

22 illustrates the preferred method for dispute resolution. FIG. 23 is a high level overview of the key steps in the present invention.

The present invention enables users to sign-up as members by following the procedure illustrated in FIG. 17. The user accesses the CCS 1701 then selects the sign-up option 1702. The user then accepts the pre-determined terms and conditions of use 1703. The user then inputs the requested user details 1704. These details include name, contact information, user name, password and the other information specified above for the user databases illustrated in FIG. 6. When the user accesses the CSS after signing up as a member, that user will have to input the user name and password to log into the CCS. The CCS checks the information entered by the user at step 1704 for completeness. If the information is incomplete 1705, the CCS will offer the user the opportunity to complete the information 1706. If the user chooses to try again to complete the information, the CCS returns to step 1704. If the user chooses not to complete the sign up information, the CCS exits the sign-up procedure 1707.

If the information entered by the user is complete 1705, the CCS sends a confirmation request to the user 1708. The CCS will send this confirmation request to the email address entered by the user at step 1704. The CCS asks the user to confirm receipt of this request If the user confirms receipt of the confirmation request as requested by the CCS, the CCS will sign-up the user as a member 1710. If the user does not confirm receipt of the confirmation request, the CCS will determine whether the pre-determined maximum number of reminder requests have been exceeded 1711. If the CCS has already sent the pre-determined maximum number of confirmation requests, then the CCS will exit the sign-up procedure 1707. If the CCS has sent fewer than the pre-determined maximum number of confirmation requests, then the CCS will determine whether the pre-determined wait time has been exceeded 1712 before sending another confirmation request to the user. When the pre-determined wait time between reminders has been exceeded 1712, the CCS will send another confirmation request to the user 1708. This will return the CCS to step 1708 in the sign-up procedure.

FIG. 18 illustrates the procedure for author users to draft an RFQ, obtain endorsements from opinion leaders then distribute the RFQ to reviewer buyers.

To create version 1 of an RFQ, the author logs into CCS 1801. The author uses the WMS to draft the RFQ 1802 then saves version 1 of the RFQ in the RFQ database. The author then uses the DMS to access the RFQ and add meta data to the RFQ. This meta data includes a list of opinion leaders 1803. The author uses the DMS to select a list of opinion leaders then submits version 1 of the RFQ to that list of opinion leaders 1804. The CCS alerts the selected opinion leaders 1805 that version 1 of the RFQ is available for review. The alert includes information that helps each selected opinion leader locate the RFQ.

Each of the selected opinion leaders logs into the CCS 1806 then searches for version 1 of the RFQ 1807 specified in the alert message. Each of the selected opinion leaders reviews version 1 of the RFQ 1808 then decides whether to submit any comments 1809. Each of the selected opinion leaders then submits their comments to the CCS 1810. An opinion leader submits comments by filling in a comments form that is displayed by the CCS. The operator user creates the comments form. The comments form includes fields such as opinion leader identification information, RFQ identifier and opinion leader comments. The CCS alerts the author when any of the selected opinion leaders submits a comment about the specified RFQ 1811.

The author logs into the CSS and searches for version 1 the RFQ 1812 then modifies the RFQ 1813 in response to the comments received from the opinion leaders. The author then submits version 2 of the RFQ 1814 to the selected opinion leaders and requests their endorsement. The CCS alerts the selected opinion leaders and lets them know that version 2 of the RFQ is available for review 1815.

Each of the selected opinion leaders logs into the CCS 1816 then searches for version 2 of the RFQ 1817. Each selected opinion leader reviews version 2 of the RFQ 1818, decides whether to endorse the RFQ 1819 then submits an endorsement 1820 or decides not to endorse the RFQ. The CCS alerts the author when a selected opinion leader submits an endorsement 1821.

The author logs into the CSS and searches for version 2 of the RFQ 1822 then modifies the RFQ and the meta data in the RFQ package 1823 to include information about the endorsements received from opinion leaders. The author then uses the DMS to select a list of reviewer buyers then submits version 3 of the RFQ package 1824 to the selected reviewer buyers for feedback. The CCS alerts the selected reviewer buyers and lets them know that version 3 of the RFQ is available for review 1825.

FIG. 19 illustrates the procedure for authors to process comments from selected reviewer buyers, obtain commitments from prospective buyers and receive questions from prospective sellers.

In response to an alert from the CCS, each of the selected reviewer buyers logs into the CCS 1901 then searches for version 3 of the RFQ 1902. Each selected reviewer buyer reviews the RFQ 1903 then submits feedback about version 3 of the RFQ 1904 to the CCS. A reviewer buyer submits feedback by filling in a feedback form that is displayed by the CCS. The feedback form includes fields such as prospective buyer identification information, RFQ identifier and buyer feedback. The operator user creates the feedback form. The CCS alerts the author whenever a selected reviewer buyer submits any feedback 1905.

The author logs into the CSS 1906, searches for version 3 of the RFQ 1907, reviews the feedback from the reviewer buyers 1908 then modifies the RFQ and the meta data associated with the RFQ 1909 in response to the feedback received from the reviewer buyers. The author then uses the DMS to select a list of prospective buyers then submits version 4 of the RFQ package to that list of selected prospective buyers 1910 to request their binding commitment to the RFQ. The CCS alerts the selected prospective buyers and lets them know that version 4 of the RFQ is available for review 1911.

Each of the selected prospective buyers log into the CCS 1912 then searches for version 4 of the RFQ 1913. Each of the selected prospective buyers reviews version 4 of the RFQ 1914, decides whether to make a binding commitment to the RFQ then submits a binding commitment 1915 or decides not to make a binding commitment to the RFQ. A prospective buyer submits a binding commitment by filling in a commitment form that is displayed by the CCS. The operator user creates the commitment form but the author determines which fields must be completed for each RFQ. The commitment form includes fields such as buyer identification information, RFQ identifier, commitment price, features required and expected delivery timeframe. Most of these options are specified by the author and accepted by the buyer. The CCS alerts the author when a selected prospective buyer submits a binding commitment 1916.

The author logs into the CSS and searches for version 4 the RFQ 1917, reviews the binding commitments from the prospective buyers 1918 then finalizes the meta data associated with the RFQ 1919 to include the number of binding commitments from the prospective buyers. The author then uses the DMS to select a list of prospective sellers then submits version 5 of the RFQ package to the CCS 1920. The CCS alerts the pre-determined list of prospective sellers and lets them know that version 5 of the RFQ is available for bid 1921.

Each pre-determined prospective seller logs into the CCS then searches for version 5 of the RFQ 1922. Each pre-determined prospective seller reviews version 5 of the RFQ 1923, decides whether to ask any questions about the RFQ then submits those questions 1924. A prospective seller submits questions by filling in a questions form that is displayed by the CCS. The operator user creates the questions form. The questions form includes fields such as seller identification information, RFQ identifier and seller questions. The CCS alerts the author when a pre-determined prospective seller submits a question in response to version 5 of the RFQ 1925. The author determines the amount of time that is available for prospective sellers to ask questions.

FIG. 20 illustrates the procedure for authors to respond to questions from prospective sellers, obtain binding bids from prospective sellers, respond to binding bids and finalize terms and conditions.

The author logs into the CSS and searches for version 5 of the RFQ 2001 then reviews and answers questions about the RFQ from prospective sellers 2002. The author then decides whether to return to an earlier step in the procedure 2003 and modify the RFQ or proceed and add the questions and answers to the RFQ's meta data 2004. If the author decides to modify the RFQ 2024, that author can choose to return to any one of a plurality of modification steps including 1802, 1813, 1823 and 1909. The author determines the return step based on the extent of the modifications that are required. If the author decides to proceed rather than modify the RFQ, the author submits the updated RFQ package (e.g., RFQ and meta data) to the CCS 2005. However, before submitting version 6 of the RFQ package to prospective sellers with the questions and answers, the author can have the package reviewed by any reviewer selected by the author. In addition, an operator user will review version 6 of the RFQ before it is published to ensure it conforms with the policies of the system operator. After the author submits version 6 of the RFQ package and the system operator accepts it, the CCS will change the status of the RFQ to open. This indicates that the RFQ is open for bids. The CCS also alerts the pre-determined list of prospective sellers 2006.

Each pre-determined prospective seller logs into the CCS then searches for version 6 of the RFQ 2007. Each pre-determined prospective seller reviews version 6 of the RFQ package 2008 then decides whether to make a binding bid in response to the RFQ 2009 then submits a binding bid 2011 or decides not to make a binding bid 2010 in response to the RFQ. A seller submits a binding bid by filling in a bid form that is displayed by the CCS. The operator user creates the bid form but the author determines which fields must be completed for each RFQ. The bid form includes fields such as supplier identification information, RFQ identifier, bid price, features included and delivery timeframe. The CCS alerts the author when a pre-determined prospective seller submits a binding bid in response to the RFQ 2012.

The CCS checks whether the pre-determined bidding period has expired 2013. The author determines the bidding period when the RFQ is first drafted 1802.

If the bidding period has expired 2013, the author will decide whether to extend the bidding period 2014. The author can add an option to extend the bidding period when the RFQ is drafted. If the author decides to extend the bidding period in accordance with the terms and conditions in version 6 of the RFQ, the workflow goes to step 2016 in the procedure. If the bidding period has expired and the author decides not to extend the bidding period then the CCS will withdraw all bids submitted after the bidding period expired 2015.

If the bidding period has not expired 2013, the author will log into the CCS and search for version 6 of the RFQ 2016.

The author reviews the bid then submits a response to the CCS 2017. The CCS alerts the prospective seller that the author has submitted a response to that prospective seller's bid 2018. The prospective seller who submitted the bid logs into the CCS, searches for version 6 of the RFQ and reviews the author's response to that prospective seller's bid 2019.

If the author rejected the bid 2020 then the prospective seller can decide whether to improve the bid 2021. If the seller decides to improve the bid then the workflow returns to step 2011 in the procedure. If the seller decides not to improve the bid then the CCS withdraws the bid 2015.

If the author accepts the bid 2020 then the author will finalize the terms and conditions in version 7 of the RFQ 2023. When the author accepts a bid, that author can change the status of the RFQ to one of a number of options including under offer and closed. The author can also leave the status of the RFQ as "open" if more bids are required to meet the committed demand. The CCS also has a background task that reviews the expiration dates of all RFQs then changes the status of any RFQ to closed if it the expiration date has passed. Version 7 of the RFQ can be signed electronically or using a wet signature. The author will specify the signature method in version 7 of the RFQ. U.S. Pat. No. 5,191,613 teaches a method for legally enforceable contracts.

If the author made a counter-offer in response to the prospective seller's bid 2022 then that prospective seller can decide whether to accept or reject the counter-offer. If that prospective seller decides to reject the counter-offer then the workflow returns to step 2021 in the procedure. If the prospective seller decides to accept the counter-offer then the workflow proceeds to step 2023 in the workflow.

FIG. 21 illustrates the procedure for the author to finalize the terms and conditions, for the CCS to submit the payment information to the bound sellers, for the bound buyers to receive the desired goods and services and for the bound buyers and bound sellers to accept the transaction or submit a dispute for resolution.

The author logs into the CSS and searches for version 6 of the RFQ 2101 then finalizes the terms and conditions 2102 and creates version 7 of the RFQ. The author submits the final terms and conditions to the CCS 2103 then the CCS alerts all buyers and sellers that are bound by the RFQ 2104. If a bound buyer or bound seller believes that version 7 of the RFQ does not comply with the version that they reviewed then they can submit a dispute for resolution by the independent arbitrator. If version 7 of the RFQ is in compliance (e.g., a dispute is not submitted), then the CCS sends the buyer's payment details to the payment processor 2105 for verification 2106.

If the payment processor verifies the bound buyer's details 2107 then the payment processor will forward the confirmation to the bound seller's bank 2108 and the bound seller's bank will accept the transaction 2109. The bound seller will then provide the goods and services to the bound buyer in accordance with the terms and conditions in version 7 of the RFQ 2110. After the bound buyer receives the goods and services, the bound buyer will then log in to the CCS and search for version 7 of the RFQ 2111. The bound buyer will then indicate whether that bound buyer accepts the goods and services 2112.

If the bound buyer accepts the goods and services then the CCS will determine whether the bound seller accepts the payment 2113. If both the bound buyers and bound sellers accept the transaction then the CCS will close out the transaction 2114. If the bound sellers do not accept the payment 2113 then the CCS will invoke the dispute resolution procedure 2116.

If the bound buyers do not accept the goods and services 2112 then a bound buyer can invoke the dispute resolution procedure 2115.

If the payment processor does not verify 2106 a bound buyer's payment details 2117 then the payment processor forwards the denial to the bound seller's bank 2118 and the bound seller's bank will decline the transaction 2119. The CCS will offer the bound buyer the opportunity to use an alternative payment method 2120. If the bound buyer offers an alternative payment method then the workflow will return to step 2105 in the procedure. If the bound buyer does not offer an alternative payment method then the CCS will alert the bound seller 2121. The bound seller will log in to the CCS then search for version 7 of the RFQ 2122. The bound seller will review the RFQ and the rejected payments 2123 then decide whether to proceed or invoke the dispute resolution process 2124.

If the bound seller decides to proceed with the transaction 2124 then the CCS will go to step 2110.

If the bound seller decides not to proceed with the transaction 2124 then the seller will invoke the dispute resolution procedure 2125.

Figure 22:
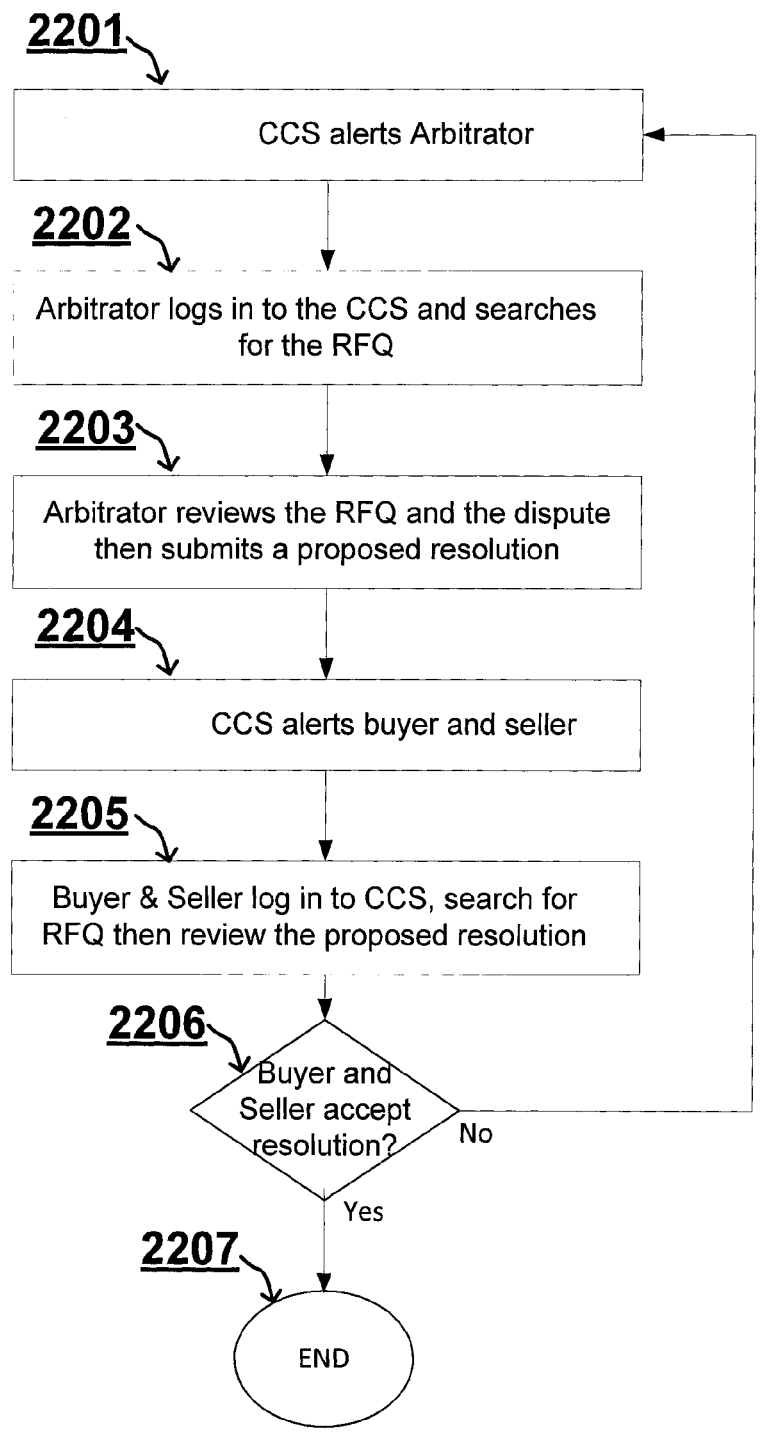
FIG. 22 illustrates a first embodiment of the dispute management procedure for the present invention.

FIG. 22 illustrates the dispute resolution procedure. If the buyer, seller or CCS invokes the dispute resolution procedure, the CCS will alert the arbitrator 2201 in accordance with the terms and conditions in version 7 of the RFQ. A user submits a dispute by filling in a dispute form that is displayed by the CCS. The operator user creates the dispute form. The dispute form includes fields such as supplier identification information, buyer identification information, RFQ identifier and reason for dispute. The arbitrator will log into the CCS and search for version 7 of the RFQ 2202. The arbitrator will then review version 7 of the RFQ and the dispute then submit a proposed resolution to the CCS 2203. The CSS will alert all affected bound buyers and all affected bound sellers who are bound by the version 7 of the RFQ 2204. Each affected bound buyer and each affected bound seller who will log into the CCS, search for version 7 of the RFQ and review the proposed resolution submitted by the arbitrator 2205. If all affected bound buyers and all affected bound sellers accept the resolution submitted by the arbitrator 2206 then the CCS will close out the transaction 2207. If all affected bound buyers and all affected bound sellers do not accept the proposed resolution submitted by the arbitrator 2206 then the workflow will return to step 2201 in the procedure.

The present invention can be used for RFPs as well as RFQs. The main differences in the preferred embodiment are in the following steps; RFQ template, RFQ workflow, seller questions, author's answers to seller's questions, bid acceptance by author and the finalization of terms and conditions.

The operator user will create an RFP template that is different to the RFQ template described above. As explained above, the RFP template is organized to specify a set of general requirements for the desired goods and services. The expectation is that the bid from suppliers will propose a solution that meets the general requirements specified in the RFP. Conversely, the RFQ template is organized to specify the required goods and services not request a proposal. Despite these different objectives, both the RFQ and RFP templates include similar standard terms and conditions.

The operator user will create an RFP workflow that will be different to the RFQ workflow described above. The RFP workflow will guide the author through the system operator's preferred method to fill in the blanks in the RFP template. Again, the information that the author will input into the template will include a list of general requirements.

In general, after the RFP is published, the questions from sellers will be substantially different to the questions from sellers for RFQs. For RFQs, the seller's questions will focus on the seller's variations to actual specifications in the RFQ. For RFPs, the seller's questions will focus on trying to determine whether the probable features of the seller's proposal will meet the general requirements specified in the RFP. Given that the questions will be substantially different, the author's answers for RFPs will also be substantially different to the author's answers for RFQs.

Before accepting a RFP bid from at least one seller, the author will implement a different comparison and analysis procedure compared with RFQs. In general, when assessing RFQ bids, the author will determine how many of the specified requirements are met by each seller's bid. The author will also take into account the amount by which each requirement is exceeded or deficient. An author may accept a bid that meets or exceeds the requirements without waiting for further bids. For RFPs, the author will tend to compare bids to determine the preferred method to meet the general requirements before accepting one or more bids. For RFQs, the author will often know the preferred requirements before the RFQ is published. For RFPs, the author may not know all of the preferred requirements until multiple bids have been received.

When finalizing the terms and conditions for an RFQ, the changes will focus on adding details about the bound buyers and bound sellers and adding minor changes to the requirements. When finalizing the terms and conditions for an RFP, the changes will focus on adding the seller's proposed solutions to each general requirement in addition to adding details about the bound buyers and bound sellers.

To one skilled in the art, it will be apparent that the differences between RFPs and RFQs stated above can be supported within the preferred embodiment of the present invention.

FIG. 23 illustrates a high level summary of the preferred embodiment of the present invention. The author drafts the RFQ 2301 by filling in the blanks in the RFQ template. The WMS is the means for the operator user to create the RFQ workflow. The WMS is also the means for the author to execute the RFQ workflow. The WMS enables the author to open a RFQ template, fill in the blanks then save the first version (e.g., version 1) of the RFQ. The DMS is the means to alert the pre-determined opinion leaders that version 1 of the RFQ is available for review, enable the opinion leaders to review version 1 of the RFQ and submit comments 2302. The DMS is also the means to alert the author that one or more opinion leaders have submitted one or more comments and enable the author to review the comments. The CCS is the means to aggregate comments that have been input into the CCS by opinion leaders. The WMS is the means to enable the author to modify the RFQ and create the second version (e.g., version 2) of the RFQ. The DMS is the means to output version 2 of the RFQ.

The DMS is the means to alert the pre-determined opinion leaders that the version 2 of the RFQ is available for review, enable each opinion leader to review version 2 of the RFQ and input an endorsement into the CCS 2303. The CCS is the means to aggregate endorsements that have been input into the CCS by opinion leaders. The DMS is the means to alert the author that at least one opinion leader has input an endorsement and to enable the author to review each endorsement. The WMS is the means to enable the author to modify the RFQ and create the third version (e.g., version 3) of the RFQ. The DMS is the means to output version 3 of the RFQ.

The DMS is the means to alert the pre-determined reviewer buyers that version 3 of the RFQ is available for review, enable the reviewer buyers to review version 3 of the RFQ and input feedback into the CCS 2304. The CCS is the means to aggregate feedback that has been input into the CCS by reviewer buyers. The DMS is the means to alert the author that at least one reviewer buyer has input some feedback and to enable the author to review the feedback. The WMS is the means to enable the author to modify the RFQ and create the fourth version (e.g., version 4) of the RFQ. The DMS is the means to output version 4 of the RFQ.

The DMS is the means to alert the pre-determined prospective buyers that version 4 of the RFQ is available for review and enable the prospective buyers to review said version 4 of the RFQ. The CCS is the means for each prospective buyer to input a binding commitment 2305. The CCS is the means to aggregate binding commitments that have been input into the CCS by prospective buyers. The CCS is also the means to save the list of buyers, in the data storage system, which are committed to the RFQ. The CCS is the means to alert the author that at least one prospective buyer has input a binding commitment and to enable the author to review each binding commitment. The WMS is the means to enable the author to modify the RFQ and create the fifth version (e.g., version 5) of the RFQ. The DMS is the means to output version 5 of the RFQ.

The DMS is the means to alert the pre-determined prospective sellers that version 5 of the RFQ is available for review and enable the prospective sellers to review said version 5 of the RFQ. The CCS is the means for a prospective seller to input one or more questions about the RFQ 2306. The CCS is the means to aggregate questions that have been input into the CCS by prospective sellers. The DMS is the means to alert the author that at least one prospective seller has input at least one question about the RFQ. The WMS is the means to enable the author to modify the RFQ and create the sixth version (e.g., version 6) of the RFQ. The DMS is the means to output version 6 of the RFQ.

The DMS is the means to alert the pre-determined prospective sellers that version 6 of the RFQ is available for review and enable the prospective sellers to review said version 6 of the RFQ. The CCS is the means for a prospective seller to input a binding bid 2307. It is also the means to save the list of sellers who have input a binding bid. The CCS is the means to aggregate binding bids that have been input into the CCS by prospective sellers. The DMS is the means to alert the author that at least one prospective seller has input at least one binding bid. The CCS is also the means to enable the author to input one of many possible responses to a binding bid including accept the bid, reject the bid or make a counter-offer. The CCS is also the means to enable a prospective seller to accept or reject a counter-offer and store the list of bound sellers who have submitted an accepted bid or have accepted a counter-offer. The CCS and DMS are therefore the means for a prospective seller to submit a bid and for the author to input one of a plurality of possible responses to said binding bid.

When a bid or counter-offer is accepted, the author and the bound sellers negotiate the final terms and conditions of the RFQ within the limitations stated in the RFQ. The WMS is the means for the author to modify the RFQ to create the seventh version (e.g., version 7) of the RFQ. The DMS is the means for the author to output version 7 of the RFQ 2308. The committed buyers and sellers are bound by version 7 of the RFQ.

The CCS is the means to facilitate the exchange of payment for goods and services 2309. The CCS is operatively coupled to the payment processor. The CCS is the means for the bound buyers to input their acceptance of the goods and services and the CCS is the means for the bound sellers to input their acceptance of payment for the goods and services.

The present invention has a plurality of potential revenue streams including a percentage of all transactions consummated, a membership fee for selected users, advertising and selling access to trend information generated by the business intelligence system. Payments can be made using a plurality of methods including credit cards, debit cards, electronic funds transfer, digital cash, checks and barter. In the case of barter, the author will specify the first goods and services to be used as payment in the RFQ, buyers will make a binding commitment to provide said first goods and services as payment then the seller will make a binding bid that includes a commitment to accept said first goods and services as payment for the desired second goods and services. In addition, a plurality of options exist for the timing of payments for goods and services including payments in advance that can be escrowed by the system operator, deliverable based payments, non-refundable payments, payment when the goods and services are accepted and partial payments such as fixed percentages as the transaction progresses. The author can also choose to block funds on a credit card when the buyer makes a binding commitment. Blocking funds is a service provided by payment processors and is a standard practice for hotels and rental car companies. The funds will then be available and transferred in accordance with the payment terms in the RFQ. In the event that the resolution of a dispute results in a refund, payments will be refunded using the same method that was used to make the payment. It will be evident to one skilled in the art that the present invention can also be implemented using a combination of methods that exclude a global data network such as phone communication, email, postal mail, fax and facilitation of transactions by customer service representatives. It will also be evident to one skilled in the art that one or more of the steps in the preferred method can be eliminated in specific situations without affecting the usefulness of the present invention. For example, many of the different versions of the RFQ may be the same if the author user decides to add comments, feedback and answers to questions to the RFQ's meta data rather than the body of the RFQ.

Anyone skilled in the art will recognize that the method and apparatus of the present invention has many applications and advantages, and that the present invention is not limited to the representative examples and variations disclosed herein. In addition, the scope of the present invention covers conventional variations and modifications, to the components of the present invention, which are known to those who are skilled in the art.

I claim:

1. A method for aggregating demand for a request for quotation that includes a plurality of terms and conditions for at least one of:
   a. a buyer specified good; and
   b. a buyer specified service;
   comprising:
   a. inputting said request for quotation into a communication machine, the input of said request for quotation being comprised of;
      a) inputting a predetermined request for quotation template that includes a plurality of standard terms and conditions and further includes a plurality of blank spaces to be filled in to specify said buyer specified goods and services and further includes a plurality of additional blank spaces to be filled in to specify a plurality of additional terms and conditions for said buyer specified goods and services, said request for quotation template being stored in a request for quotation template database by a workflow management system module of said communication machine;

b) inputting a request for quotation workflow to fill in said plurality of blank spaces and said plurality of additional blank spaces in said request for quotation template, said request for quotation workflow being input by configuring a plurality of commands provided by said workflow management system module of said communication machine;

c) executing said request for quotation workflow to create a first version of said request for quotation that includes a binding set of terms and conditions, the execution of said request for quotation workflow being responsive to the input of said request for quotation workflow, said execution of said request for quotation workflow comprising the execution of said plurality of commands provided by said workflow management system module of said communication machine;

d) inputting a plurality of meta data about said request for quotation including information about a plurality of opinion leaders, the input of said plurality of meta data including information about said plurality of opinion leaders being responsive to said execution of said request for quotation workflow;

e) submitting said first version of said request for quotation to said plurality of opinion leaders, the submission of said first version of said request for quotation being responsive to said input of said plurality of meta data including information about said plurality of opinion leaders, further a central control system module of said communication machine generates a first alert to said plurality of opinion leaders in response to said submission of said first version of said request for quotation;

f) inputting at least one comment about said request for quotation, the input of a comment about said request for quotation by at least one of said plurality of opinion leaders being responsive to said first alert;

g) modifying said first version of said request for quotation and said request for quotation meta data to create a second version of said request for quotation, the modification of said first version of said request for quotation and said request for quotation meta data being responsive to a comment alert generated automatically by said central control system module of said communication machine in response to the input of said comment about said request for quotation;

h) submitting said second version of said request for quotation to said plurality of opinion leaders, the submission of said second version of said request for quotation being responsive to said modification of said first version of said request for quotation, further said central control system module of said communication machine generates a second alert to said plurality of opinion leaders in response to said submission of said second version of said request for quotation;

i) inputting at least one endorsement of said request for quotation, the input of an endorsement of said request for quotation by at least one of said plurality of opinion leaders being responsive to said second alert;

j) modifying said second version of said request for quotation and said request for quotation meta data to create a third version of said request for quotation, the modification of said second version of said request for quotation and said request for quotation meta data being responsive to an endorsement alert generated automatically by said central control system module of said communication machine in response to the input of said endorsement of said request for quotation;

k) inputting information about a plurality of reviewer buyers, the input of information about said plurality of reviewer buyers being responsive to said modification of said second version of said request for quotation and said request for quotation meta data;

l) submitting said third version of said request for quotation to said plurality of reviewer buyers, the submission of said third version of said request for quotation to said plurality of reviewer buyers being responsive to said modification of said second version of said request for quotation and said request for quotation meta data, further said central control system module of said communication machine generates a third alert to said plurality of reviewer buyers in response to said submission of said third version of said request for quotation;

m) inputting a feedback about said request for quotation, the input of said feedback about said request for quotation by at least one of said plurality of reviewer buyers being responsive to said third alert; and n) modifying said third version of said request for quotation and said request for quotation meta data to create a fourth version of said request for quotation, the modification of said third version of said request for quotation and said request for quotation meta data being responsive to a feedback alert generated automatically by said central control system module of said communication machine in response to the input of said feedback about said request for quotation;

b. inputting at least one binding commitment to said request for quotation into said communication machine, the binding commitment being responsive to said fourth version of said request for quotation and includes the conditions under which the commitment will become binding, furthermore the aggregation of said binding commitments is provided by said central control system module of said communication machine which creates a fifth version of said request for quotation;

c. inputting at least one binding bid to supply the buyer specified goods and services specified in said request for quotation, said central control system module checks whether the pre-determined bidding period has expired before receiving the binding bid, whereby said communication machine solicits competing bids to reduce price;

d. accepting said binding bid to supply said buyer specified goods and services specified in said request for quotation, the acceptance of said binding bid initiates the procedure to exchange payment for the goods and services by said central control system module of said communication machine;

e. exchanging payment details for said binding bid to supply said buyer specified goods and services specified in said request for quotation, the exchange of payment details for said binding bid comprising the sending of the buyer's information to the Payment Processor by said central control system module of said communication machine;

f. resolving disputes about said request for quotation, the resolution of disputes being invoked by said central control system module of said communication machine; and g. closing said request for quotation, the closure of said request for quotation comprising the determination by said central control system module of said communication machine of whether each buyer and each seller that is bound by a transaction accepts said transaction, h. whereby an author specifies an order for said buyer specified goods and services in said request for quotation then aggregates demand from at least one prospective buyer then seeks a plurality of competing bids from at least one prospective supplier to drive down a purchase price for said order which further increases a number of bound buyers and in turn further reduces said purchase price until said purchase price and consumer surplus are minimized for said number of bound buyers.

2. The method of claim 1 in which the step of inputting at least one binding commitment to said request for quotation comprises:
   a) submitting said fourth version of said request for quotation to a plurality of prospective buyers, the submission of said fourth version of said request for quotation by being responsive to said modification of said third version of said request for quotation and said request for quotation meta data;
   b) displaying for review said fourth version of said request for quotation, the display for review of said fourth version of said request for quotation for said plurality of prospective buyers being responsive to said submission of said fourth version of said request for quotation to said plurality of prospective buyers;
   c) inputting a binding commitment to said request for quotation, the input of said binding commitment to said request for quotation by at least one of said plurality of prospective buyers being responsive to said fourth version of said request for quotation; and
   d) modifying said fourth version of said request for quotation and said request for quotation meta data to create a fifth version of said request for quotation, the modification of said fourth version of said request for quotation and said request for quotation meta data being responsive to said input of said binding commitment to said request for quotation by at least one of said plurality of prospective buyers.

3. The method of claim 2 in which the step of inputting at least one binding bid to supply said buyer specified goods and services specified in said request for quotation comprises:
   a) inputting information about a plurality of prospective sellers, the input of said information about said plurality of prospective sellers being responsive to said modification of said fourth version of said request for quotation and said request for quotation meta data;
   b) submitting said fifth version of said request for quotation to said plurality of prospective sellers, the submission of said fifth version of said request for quotation being responsive to said input of said information about said plurality of prospective sellers;
   c) displaying for review said fifth version of said request for quotation, the display for review of said fifth version of said request for quotation for said plurality of prospective sellers being responsive to said submission of said fifth version of said request for quotation to said plurality of prospective sellers;
   d) inputting at least one question about said request for quotation, the input of a question about said request for quotation by at least one of said plurality of prospective sellers being responsive to said display for review of said fifth version of said request for quotation for said plurality of prospective sellers;
   e) modifying said fifth version of said request for quotation and said request for quotation meta data to create a sixth version of said request for quotation, the modification of said fifth version of said request for quotation and said request for quotation meta data being responsive to said input of at least one said question about said request for quotation by at least one of said plurality of prospective sellers;
   f) submitting said sixth version of said request for quotation to said plurality of prospective sellers, the submission of said sixth version of said request for quotation being responsive to said modification of said fifth version of said request for quotation and said request for quotation meta data;
   g) displaying for review said sixth version of said request for quotation, the display for review of said sixth version of said request for quotation for said plurality of prospective sellers being responsive to said submission of said sixth version of said request for quotation to said plurality of prospective sellers;
   h) inputting a first said binding bid to supply said buyer specified goods and services, the input of said first said binding bid by at least one of said plurality of prospective sellers being responsive to said display for review of said sixth version of said request for quotation for said plurality of prospective sellers;
   i) inputting a conditional binding commitment to said request for quotation, the input of said conditional binding commitment to said request for quotation by at least one of said plurality of prospective buyers being responsive to said display for review of said fourth version of said request for quotation for said plurality of prospective buyers;
   j) inputting a second said binding bid that includes a second price where said second price is below a predetermined amount, the input of said second said binding bid that includes said second price that is below said predetermined amount by at least one of said plurality of prospective sellers being responsive to said first said binding bid; and
   k) binding said conditional binding commitment to said request for quotation when said second said binding bid includes said second price that is below said predetermined amount, the binding of said conditional binding commitment to said request for quotation being responsive to said input of said second said binding bid that includes said second price that is below said predetermined amount.

4. The method of claim 3 in which the step of accepting said binding bid to supply said buyer specified goods and services specified in said request for quotation comprises:
   a) displaying for review each said binding bid including each said first said binding bid and each said second said binding bid, the display for review of each said binding bid being responsive to said input of said binding bid by at least one of said plurality of prospective sellers;
   b) inputting one of a plurality of possible responses to each said binding bid including;
      a. inputting an acceptance of said binding bid, said acceptance of said binding bid being responsive to said display for review of each said binding bid;

b. inputting a binding counter offer which includes a binding set of conditions, the input of said binding counter offer being responsive to said display for review of each said binding bid;
  i. inputting a response to each said binding counter offer comprising one of:
    1. inputting an acceptance of said binding counter offer, said acceptance of said binding counter offer by at least one of said plurality of prospective sellers whose bid received said counter offer being responsive to said binding counter offer; and
    2. inputting a rejection of said binding counter offer, said rejection of said binding counter offer by at least one of said plurality of prospective sellers whose bid received said counter offer being responsive to said binding counter offer; and
c. inputting a rejection of said binding bid, said rejection of said binding bid being responsive to said display for review of each said binding bid;
c) negotiating, final changes to said sixth version of said request for quotation to create a seventh version of said request for quotation, the final negotiation of said seventh version of said request for quotation being responsive to one of:
  a. accepting at least one said binding bid; and
  b. accepting at least one said binding counter offer; and
d) signing said seventh version of said request for quotation, the signature of said seventh version of said request for quotation being responsive to said final negotiation of said seventh version of said request for quotation.

5. The method of claim 4 in which the step of exchanging payment details for said binding bid to supply said buyer specified goods and services specified in said request for quotation comprises:
  a) inputting a plurality of payment details for a bound buyer whose payment details are transferred to a bound seller who signs said seventh version of said request for quotation in accordance with said plurality of standard terms and conditions and said plurality of additional terms and conditions in said seventh version of said request for quotation wherein a plurality of options exist for a timing of payments including blocking funds on a credit card when one of said plurality of prospective buyers makes said binding commitment, the input of said plurality of payment details by each said bound buyer being responsive to said input of said fourth version of said request for quotation;
  b) transferring said plurality of payment details for each said bound buyer to at least one said bound seller in accordance with said plurality of standard terms and conditions and said plurality of additional terms and conditions in said seventh version of said request for quotation, the transfer of said plurality of payment details being responsive to said signature of said seventh version of said request for quotation;
  c) validating said plurality of payment details for each said bound buyer, the validation of said plurality of payment details by at least one said bound seller being responsive to said transfer of said plurality of payment details for each said bound buyer to at least one said bound seller; and
  d) inputting one of:
    a. an acceptance; and
    b. a rejection;

of a transfer of said buyer specified goods and services from at least one said bound seller to at least one said bound buyer in accordance with said plurality of standard terms and conditions and said plurality of additional terms and conditions in said seventh version of said request for quotation, the input of one of said acceptance and said rejection of said transfer of said buyer specified goods and services from said bound seller to said bound buyer being responsive to said validation of said plurality of payment details by said bound seller.

6. The method of claim 5 in which the step of resolving disputes about said request for quotation comprises:
  a) inputting a dispute if an exchange of payment details for said buyer specified goods and services is not accepted by each said bound buyer and each said bound seller, the input of said dispute by at least one of:
    a. said bound buyer being responsive to said bound buyer not accepting said buyer specified goods and services; and
    b. said bound seller being responsive to said bound seller not accepting said payment details for said buyer specified goods and services for at least one said bound buyer,
  b) displaying for review said dispute, the display for review of said dispute for a predetermined arbitrator being responsive to said input of said dispute;
  c) proposing a resolution to said dispute, the proposed dispute resolution being responsive to said display for review of said dispute for said predetermined arbitrator; and
  d) inputting a response to said proposed dispute resolution comprising one of:
    a. accepting said proposed dispute resolution, the acceptance of said proposed dispute resolution by said bound buyer and said bound seller who are parties to said dispute being responsive to said proposed dispute resolution; and
    b. rejecting said proposed dispute resolution and inputting another dispute, the rejection of said proposed dispute resolution and input of another dispute by at least one of:
      i. said bound buyer who is a party to said dispute; and
      ii. said bound seller who is a party to said dispute;
    being responsive to said proposed dispute resolution.

7. The method of claim 6 in which the step of closing said request for quotation comprises:
  a) accepting a closure of a transaction specified by said request for quotation by said bound buyer, the acceptance of said closure of said transaction specified by said request for quotation by said bound buyer being responsive to at least one of:
    a. accepting said buyer specified goods and services; and
    b. accepting each said dispute resolution where said bound buyer is a party to said dispute;
  b) accepting said closure of said transaction specified by said request for quotation by said bound seller, the acceptance of said closure of said transaction specified by said request for quotation by said bound seller being responsive to at least one of:
    a. accepting said payment details for said buyer specified goods and services from each said bound buyer who is bound to said bound seller by said request for quotation; and
    b. accepting each said dispute resolution where said bound seller is a party to said dispute;
  c) accessing, analyzing and modeling a plurality of business issues related to transactional information and information about a plurality of activities of buyers and sellers including activities related to closing each said request for quotation, the access, analysis and modeling of said plurality of business issues related to transactional information and information about said plurality of activities of buyers and sellers being responsive to accepting said closure of said transaction specified by said request for quotation by each said bound buyer and by each said bound seller;

d) generating a plurality of trend, pattern and relationship information about a plurality of requests for quotation including said plurality of requests for quotation that are closed, the generation of said plurality of trend, pattern and relationship information about said plurality of requests for quotation that are closed being responsive to accepting said closure of said transaction specified by said request for quotation by each said bound buyer and by each said bound seller; and e) displaying information that illustrates said plurality of trend, pattern and relationship information about said plurality of requests for quotation including said plurality of requests for quotation that are closed, the display of said plurality of trend, pattern and relationship information about said plurality of requests for quotation including said plurality of requests for quotation that are closed being responsive to said generation of said plurality of trend, pattern and relationship information about said plurality of requests for quotation including said plurality of requests for quotation that are closed.

8. The method of claim 1 wherein said communication machine is configured to receive a plurality inputs from a plurality of buyers including inputs that aggregate knowledge to specify the requirements, features, terms and conditions to procure goods and services, aggregate demand then solicit competing bids from sellers to reduce price.

9. A demand aggregation system configured to receive a request for quotation that includes a plurality of terms and conditions for at least one of:
 a. a buyer specified good; and
 b. a buyer specified service,
 comprising:
 a) a computer implemented central control system operatively coupled to each of:
  a. at least one computer implemented user interface;
  b. a data storage system;
  c. a business intelligence system;
  d. a notification management system;
  e. a design management system;
  f. a workflow management system;
  g. a document management system; and
  h. a payment processor system;
 b) a computer implemented user interface configured to provide access to said central control system, comprising:
  a. a main hardware comprised of a conventional computer,
  b. an operating system configured to control the execution of a plurality of software applications;
  c. said plurality of software applications each configured to perform at least one function including a browser configured to browse a global network such as the Internet;
  d. an input device configured to receive at least one input from at least one user; and
  e. an output device configured to display at least one output for a user;
 c) a data storage system, comprising a plurality of databases configured to store a plurality of database data used by said demand aggregation system;
 d) a business intelligence system configured to analyze and report data, comprising:
  a. an extract, transform and load data module configured to extract, transform and load said plurality of database data from said data storage system into a data warehouse module;
  b. said data warehouse module configured to store a plurality of data that includes a predetermined subset of said plurality of database data;
  c. an analytical tools module configured to analyze and model business issues;
  d. a data mining module configured to discover trends, patterns and relationships in said plurality of data;
  e. a reporting tools module configured to create at least one report; and
  f. a presentation layer module configured to use graphics and multimedia interfaces to output a report;
 e) a notification management system configured to send a notification whenever an event occurs that requires the attention of a user, comprising:
  a. a notification template editor;
  b. a notification configuration settings module;
  c. a notification template database;
  d. at least one public email system;
  e. at least one other notification system;
  f. a secure email system;
  g. a virtual private network; and
  h. a wide area network;
 f) a design management system configured to create at least one design to be included in said request for proposal, comprising:
  a. a design software;
  b. a design canvas;
  c. a design template database;
  d. a design component database; and
  e. a design file database;
 g) a workflow management system configured to perform a plurality of workflow activities, comprising:
  a. an editor user interface configured to perform a plurality of workflow actions including creating at least one request for quotation workflow;
  b. an author user interface configured to perform a plurality of author actions including executing a request for quotation workflow; and
  c. a form editor user interface configured to perform a plurality of form editing actions including creating at least one request for quotation form;
 h) a document management system configured to guide users through a predetermined lifecycle while creating said request for quotation, comprising:
  a. a document management workflow that defines the life cycle for said request for quotation;
  b. access to a list of users from which said author creates a distribution list for each version of said request for quotation;
  c. a plurality of meta data that categorizes each said request for quotation and facilitates searches;
 i) a payment processor system configured to process payments from buyers, comprising:
  a. a virtual private network connection to a payment processor service;
  b. a secure communication channel; and
  c. a plurality of digital certificates from a trusted third party, said demand aggregation system being configured to perform the steps of:
a. inputting said request for quotation;
b. inputting at least one binding commitment to said request for quotation;
c. inputting at least one binding bid to supply the buyer specified goods and services specified in said request for quotation;
d. accepting a binding bid to supply said buyer specified goods and services specified in said request for quotation;
e. exchanging payment details for said binding bid to supply said buyer specified goods and services specified in said request for quotation;
f. resolving disputes about said request for quotation; and
g. closing said request for quotation,
whereby an author specifies an order for said buyer specified goods and services in said request for quotation then aggregates demand from at least one prospective buyer then seeks a plurality of competing bids from at least one prospective supplier to drive down a purchase price for said order which further increases a number of bound buyers and in turn further reduces said purchase price until said purchase price and consumer surplus are minimized for said number of bound buyers.

10. The demand aggregation system recited in claim 9, wherein said demand aggregation system is configured to perform input and update tasks including inputting said request for quotation, comprising the steps of;
a) inputting a predetermined request for quotation template that includes a plurality of standard terms and conditions and further includes a plurality of blank spaces that said author fills in to specify said buyer specified goods and services and further includes a plurality of additional blank spaces that said author fills in to specify a plurality of additional terms and conditions for said buyer specified goods and services;
b) inputting a request for quotation workflow that is a preferred method for said author to fill in said plurality of blank spaces and said plurality of additional blank spaces in said request for quotation template;
c) executing said request for quotation workflow to create a first version of said request for quotation that includes a binding set of terms and conditions, the execution of said request for quotation workflow by said author being responsive to said author logging in to create said request for quotation;
d) inputting a plurality of meta data about said request for quotation including information about a plurality of opinion leaders who are predetermined by said author, the input of said plurality of meta data including information about said plurality of opinion leaders by said author being responsive to said execution of said request for quotation workflow by said author;
e) submitting said first version of said request for quotation to said plurality of opinion leaders, the submission of said first version of said request for quotation by said author being responsive to said input of said plurality of meta data including information about said plurality of opinion leaders;
f) displaying for review said first version of said request for quotation, the display for review of said first version of said request for quotation for said plurality of opinion leaders being responsive to said submission of said first version of said request for quotation;
g) inputting at least one comment about said request for quotation, the input of a comment about said request for quotation by at least one of said plurality of opinion leaders being responsive to said display for review of said first version of said request for quotation for said plurality of opinion leaders;
h) modifying said first version of said request for quotation and said request for quotation meta data to create a second version of said request for quotation, the modification of said first version of said request for quotation and said request for quotation meta data by said author being responsive to said input of at least one said comment about said request for quotation by at least one of said plurality of opinion leaders;
i) submitting said second version of said request for quotation to said plurality of opinion leaders, the submission of said second version of said request for quotation by said author being responsive to said modification of said first version of said request for quotation and said request for quotation meta data by said author;
j) displaying for review said second version of said request for quotation, the display for review of said second version of said request for quotation for said plurality of opinion leaders being responsive to said submission of said second version of said request for quotation to said plurality of opinion leaders by said author;
k) inputting at least one endorsement of said request for quotation, the input of an endorsement of said request for quotation by at least one of said plurality of opinion leaders being responsive to said display for review of said second version of said request for quotation for said plurality of opinion leaders;
l) modifying said second version of said request for quotation and said request for quotation meta data to create a third version of said request for quotation, the modification of said second version of said request for quotation and said request for quotation meta data by said author being responsive to said input of at least one said endorsement of said request for quotation by at least one of said plurality of opinion leaders;
m) inputting information about a plurality of reviewer buyers who are predetermined by said author, the input of said information about said plurality of reviewer buyers by said author being responsive to said modification of said second version of said request for quotation and said request for quotation meta data by said author;
n) submitting said third version of said request for quotation to said plurality of reviewer buyers, the submission of said third version of said request for quotation to said plurality of reviewer buyers being responsive to said modification of said second version of said request for quotation and said request for quotation meta data by said author;
o) displaying for review said third version of said request for quotation, the display for review of said third version of said request for quotation for said plurality of reviewer buyers being responsive to said submission of said third version of said request for quotation to said plurality of reviewer buyers by said author;
p) inputting a feedback about said request for quotation, the input of said feedback about said request for quotation by at least one of said plurality of reviewer buyers being responsive to said display for review of said third version of said request for quotation for said plurality of reviewer buyers; and
q) modifying said third version of said request for quotation and said request for quotation meta data to create a fourth version of said request for quotation, the modification of said third version of said request for quotation and said request for quotation meta data by said author being responsive to said input of said feedback about said request for quotation by at least one of said plurality of reviewer buyers.

11. The demand aggregation system recited in claim 10 in which said author is at least one of a consumer buyer and an organizational buyer.

12. The demand aggregation system recited in claim 10 wherein said communication machine is configured to receive a design from a first author where said design includes at least one component designed by a second author.

13. The demand aggregation system recited in claim 12 wherein said communication machine is configured to receive a plurality inputs from a plurality of buyers including inputs that aggregate knowledge to specify the requirements, features, terms and conditions to procure goods and services, aggregate demand then solicit competing bids from sellers to reduce price.

14. The demand aggregation system recited in claim 10, wherein said demand aggregation system is configured to aggregate demand including inputting at least one binding commitment to said request for quotation, comprising the steps of;
   a) submitting said fourth version of said request for quotation to a plurality of prospective buyers who are predetermined by said author, the submission of said fourth version of said request for quotation by said author being responsive to said modification of said third version of said request for quotation and said request for quotation meta data by said author;
   b) displaying for review said fourth version of said request for quotation, the display for review of said fourth version of said request for quotation for said plurality of prospective buyers being responsive to said submission of said fourth version of said request for quotation to said plurality of prospective buyers by said author;
   c) inputting a binding commitment to said request for quotation, the input of said binding commitment to said request for quotation by at least one of said plurality of prospective buyers being responsive to said display for review of said fourth version of said request for quotation for said plurality of prospective buyers; and
   d) modifying said fourth version of said request for quotation and said request for quotation meta data to create a fifth version of said request for quotation, the modification of said fourth version of said request for quotation and said request for quotation meta data being responsive to said input of said binding commitment to said request for quotation by at least one of said plurality of prospective buyers.

15. The demand aggregation system recited in claim 14, wherein said demand aggregation system is configured to attract competing bids including inputting at least one binding bid to supply the buyer specified goods and services specified in said request for quotation, comprising the steps of:
   a) inputting information about a plurality of prospective sellers who are predetermined by said author, the input of said information about said plurality of prospective sellers by said author being responsive to said modification of said fourth version of said request for quotation and said request for quotation meta data by said author;
   b) submitting said fifth version of said request for quotation to said plurality of prospective sellers, the submission of said fifth version of said request for quotation by said author being responsive to said input of said information about said plurality of prospective sellers by said author;
   c) displaying for review said fifth version of said request for quotation, the display for review of said fifth version of said request for quotation for said plurality of prospective sellers being responsive to said submission of said fifth version of said request for quotation to said plurality of prospective sellers by said author;
   d) inputting at least one question about said request for quotation, the input of a question about said request for quotation by at least one of said plurality of prospective sellers being responsive to said display for review of said fifth version of said request for quotation for said plurality of prospective sellers;
   e) modifying said fifth version of said request for quotation and said request for quotation meta data to create a sixth version of said request for quotation, the modification of said fifth version of said request for quotation and said request for quotation meta data by said author being responsive to said input of at least one said question about said request for quotation by at least one of said plurality of prospective sellers;
   f) submitting said sixth version of said request for quotation to said plurality of prospective sellers, the submission of said sixth version of said request for quotation by said author being responsive to said modification of said fifth version of said request for quotation and said request for quotation meta data by said author;
   g) displaying for review said sixth version of said request for quotation, the display for review of said sixth version of said request for quotation for said plurality of prospective sellers being responsive to said submission of said sixth version of said request for quotation to said plurality of prospective sellers by said author;
   h) inputting a first said binding bid to supply said buyer specified goods and services, the input of said first said binding bid by at least one of said plurality of prospective sellers being responsive to said display for review of said sixth version of said request for quotation for said plurality of prospective sellers;
   i) inputting a conditional binding commitment to said request for quotation, the input of said conditional binding commitment to said request for quotation by at least one of said plurality of prospective buyers being responsive to said display for review of said fourth version of said request for quotation for said plurality of prospective buyers;
   j) inputting a second said binding bid that includes a second price where said second price is below a predetermined amount, the input of said second said binding bid that includes said second price that is below said predetermined amount by at least one of said plurality of prospective sellers being responsive to said first said binding bid; and
   k) binding said conditional binding commitment to said request for quotation when said second said binding bid includes said second price that is below said predetermined amount, the binding of said conditional binding commitment to said request for quotation being responsive to said input of said second said binding bid that includes said second price that is below said predetermined amount.

16. The demand aggregation system recited in claim 15, wherein said demand aggregation system is configured to respond to competing bids including accepting a binding bid to supply said buyer specified goods and services specified in said request for quotation, comprising the steps of:

a) displaying for review each said binding bid including each said first said binding bid and each said second said binding bid, the display for review of each said binding bid for said author being responsive to said input of said binding bid by at least one of said plurality of prospective sellers;
b) inputting one of a plurality of possible responses to each said binding bid including:
  a. inputting an acceptance of said binding bid, said acceptance of said binding bid by said author being responsive to said display for review of each said binding bid for said author;
  b. inputting a binding counter offer which includes a binding set of conditions, the input of said binding counter offer by said author being responsive to said display for review of each said binding bid for said author;
    i. inputting a response to each said binding counter offer comprising one of:
      1. inputting an acceptance of said binding counter offer, said acceptance of said binding counter offer by at least one of said plurality of prospective sellers whose bid received said counter offer being responsive to said binding counter offer; and
      2. inputting a rejection of said binding counter offer, said rejection of said binding counter offer by at least one of said plurality of prospective sellers whose bid received said counter offer being responsive to said binding counter offer; and
  c. inputting a rejection of said binding bid, said rejection of said binding bid by said author being responsive to said display for review of each said binding bid for said author;
c) negotiating final changes to said sixth version of said request for quotation to create a seventh version of said request for quotation, the final negotiation of said seventh version of said request for quotation between said author and at least one of said plurality of prospective sellers being responsive to one of:
  a. accepting at least one said binding bid; and
  b. accepting at least one said binding counter offer; and
d) signing said seventh version of said request for quotation, the signature of said seventh version of said request for quotation by said author and at least one of said plurality of prospective sellers being responsive to said final negotiation of said seventh version of said request for quotation.

17. The demand aggregation system recited in claim 16, wherein said demand aggregation system is configured to consummate a transaction including exchanging payment details for said binding bid to supply said buyer specified goods and services specified in said request for quotation, comprising the steps of;
a) inputting a plurality of payment details for a bound buyer whose payment details are transferred to a bound seller who signs said seventh version of said request for quotation in accordance with said plurality of standard terms and conditions and said plurality of additional terms and conditions in said seventh version of said request for quotation wherein a plurality of options exist for a timing of payments including blocking funds on a credit card when one of said plurality of prospective buyers makes said binding commitment, the input of said plurality of payment details by each said bound buyer being responsive to said input of said fourth version of said request for quotation by said author;
b) transferring said plurality of payment details for each said bound buyer to at least one said bound seller in accordance with said plurality of standard terms and conditions and said plurality of additional terms and conditions in said seventh version of said request for quotation, the transfer of said plurality of payment details being responsive to said signature of said seventh version of said request for quotation;
c) validating said plurality of payment details for each said bound buyer, the validation of said plurality of payment details by at least one said bound seller being responsive to said transfer of said plurality of payment details for each said bound buyer to at least one said bound seller; and
d) inputting one of:
  a. an acceptance; and
  b. a rejection;
of a transfer of said buyer specified goods and services from at least one said bound seller to at least one said bound buyer in accordance with said plurality of standard terms and conditions and said plurality of additional terms and conditions in said seventh version of said request for quotation, the input of one of said acceptance and said rejection of said transfer of said buyer specified goods and services from said bound seller to said bound buyer being responsive to said validation of said plurality of payment details by said bound seller.

18. The demand aggregation system recited in claim 17, wherein said demand aggregation system is configured to manage disputes including resolving disputes about said request for quotation, comprising the steps of:
a) inputting a dispute if an exchange of payment details for said buyer specified goods and services is not accepted by each said bound buyer and each said bound seller, the input of said dispute by at least one of:
  a. said bound buyer being responsive to said bound buyer not accepting said buyer specified goods and services; and
  b. said bound seller being responsive to said bound seller not accepting said payment details for said buyer specified goods and services for at least one said bound buyer;
b) displaying for review said dispute, the display for review of said dispute for a predetermined arbitrator being responsive to said input of said dispute;
c) proposing a resolution to said dispute, the proposed dispute resolution being responsive to said display for review of said dispute for said predetermined arbitrator; and
d) inputting a response to said proposed dispute resolution comprising one of:
  a. accepting said proposed dispute resolution, the acceptance of said proposed dispute resolution by said bound buyer and said bound seller who are parties to said dispute being responsive to said proposed dispute resolution; and
  b. rejecting said proposed dispute resolution and inputting another dispute, the rejection of said proposed dispute resolution and input of another dispute by at least one of:
    i. said bound buyer who is a party to said dispute; and
    ii. said bound seller who is a party to said dispute;
being responsive to said proposed dispute resolution.

19. The demand aggregation system recited in claim 18, wherein said demand aggregation system is configured to close said transaction including closing said request for quotation, comprising the steps of:
- a) accepting a closure of said transaction specified by said request for quotation by said bound buyer, the acceptance of said closure of said transaction specified by said request for quotation by said bound buyer being responsive to at least one of:
  - a. accepting said buyer specified goods and services; and
  - b. accepting each said dispute resolution where said bound buyer is a party to said dispute;
- b) accepting said closure of said transaction specified by said request for quotation by said bound seller, the acceptance of said closure of said transaction specified by said request for quotation by said bound seller being responsive to at least one of:
  - a. accepting said payment details for said buyer specified goods and services from each said bound buyer who is bound to said bound seller by said request for quotation; and
  - b. accepting each said dispute resolution where said bound seller is a party to said dispute;
- c) accessing, analyzing and modeling a plurality of business issues related to transactional information and information about a plurality of activities of buyers and sellers including activities related to closing each said request for quotation, the access, analysis and modeling of said plurality of business issues related to transactional information and information about said plurality of activities of buyers and sellers being responsive to accepting said closure of said transaction specified by said request for quotation by each said bound buyer and by each said bound seller;
- d) generating a plurality of trend, pattern and relationship information about a plurality of requests for quotation including said plurality of requests for quotation that are closed, the generation of said plurality of trend, pattern and relationship information about said plurality of requests for quotation that are closed being responsive to accepting said closure of said transaction specified by said request for quotation by each said bound buyer and by each said bound seller; and
- e) displaying information that illustrates said plurality of trend, pattern and relationship information about said plurality of requests for quotation including said plurality of requests for quotation that are closed, the display of said plurality of trend, pattern and relationship information about said plurality of requests for quotation including said plurality of requests for quotation that are closed being responsive to said generation of said plurality of trend, pattern and relationship information about said plurality of requests for quotation including said plurality of requests for quotation that are closed.

20. The demand aggregation system recited in claim 9, wherein said business intelligence system is configured to generate trend information thereby enabling sellers to better understand demand drivers and improve the selection procedure for their future offerings.

* * * * *